US007873567B2

(12) United States Patent
Eder

(10) Patent No.: US 7,873,567 B2
(45) Date of Patent: Jan. 18, 2011

(54) VALUE AND RISK MANAGEMENT SYSTEM

(75) Inventor: Jeff Scott Eder, Mill Creek, WA (US)

(73) Assignee: Asset Trust, Inc., Bothell, WA (US)

( * ) Notice: Subject to any disclaimer, the term of this patent is extended or adjusted under 35 U.S.C. 154(b) by 1776 days.

(21) Appl. No.: 10/747,471

(22) Filed: Dec. 29, 2003

(65) Prior Publication Data

US 2005/0071266 A1    Mar. 31, 2005

Related U.S. Application Data

(63) Continuation of application No. 09/994,740, filed on Nov. 28, 2001, now abandoned, and a continuation-in-part of application No. 09/953,148, filed on Sep. 17, 2001, now abandoned, and a continuation-in-part of application No. 09/775,561, filed on Feb. 5, 2001, now abandoned.

(51) Int. Cl.
*G06Q 40/00* (2006.01)
(52) U.S. Cl. .................... 705/38; 705/36 R; 705/35; 705/37
(58) Field of Classification Search .................. 705/36, 705/39, 36 R, 35, 37, 38
See application file for complete search history.

(56) References Cited

U.S. PATENT DOCUMENTS

| 3,749,892 | A | 7/1973 | Stenning |
| 3,933,305 | A | 1/1976 | Murphy |
| 4,839,304 | A | 6/1989 | Roberts et al. |
| 4,989,141 | A | 1/1991 | Lyons |
| 5,128,861 | A | 7/1992 | Kagami |
| 5,191,522 | A | 3/1993 | Bosco et al. |
| 5,193,055 | A | 3/1993 | Brown |
| 5,224,034 | A | 6/1993 | Katz |
| 5,237,495 | A | 8/1993 | Morii |
| 5,237,946 | A | 8/1993 | Copson |
| 5,317,504 | A | 5/1994 | Nakayama |
| 5,361,201 | A | 11/1994 | Jost et al. |
| 5,406,477 | A | 4/1995 | Harhen |
| 5,414,621 | A | 5/1995 | Hough |
| 5,471,611 | A | 11/1995 | McGregor |
| 5,644,727 | A | 7/1997 | Atkins |
| 5,649,181 | A | 7/1997 | French et al. |

(Continued)

FOREIGN PATENT DOCUMENTS

EP    0 587 290 A2    3/1994

(Continued)

OTHER PUBLICATIONS

Hans-Peter Deutsch, Computational methods in the pricing and risk management of modern financial derivatives., 1999, Arthur Andersen Financial Risk Management, Mergenthaleralle 10-12, 65760 Eschborn, Germany; Computer Physics Communications 121-122, 157-160.*

(Continued)

*Primary Examiner*—Behrang Badii

(57) ABSTRACT

A method of and system for transforming data from a plurality of systems into models of each of the segments of organization value and using said models to support the analysis, measurement and optimization of one or more aspects of organization risk and value.

23 Claims, 20 Drawing Sheets

U.S. PATENT DOCUMENTS

| | | | |
|---|---|---|---|
| 5,668,591 | A | 9/1997 | Shintani |
| 5,680,305 | A | 10/1997 | Agpar |
| 5,704,045 | A | 12/1997 | King et al. |
| 5,704,055 | A | 12/1997 | George et al. |
| 5,706,495 | A | 1/1998 | Chadha et al. |
| 5,737,581 | A | 4/1998 | Keane |
| 5,742,775 | A | 4/1998 | King |
| 5,774,873 | A | 6/1998 | Berent et al. |
| 5,794,219 | A | 8/1998 | Brown |
| 5,799,287 | A | 8/1998 | Dembo |
| 5,802,501 | A | 9/1998 | Graff |
| 5,809,282 | A | 9/1998 | Cooper |
| 5,812,987 | A | 9/1998 | Luskin et al. |
| 5,812,988 | A | 9/1998 | Sandretto |
| 5,819,237 | A | 10/1998 | Garman |
| 5,864,828 | A * | 1/1999 | Atkins ..................... 705/36 R |
| 5,875,431 | A | 2/1999 | Heckman et al. |
| 6,064,971 | A | 5/2000 | Hartnett |
| 6,064,972 | A | 5/2000 | Jankowitz et al. |
| 6,073,115 | A | 6/2000 | Marshall |
| 6,078,901 | A | 6/2000 | Ching |
| 6,078,901 | A | 6/2000 | Ching |
| 6,092,056 | A | 7/2000 | Tull, Jr. et al. |
| 6,112,188 | A | 8/2000 | Hartnett |
| 6,125,355 | A | 9/2000 | Bekaert et al. |
| 6,134,536 | A | 10/2000 | Shepherd |
| 6,148,293 | A | 11/2000 | King |
| 6,173,276 | B1 | 1/2001 | Kant et al. |
| 6,189,011 | B1 | 2/2001 | Lim et al. |
| 6,209,124 | B1 | 3/2001 | Vermeire et al. |
| 6,263,314 | B1 | 7/2001 | Donner |
| 6,278,981 | B1 | 8/2001 | Dembo et al. |
| 6,282,531 | B1 | 8/2001 | Haughton et al. |
| 6,301,584 | B1 | 10/2001 | Ranger |
| 6,332,163 | B1 | 12/2001 | Bowman-Amuah |
| 6,366,934 | B1 | 4/2002 | Cheng et al. |
| 6,418,448 | B1 | 7/2002 | Sarkar |
| 6,584,507 | B1 | 6/2003 | Bradley et al. |
| 6,591,232 | B1 | 7/2003 | Kassapoglu |
| 6,671,773 | B2 | 12/2003 | Kazar et al. |
| 6,732,095 | B1 | 5/2004 | Warshavsky et al. |
| 6,795,811 | B1 | 9/2004 | Epstein |
| 6,836,773 | B2 | 12/2004 | Tamayo et al. |
| 6,876,992 | B1 | 4/2005 | Sullivan |
| 7,006,992 | B1 | 2/2006 | Packwood |
| 7,283,982 | B2 | 10/2007 | Pednault |
| 7,337,137 | B2 | 2/2008 | Zosin et al. |
| 7,395,235 | B2 | 7/2008 | Dhurandhar et al. |
| 7,395,236 | B2 * | 7/2008 | Degraaf et al. ............ 705/36 R |
| 7,409,357 | B2 | 8/2008 | Schaf et al. |
| 7,596,523 | B2 | 9/2009 | Sobel et al. |
| 7,599,870 | B2 | 10/2009 | Merkoulovitch et al. |
| 7,606,727 | B1 | 10/2009 | Pederson et al. |
| 7,624,054 | B2 | 11/2009 | Chen et al. |
| 7,640,201 | B2 | 12/2009 | Chalermkraivuth et al. |
| 7,653,449 | B2 | 1/2010 | Hunter et al. |
| 7,668,773 | B1 | 2/2010 | Pruitt |
| 2001/0011243 | A1* | 8/2001 | Dembo et al. .................. 705/36 |
| 2002/0002520 | A1 | 1/2002 | Gatto |
| 2002/0016758 | A1 | 2/2002 | Grigsby |
| 2002/0023034 | A1 | 2/2002 | Brown et al. |
| 2002/0052820 | A1 | 5/2002 | Gatto |
| 2003/0176931 | A1 | 9/2003 | Pednault et al. |
| 2005/0187866 | A1* | 8/2005 | Lee ............................. 705/39 |

FOREIGN PATENT DOCUMENTS

| | | | |
|---|---|---|---|
| GB | 2 253 081 A | 2/1992 | |
| WO | WO-00/75820 A2 | 12/2000 | |

OTHER PUBLICATIONS

Karen Spinner, The VAR Explosion, Jun. 1996; Wall Street and Technology, vol. 14 No. 6; 8-11.*
Jean-Pierre Berliet and Steve Lowe, Managing the Volatility Link, Best's REview, ABI/Inform Global, Mar. 1999, vol. 99, No. 11, 83-85.*
Culp, Christopher et al, "Value at Risk for Asset Managers", Derivatives Quarterly, vol. 5, Jan. 8, 1999.
Chicago Mercantile Exchange, "SPAN—Frequently Asked Questions", CME web site, Feb. 17, 2006.
Chicago Board of Trade, "SPAN Margin System", Aug. 27, 1991.
W3C, "Extensible Markup Language (XML)", W3C web site, Apr. 14, 2005.
Goldfarb, Charles; & Prescod, Paul; XML Handbook: Prentice Hall, 1998.
Maier, David, "Database Desiderata for an XML Query Language"; W3.org, 1998.
Widom, Jennifer, "Data Management for XML, Research Directions", IEEE, Jul. 1999.
Chambers, Robert; Quiggins, John; "Resource Allocation and Asset Pricing", Nov. 2002.
Haesendonckx, Michel, "VBM—Value Driver Tree", Jun. 8, 2005.
Barua, Anitesh; Lee, C.H. Sophie; Whinston, Andrew, "The Calculus of Reengineering", Aug. 1994.
Caouette, John, Altman, Edward & Narayanan, Paul, Managing Credit Risk, 1998, John Wiley and Sons.
Lohr, Steve, "Gates tries to inspire future techies", International Herald Tribune, Mar. 2, 2004.
Caouette, John, Altman, Edward & Narayanan, Paul, Managing Credit Risk, John Wiley and Sons, Inc.
Anonymous, "Survey: Too Clever by Half", The Economist, Jan. 24, 2004.
Koller, Timothy, "What is value based management", McKinsey Quarterly, 1994, No. 3.
Brown, Carol; Coakley, James; Phillips, Mary Ellen, Neural Networks Enter World of Mgmt Accounting.
Bielinski, Daniel, "How to sort out the premium drivers of post deal value", Mergers & Acquisitions.
Bergstrom, Peter; Kimber Eliot, "Formal data models for SGML and HyTime", SGML, Mar. 1999, electrum.
Harold, Elliotte, XML Bible, IDG Books, 1999.
Knight, James, Value Based Management, McGraw Hill, 1998.
NeuroSolutions, Application Summaries.
Copeland, Tom, Koller, Tim, Murrin, Jack, Valuation, John Wiley and Sons, 1994.
Brown, Carolyn, Phillips, Mary Ellen, Expert Systems for Management Accounting Tasks, IMA Foundation.
Zipp, Alan S.; Business valuation methods; 1993, AICPA.
Davidow, William; Accounting systems are completely wrong, Jan. 1995, Red Herring.
Mctaggert, James, Kontes, Peter and Mankins, Michael, The value imperative, 1994,The Free Press.
Rappaport, Alfred; Creating shareholder value; 1986, The Free Press.
Ritchken, Peter, Options, Theory, Strategy and Applications, 1987, Foresman and Company.
Dixit, Avinash & Pindyck, Robert; Investment under uncertainty; 1994; Princeton University Press.
Garson, David; Interpreting neural network connection weights, Apr. 1, 1991, AI Expert.
Wellstead, Stephen; Neural network and fuzzy logic applications in C/C++; 1994; John Wiley & Sons.
Most, Kenneth; Accounting theory; 1977,Grid, Inc.
Hendriksen, Elden, Accounting theory, 1982, Richard D. Irwin.
Al Kulkarni; Arun; Artificial neural networks for image understanding; Jan. 1, 1994; Van Norstrand Reinhold.
Ward Systems Group; NeuroWindows User Manual; 1993; Wards Systems Group.
Brealey, Richard & Myers, Stewart; Principles of Corporate Finance; 1991; McGraw Hill.

Faulkner, Terrence; Applying options thinking to R&D valuation; May 1, 1996; Research Technology Manage.
Miller, Merton & Modigliani, Franco, Dividend policy, growth and the valuation of shares, Oct. 1, 1961.
Simensky, Melvin & Bryer, Lanning; The new role of intellectual property in commercial transactions.
Wilson, Albert, Emerging approaches to impaired property valuation, Apr. 1, 1996, Appraisal Journal, v64.
Brown, Gordon T, Free cash flow appraisal, a better way, Apr. 1, 1996, Appraisal Journal, V64, No. 2.
Business Editors & Real Estate Industry Writers, EQK Realty Investors I, Apr. 2, 1992, Press Release.
Swad, Randy, Business valuation, applicable standards for CPA's, Sep. 1, 1995, CPA Journal v65, No. 9.
Reilly, Robert; Valuation of intangibles for bankruptcy and reorganization purposes; Aug. 1, 1994; Ohio.
Liebich, Kim; How to value a bank; Aug. 1, 1995; ABA Banking Journal.
Baumann, Barbara H & Oxaal, Marjorie R; Estimating the value of a group medical practice, a primer.
Maxson, Mark; Will you get your money's worth?, May 1, 1993, Financial Executive.
Friedman, Richard; Business valuation: calculating it right; Oct. 1, 1994; Practical Accountant.
Mullen, Maggie; How to value intangibles; Nov. 1, 1993; Accountancy.
Stewart, Thomas; Trying to grasp the intangible; Oct. 2, 1995 Fortune.
Ourosoff, Alexandra; What the world's top brands are worth; Sep. 1, 1992; Finance World.
Phillips Business Information, Inc.; Five ways to reduce risk with neural networks; Sep. 27, 1993; Credi.
Lippitt, Jeffrey & Mastracchio, Nicholas, Developing capitalization rates for valuing a business, 11.
Hirsch, A. Ethan, What's it worth?, Dec. 21, 1992, Accounting Today, v6, No. 24, p. 16.
Myers, Stewart & Howe, Christopher; A life-cycle financial model of Pharmaceutical R&D; Apr. 1, 1997;MIT.
Simon, Carol J. & Sullivan, Mary W.; The Measurement and Determinants of Brand Equity; Oct. 1, 1993; Ma.
Sveiby, Karl Erik & Mellander, Klas; Tango Learning Guide Version 2.1; 1994; Celemi.
Kaufman, J. Jerry; Value Management; 1998; Crisp.
HBS Press; Measuring Corporate Performance; 1998; HBS Press.
Kaplan, Robert & Norton, David; The Balanced Scorecard; 1996; HBS Press.
Morris, Henry; Extending the Business Process, Oct. 6, 1998, IDC Presentation.
Amir, Eli; & Lev, Baruch, "Value-relevance of non-financial information", Journal of Accounting and.
Ernst & Young, Measures that Matter.
Bouquet, Paolo, Searafini, Luciano, et al; Modeling and Using Context—Context 99, Sep. 1999, Springer.
Akman, Varol, Bouquet, Paolo, et al; Modeling and Using Context—Context 2001, Jul. 2001, Springer.
Kuehne, Sven, et al, "SEQL: Category learning as progressive abstraction using structure mapping", 2.
Franke, Jurgen, Hardle, Wolfgang, et al; Measuring Risk in Complex Stochastic Systems; 2000, Springe.
Shimpi, Prakash, Integrating Corporate Risk Management, Oct. 1999, Swiss Re New Markets.
Brewka, Gerhard, Principles of Knowledge Representation, 1996, CSLI Publications.
Reiter, Raymond, Knowledge in Action, 2001, MIT Press.
Tissen, Rene, Andriessen, Daniel, et al; The Knowledge Dividend, 2000, Prentice Hall.
Brown, John Seely, et al, Loosening up: How process networks unlock the power of specialization, 20.
Blythe, Jim, "An Integrated Environment for Knowledge Acquisition", 2001, Intelligent User Interface.
Kluge, Jurgen, Stein, Wolfram, Licht, Thomas, Knowledge Unplugged, 2001, Palgrave.
Quinn, James Brian, Intelligent Enterprise, Free Press, 1992.
Fowler, Martin; Analysis Patterns: Reusable Object Models, 1997, Addison Wesley.
Shafer, Glenn & Vovk, Vladimir, Probability and Finance, 2001, John Wiley & Sons.
Fahy, Martin, Strategic Enterprise Management Systems, 2001, CIMA.
Ballow, John; Burgman, Roland;Burgoz, Scott; "Enhanced Business Reporting" ; Oct. 2004, pp. 1-30, Asset Economics, U.S.A.
Charoenrook, Anchanda; "Does Sentiment Matter?"; Dec. 2003, pp. 1-44, Financial Management Association International, U.S.A.
Bandopadhyaya, Arindam, Jones, Anne Leah; "Measuring investor sentiment in equity markets"; Feb. 2006, v7, pp. 208-215, Journal Asset Management, U.S.A.
Physorg.Com, "How much information is too much information?"; pp. 1-2;, Feb. 15, 2005, Physorg.Com, University of Queensland, Australia.
Yang, Bo et al., BP Neural Network Optimization based on an improved genetic algorithm, Nov. 4, 2002, pp. 64-68, Proceedings for the First International Conference on Machine Learning and Cybernetics Beijing, China, IEEE, U.S.A.
Brous, Peter, Declaration Under Rule 132 for U.S. Appl. No. 10/287,586, pp. 1-2, Jul. 21, 2008.
Rauenzahn, Rick, Declaration Under Rule 132 for U.S. Appl. No. 10/821,504, pp. 1-6, Jul. 11, 2008.
Brous, Peter, Declaration Under Rule 132 for U.S. Appl. No. 10/287,586, pp. 1-2, Jul. 21, 2008.
Brous, Peter, Declaration Under Rule 132 for U.S. Appl. No. 10/743,616, pp. 1-3, Oct. 31, 2007.
Brous, Peter, Declaration Under Rule 132 for U.S. Appl. No. 10/743,616, pp. 1-4, Oct. 17, 2008.
Rauenzahn, Rick, Declaration Under Rule 132 for U.S. Appl. No. 10/287,586, pp. 1-5, May 16, 2009.
Rauenzahn, Rick, Declaration Under Rule 132 for U.S. Appl. No. 09/688,983, pp. 1-3, Apr. 30, 2006.
Rauenzahn, Rick, Declaration Under Rule 132 for U.S. Appl. No. 10/821,504, pp. 1-3, Nov. 19, 2007.
Cusanza, Greg, Declaration Under Rule 132 for U.S. Appl. No. 09/764,068, pp. 1-4, Apr. 4, 2008.
Cusanza, Greg, Declaration Under Rule 132 for U.S. Appl. No. 10/645,099, pp. 1-4, Apr. 28, 2009.
Zweig, Jason, "Does stock market data really go back 200 years?", Wall Street Journal, Jul. 11, 2009.
Science News Letter, The, "Unlearning is problem", The Science News Letter, Feb. 4, 1956, p. 67, vol. 69, Society for Science & the Public, USA.
Botknowledge, "Botknowledge—Frequently Asked Questions", 2000, pp. 1-3, www.botknowledge.com, U.S.A.
Halford, Graeme et al,"Separating Cognitive Capacity from Knowledge", Trends in Cognitive Science, Jun. 2007, pp. 236-242, Cell Press, U.S.A.
Perignon, Christophe & Smith, Daniel, "The level and quality of Value at Risk disclosure by commercial banks", Jul. 7, 2009, pp. 1-49, SSRN, USA.
Hoppe, Richard, "It's time we buried Value at Risk", Risk Professional, Jul./Aug. 1999, pp. 14-18, USA.
Taleb, Nassim, "Against VAR", Derivatives Strategy, Apr. 1997, www.derivativesstrategy.com, USA.
Stein, Jeremy et al, "A comparables approach to measuring cash flow at risk for non financial firms", Journal of Applied Corporate Finance, Winter 2001, pp. 100-109.
Culp, Christopher L. et al., "Value at Risk for Asset Managers," *Derivatives Quarterly*, 5:1-25 (1998).
Winterton, Andy, "Modeling for the Future," Balance Sheet, v8, n1, pp. 1-6 (1999).
Koller, Timothy, "What is value based management", McKinsey Quarterly, 1994, No. 3.
Brown, Carol; Coakley, James; Phillips, Mary Ellen, Neural Networks Enter World of Mgmt Accounting, May 1995.
Bielinski, Daniel, "How to sort out the premium driver of post deal value", Mergers & Acquisitions, Jul./Aug. 1993.
Bergstrom, Peter; Kimber Eliot, "Formal data models for SGML and HyTime", SGML, Mar. 1999, electrum.
NeuroSolutions, Application Summaries, Nov. 18, 2004.

Copeland, Tom, Koller, Tim, Murrin, Jack, Valuation, John Wiley and Sons, 1994.
Brown, Carolyn, Phillips, Mary Ellen, Exert Systems for Management Accounting Tasks, IMA Foundation, 1995.

Caouette, John, Altman, Edward & Narayanan, Paul, Managing Credit Risk, John Wiley and Sons, Inc., 1998.

* cited by examiner

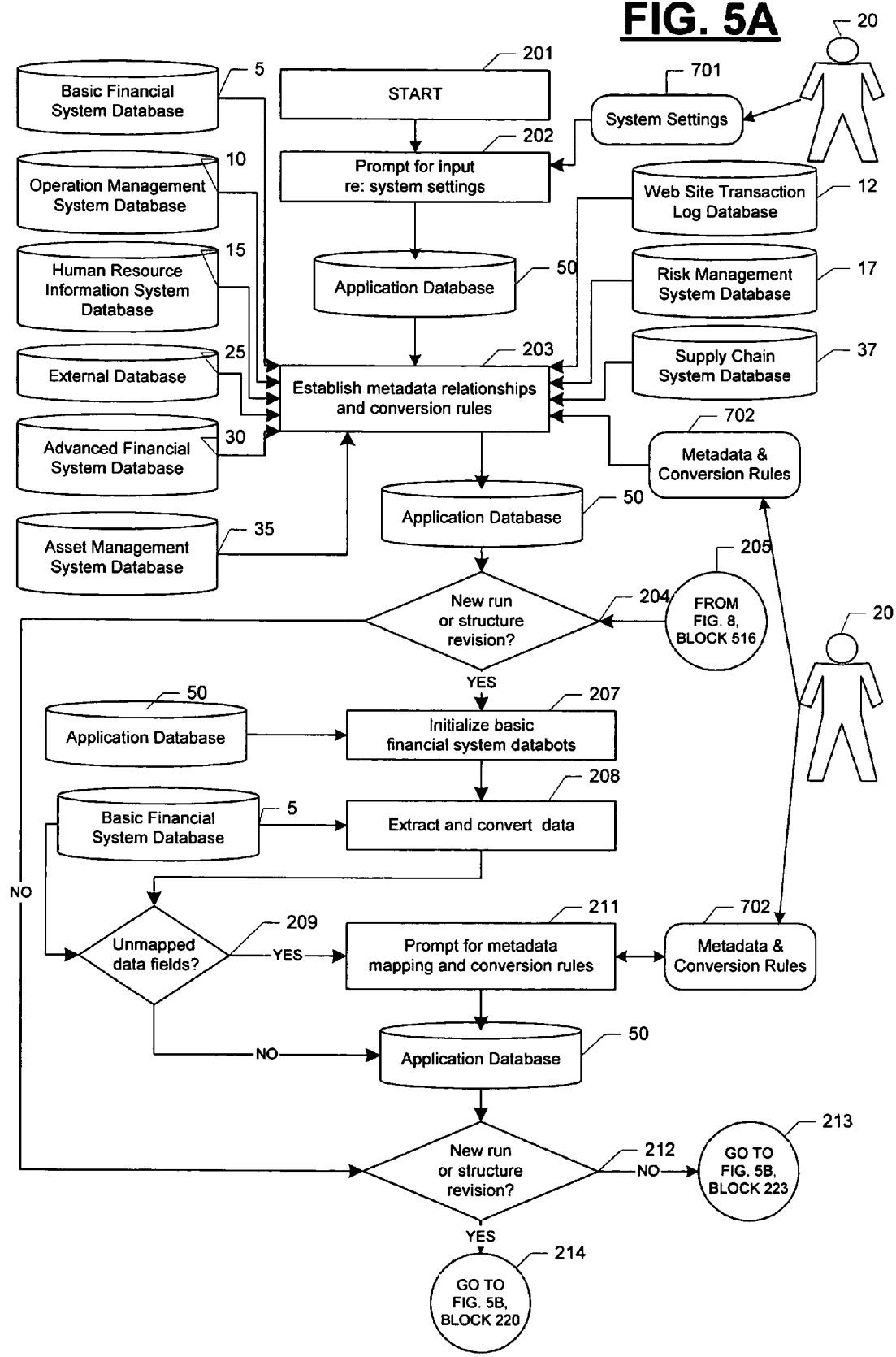

FIG. 9
Organization Value Matrix

Enterprise 1

|  | Current Operation | Net Real Options | Market Sentiment | Excess Financial Assets | Derivativ s |
|---|---|---|---|---|---|
| Element of value 1 | X | X |  |  |  |
| through | X | X |  |  |  |
| Element of value n | X | X |  |  |  |
|  |  |  |  |  |  |
| External factor 1 | X | X |  |  |  |
| through | X | X |  |  |  |
| External factor n | X | X |  |  |  |

+

Enterprise 2

|  | Current Operation | Net Real Options | Market Sentiment | Excess Financial Assets | Derivatives |
|---|---|---|---|---|---|
| Element of value 1 |  |  | X | X | X |
| through |  |  | X | X | X |
| Element of value n |  |  | X | X | X |
|  |  |  |  |  |  |
| External factor 1 |  |  | X | X | X |
| through |  |  | X | X | X |
| External factor n |  |  | X | X | X |

=

Organization

|  | Current Operation | Net Real Options | Market Sentiment | Excess Financial Assets | Derivatives |
|---|---|---|---|---|---|
| Element of value 1 | X | X | X | X | X |
| through | X | X | X | X | X |
| Element of value n | X | X | X | X | X |
|  |  |  |  |  |  |
| External factor 1 | X | X | X | X | X |
| through | X | X | X | X | X |
| External factor n | X | X | X | X | X |

\* n t : wh n display d ach X is r placed by a valu in th bas currency

FIG. 10
Organization Risk Matrix

Ent rpris 1

|  | Current Operation | Net Real Options | Market Sentiment | Excess Financial Assets | Derivatives |
|---|---|---|---|---|---|
| Element of value 1 | X | X |  |  |  |
| through | X | X |  |  |  |
| Element of value n | X | X |  |  |  |
|  |  |  |  |  |  |
| Event Risk | X | X |  |  |  |
| External factor 1 | X | X |  |  |  |
| through | X | X |  |  |  |
| External factor n | X | X |  |  |  |

+

Enterprise 2

|  | Current Operation | Net Real Options | Market Sentiment | Excess Financial Assets | Derivatives |
|---|---|---|---|---|---|
| Element of value 1 |  |  | X | X | X |
| through |  |  | X | X | X |
| Element of value n |  |  | X | X | X |
|  |  |  |  |  |  |
| Event Risk |  |  | X | X | X |
| External factor 1 |  |  | X | X | X |
| through |  |  | X | X | X |
| External factor n |  |  | X | X | X |

=

Organization

|  | Current Operation | Net Real Options | Market Sentiment | Excess Financial Assets | Derivatives |
|---|---|---|---|---|---|
| Element of value 1 | X | X | X | X | X |
| through | X | X | X | X | X |
| Element of value n | X | X | X | X | X |
|  |  |  |  |  |  |
| Ev nt Risk | X | X | X | X | X |
| External factor 1 | X | X | X | X | X |
| through | X | X | X | X | X |
| External factor n | X | X | X | X | X |

\* not : when display d ach X is r plac d by a valu in th bas curr ncy

VALUE AND RISK MANAGEMENT SYSTEM

CONTINUATION AND CROSS REFERENCE TO RELATED APPLICATIONS AND PATENTS

This application is a continuation of application Ser. No. 09/994,740 filed Nov. 28, 2001 now abandoned. This application is also a continuation in part of application Ser. No. 09/953,148 filed Sep. 17, 2001 now abandoned, application Ser. No. 09/775,561 filed Feb. 5, 2001 now abandoned and application Ser. No. 09/688,983 filed Oct. 17, 2000 the disclosures of which are incorporated herein by reference. The subject matter of this application is related to application Ser. Nos. 10/821,504 filed Apr. 9, 2004, application Ser. No. 09/421,553, filed Oct. 20, 1999, application Ser. No. 09/775,561 filed Feb. 5, 2001, application Ser. No. 09/953,148 filed Sep. 17, 2001, U.S. Pat. No. 5,615,109 for "Method of and System for Generating Feasible, Profit Maximizing Requisition Sets", by Jeff S. Eder, U.S. Pat. No. 6,321,205 for "Method of and System for Modeling and Analyzing Business Improvement Programs" by Jeff S. Eder and U.S. Pat. No. 6,393,406 for "Method of and System for valuing elements of a business enterprise" by Jeff S. Eder the disclosures of which are incorporated herein by reference.

BACKGROUND OF THE INVENTION

This invention relates to a method of and system for creating an organization risk matrix and an organization value matrix and using said matrices to support the analysis, management and/or optimization of one or more aspects of organization share price.

SUMMARY OF THE INVENTION

It is a general object of the present invention to provide a novel and useful system for creating the matrices of value and risk for an organization by learning from the data and using said matrices to support the analysis, management and/or optimization one or more aspects of organization value and risk.

A preferable object to which the present invention is applied is fully quantifying and then optimizing the elements and segments of value associated with operating a multi-enterprise commercial organization. Quantification and optimization are enabled by:

1) Systematically analyzing up to five segments of value—current operation, real options/contingent liabilities, derivatives, excess financial assets and market sentiment for each enterprise in the organization;
2) Systematically analyzing and valuing all the elements of value, tangible and intangible, that affect the segments of value for each enterprise in the organization;
3) Systematically analyzing and valuing all the external factors that affect the segments of value for each enterprise in the organization;
4) Developing an understanding of the risk associated with external factors, elements of value and event risks by segment of value under both normal and extreme conditions for each enterprise in the organization;
5) Integrating information and insights from asset management systems (i.e. Customer Relationship Management, Brand Management, etc.), asset risk management systems (credit risk, currency risk, etc.) and business intelligence systems for each enterprise in the organization; and
6) Summing the enterprise analyses in order to complete the matrices of value and risk and define the efficient frontier for organization financial performance.

While one embodiment of the novel system for defining and measuring the matrices of organizational value and risk analyzes all five segments of value, the system can operate when one or more of the segments of value are missing for one or more enterprises and/or for the organization as a whole. For example, the organization may be a value chain that does not have a market value in which case there will be no market sentiment to evaluate. Another common situation would be a multi-company corporation that has no derivatives and/or excess financial assets in most of the enterprises (or companies) within it.

As detailed later, the segments of value that will be analyzed are defined in the system settings table (140). Most public companies will have at least three segments of value, current operation, real options and market sentiment. Because most corporations have only one traded stock, multi-company corporations will generally define an enterprise for the "corporate shell" to account for all market sentiment. This "corporate shell" enterprise can also be used to account for any joint options the different companies within the corporation may collectively possess. The system is also capable of analyzing the value of the organization without considering risk. However, the system needs to complete the value analyses before it can complete the analysis of all organization risks.

The system of the present invention has the added benefit of eliminating a great deal of time-consuming and expensive effort by automating the extraction of data from the databases, tables, and files of existing computer-based corporate finance, operations, human resource, supply chain, web-site and asset management system databases. In accordance with the invention, the automated extraction, aggregation and analysis of data from a variety of existing computer-based systems significantly increases the scale and scope of the analysis that can be completed. The system of the present invention further enhances the efficiency and effectiveness of the analysis by automating the retrieval, storage and analysis of information useful for valuing elements of value and segments of value from external databases, external publications and the Internet.

Uncertainty over which method is being used for completing the valuation and the resulting inability to compare different valuations is eliminated by the present invention by consistently utilizing the same set of valuation methodologies for valuing the different segments of value as shown in Table 2.

TABLE 2

| Segment of organization value by enterprise | Valuation methodology |
|---|---|
| Current-operation value (COPTOT) - value of operation that is developing, making, supplying and selling products and/or services | Income valuation |
| Excess net financial assets (aka Excess financial assets) | Total Net Financial Assets valued using GAAP - (amount required to support current operation) |
| Real Options & Contingent Liabilities (aka Real options) | Real option algorithms and optional allocation of industry options |
| Derivatives - includes all hedges, swaps, swaptions, options and warrants | Risk Neutral Valuation |

TABLE 2-continued

| Segment of organization value by enterprise | Valuation methodology |
|---|---|
| Market Sentiment | Market Value* − (COPTOT + Σ Real Option Values + Σ Derivatives + Σ Excess Financial Assets) |

*The user also has the option of specifying the total value

The market value of the organization is calculated by combining the market value of all debt and equity as shown in Table 3. Element and external factor values are calculated based on the sum of their relative contributions to each segment of value for each enterprise.

TABLE 3

Organization Market Value =

Σ Market value of equity for all enterprises −
Σ Market value of debt for all enterprises Consultants from McKinsey & Company recently completed a three year study of companies in 10 industry segments in 12 countries that confirmed the importance of intangible elements of value as enablers of new business expansion and profitable growth. The results of the study, published in the book *The Alchemy of Growth*, revealed three common characteristics of the most successful businesses in the current economy:

1. They consistently utilize "soft" or intangible assets like brands, customers and employees to support business expansion;
2. They systematically generate and harvest real options for growth; and
3. Their management focuses on three distinct "horizons"—short term (1-3 years), growth (3-5 years out) and options (beyond 5 years).

The experience of several of the most important companies in the U.S. economy, e.g. IBM, General Motors and DEC, in the late 1980s and early 1990s illustrate the problems that can arise when intangible asset information is omitted from corporate financial statements and companies focus only on the short term horizon. All three companies were showing large profits using current accounting systems while their businesses were deteriorating. If they had been forced to take write-offs when the declines in intangible assets were occurring, the problems would have been visible to the market and management would have been forced to act to correct the problems much more quickly than they actually did. These deficiencies of traditional accounting systems are particularly noticeable in high technology companies that are highly valued for their intangible assets and their options to enter growing markets rather than their tangible assets.

The utility of the valuations produced by the system of the present invention are further enhanced by explicitly calculating the expected longevity of the different elements of value.

As shown in Table 2, real options and contingent liabilities are valued using real option algorithms. Because real option algorithms explicitly recognize whether or not an investment is reversible and/or if it can be delayed, the values calculated using these algorithms are more realistic than valuations created using more traditional approaches like Net Present Value. The use of real option analysis for valuing growth opportunities and contingent liabilities (hereinafter, real options) gives the present invention a distinct advantage over traditional approaches to enterprise financial management.

The innovative system has the added benefit of providing a large amount of detailed information to the organization users concerning both tangible and intangible elements of value by enterprise. Because intangible elements of value are by definition not tangible, they can not be measured directly. They must instead be measured by the impact they have on their surrounding environment. There are analogies in the physical world. For example, electricity is an "intangible" that is measured by the impact it has on the surrounding environment. Specifically, the strength of the magnetic field generated by the flow of electricity through a conductor turns a motor and the motion of this motor is used to determine the amount of electricity that is being consumed.

The system of the present invention measures intangible elements of value by identifying the attributes that, like the magnetic field, reflect the strength of the element of value in driving segments of value (current operation, excess financial assets, real options, derivatives, market sentiment) and/or components of value within the current operation (revenue, expense and change in capital) and are relatively easy to measure. Once the attributes related to the strength of each element of value are identified, they can be summarized into a single expression (a composite variable or vector) if the attributes don't interact with attributes from other elements. If attributes from one element of value drive those from another, then the elements of value can be combined for analysis and/or the impact of the individual attributes can be summed together to calculate a value for the element. In one embodiment, vectors are used to summarize the impact of the element of value attributes. The vectors for all elements of value are then evaluated to determine their relative contribution to driving each of the components of value and/or each of the segments of value. The system of the present invention calculates the product of the relative contribution and the forecast longevity of each element of value to determine the relative contribution to each of the components of value to an overall value. The contribution of each element of value to each component of value are then added together to determine the value of the current operation contribution of each element of value (see Table 5). The contribution of each element of value to the enterprise is then determined by summing the element of value contribution to each segment of value. The organization value is then calculated by summing the value of all the enterprises within the organization.

The method for tracking all the elements of value and external factors for a business enterprise provided by the present invention eliminates many of the limitations associated with current systems for financial management and risk management that were described previously. In addition to supporting the identification and display of the efficient frontier, the system of the present invention will also facilitate: analysis of potential mergers and acquisitions, evaluation of asset purchases/disposals, rating the ability of the organization to re-pay debt and monitoring the performance of outside vendors who have been hired boost the value of one or more elements of value (i.e. advertising to increase brand value).

To facilitate its use as a tool for financial management, the system of the present invention produces reports in formats that are similar to the reports provided by traditional accounting systems. Incorporating information regarding all the elements of value is just one of the ways the system of the present invention overcomes the limitations of existing systems. Other advances include:
1. The integrated analysis of all the sources of value and risk,
2. The automated analysis of risk under both normal and extreme conditions, and
3. The automated identification and display of the efficient frontier for organization financial performance.

By providing an real-time financial insight to personnel in the organization, the system of the present invention enables the continuous optimization of management decision making across the entire organization.

BRIEF DESCRIPTION OF DRAWINGS

These and other objects, features and advantages of the present invention will be more readily apparent from the following description of one embodiment of the invention in which:

FIG. 5A, FIG. 5B, FIG. 5C, FIG. 5D, FIG. 5E, FIG. 5F and FIG. 5G are block diagrams showing the sequence of steps in the present invention used for specifying system settings and for initializing and operating the data bots that extract, aggregate, store and manipulate information utilized in system processing by enterprise;

FIG. 9 is a diagram showing how the enterprise matrices of value can be combined to calculate the organizational matrix of value; and FIG. 10 is a diagram showing how the enterprise matrices of risk can be combined to calculate the organizational matrix of risk;

DETAILED DESCRIPTION OF ONE EMBODIMENT

Figure 1:
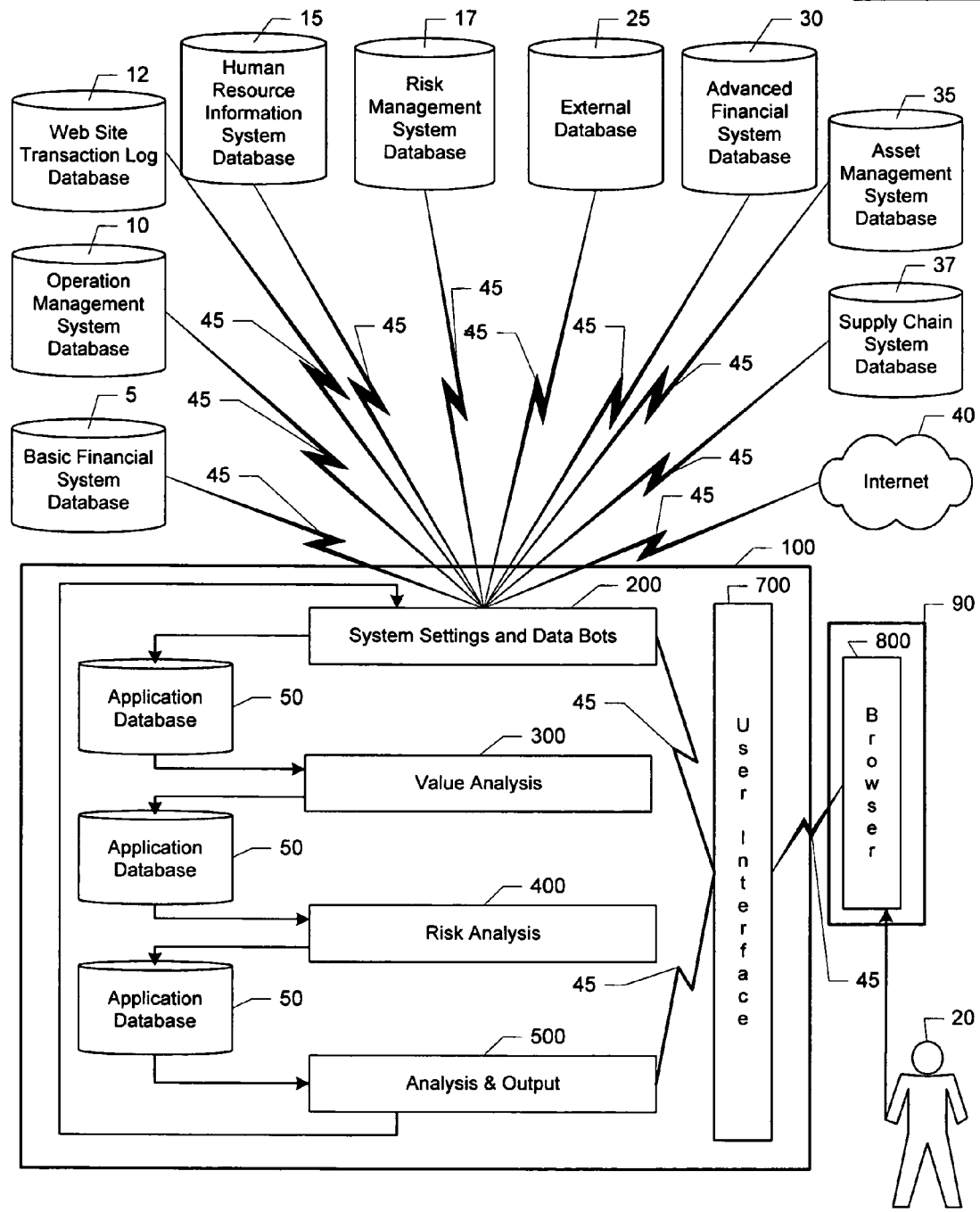
FIG. 1 is a block diagram showing the major processing steps of the present invention.

FIG. 1 provides an overview of the processing completed by the innovative system for defining, measuring and continuously monitoring the matrices of value and risk for a multi-enterprise organization. In accordance with the present invention, an automated method of and system (100) for producing the matrices of value and risk for a multi-enterprise commercial organization is provided. Processing starts in this system (100) with the specification of system settings and the initialization and activation of software data "bots" (200) that extract, aggregate, manipulate and store the data and user (20) input used in completing system processing. This information is extracted via a network (45) from: a basic financial system database (5), an operation management system database (10), a web site transaction log database (12), a human resource information system database (15), a risk management system database (17), an external database (25), an advanced financial system database (30), a asset management system database (35), a supply chain system database (37) and the Internet (40) for each enterprise in the organization. These information extractions and aggregations may be influenced by a user (20) through interaction with a user-interface portion of the application software (700) that mediates the display, transmission and receipt of all information to and from browser software (800) such as the Microsoft Internet Explorer in an access device (90) such as a phone, pda or personal computer that the user (20) interacts with. While only one database of each type (5, 10, 12, 15, 17, 25, 30, 35 and 37) is shown in FIG. 1, it is to be understood that the system (100) will extract data from at least one database of each type via the network (45) for each enterprise within the organization. While the data from multiple asset management systems can be utilized in the analysis of each element of value completed by the system of the present invention, one embodiment of the present invention contains one asset management system for each element of value being analyzed for each enterprise within the organization. Asset management systems can include: customer relationship management systems, partner relationship management systems, channel management systems, knowledge management systems, visitor relationship management systems, intellectual property management systems, alliance management systems, process management systems, brand management systems, workforce management systems, human resource management systems, email management systems, IT management systems and/or quality management systems. As defininned for this application, asset management system data includes all unclassified text and multi-media data within an enterprise or organization. Automating the extraction and analysis of data from each asset management system ensures that every asset—tangible or intangible—is considered within the overall financial framework for the organization. It should also be understood that it is possible to complete a bulk extraction of data from each database (5, 10, 12, 15, 17, 25, 30, 35 and 37) and the Internet 40 via the network (45) using peer to peer networking and data extraction applications such as Data Transformation Services from Microsoft or the Power Center from Informatica before initializing the data bots. The data extracted in bulk could be stored in a single datamart, a data warehouse or a storage area network where the data bots could operate on the aggregated data.

Figure 2:
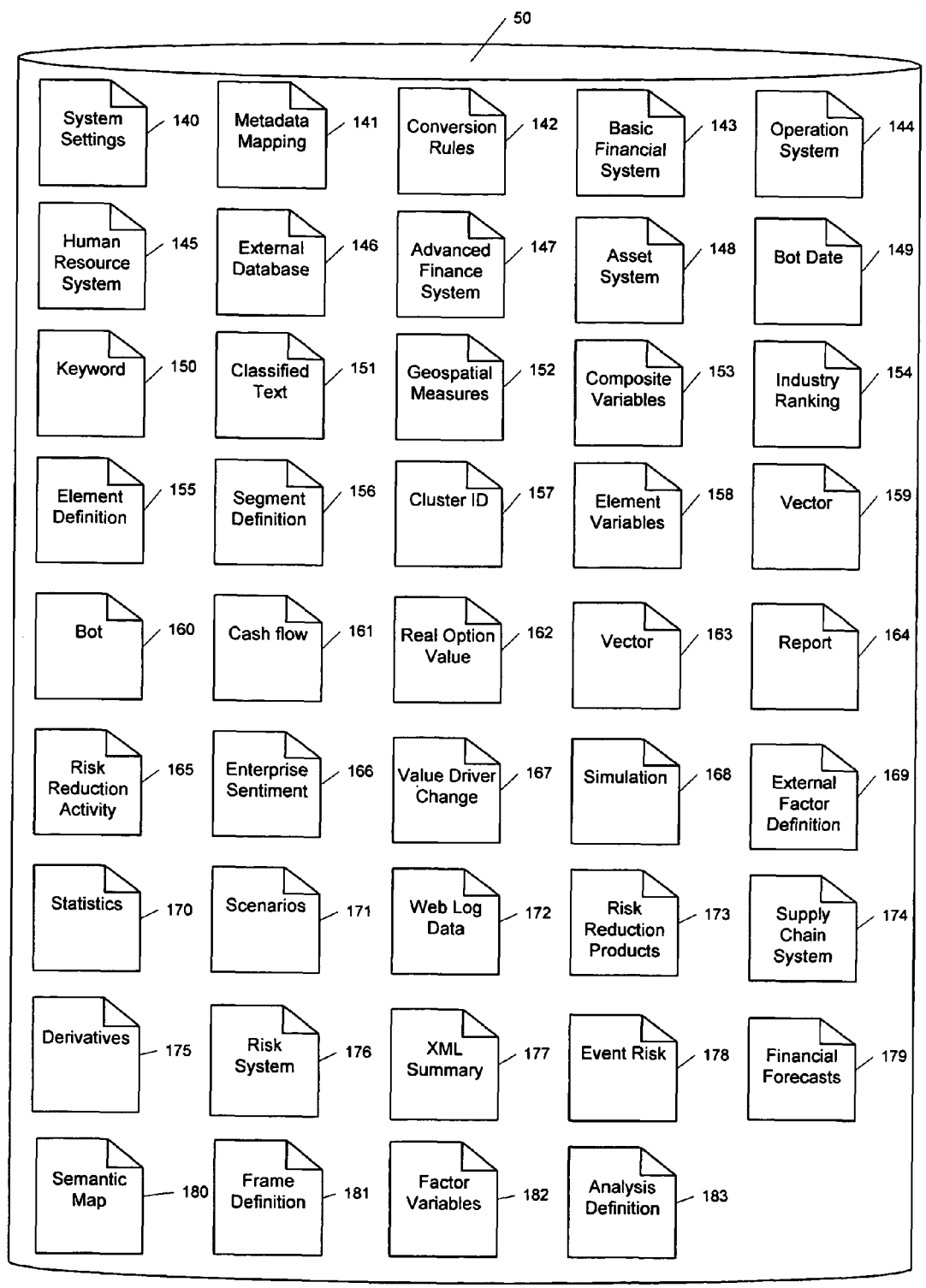
FIG. 2 is a diagram showing the files or tables in the application database (50) of the present invention that are utilized for data storage and retrieval during the processing in the innovative system for multi-enteprise organization analysis and optimization.

All extracted information is stored in a file or table (hereinafter, table) within an application database (50) as shown in FIG. 2. The application database (50) contains tables for storing user input, extracted information and system calculations including a system settings table (140), a metadata mapping table (141), a conversion rules table (142), a basic financial system table (143), an operation system table (144), a human resource system table (145), an external database table (146), an advanced finance system table (147), a asset system table (148), a bot date table (149), a keyword table (150), a classified text table (151), a geospatial measures table (152), a composite variables table (153), an industry ranking table (154), an element definition table (155), a segment definition table (156), a cluster ID table (157), an element variables table (158), a vector table (159), a bot table (160), a cash flow table (161), a real option value table (162), a vector table (163), a report table (164), an risk reduction purchase table (165), an enterprise sentiment table (166), a value driver change table (167), a simulation table (168), an external factor definition table (169), a statistics table (170), a scenarios table (171), a web log data table (172), a risk reduction products table (173), a supply chain system table (174), an optimal mix table (175), a risk system table (176), an xml summary table (177), a generic risk table (178), a financial forecasts table (179), a semantic map table (180), a frame definition table (181) a factor variables table (182) and an analysis definition table (183). The application database (50) can optionally exist as a datamart, data warehouse or storage area network. The system of the present invention has the ability to accept and store supplemental or primary data directly from user input, a data warehouse or other electronic files in addition to receiving data from the databases described previously. The system of the present invention also has the ability to complete the necessary calculations without receiving data from one or more of the specified databases. However, in one embodiment all information is obtained from the specified data sources (5, 10, 12, 15, 17, 25, 30, 35, 37 and 40) for each enterprise in the organization.

Figure 3:
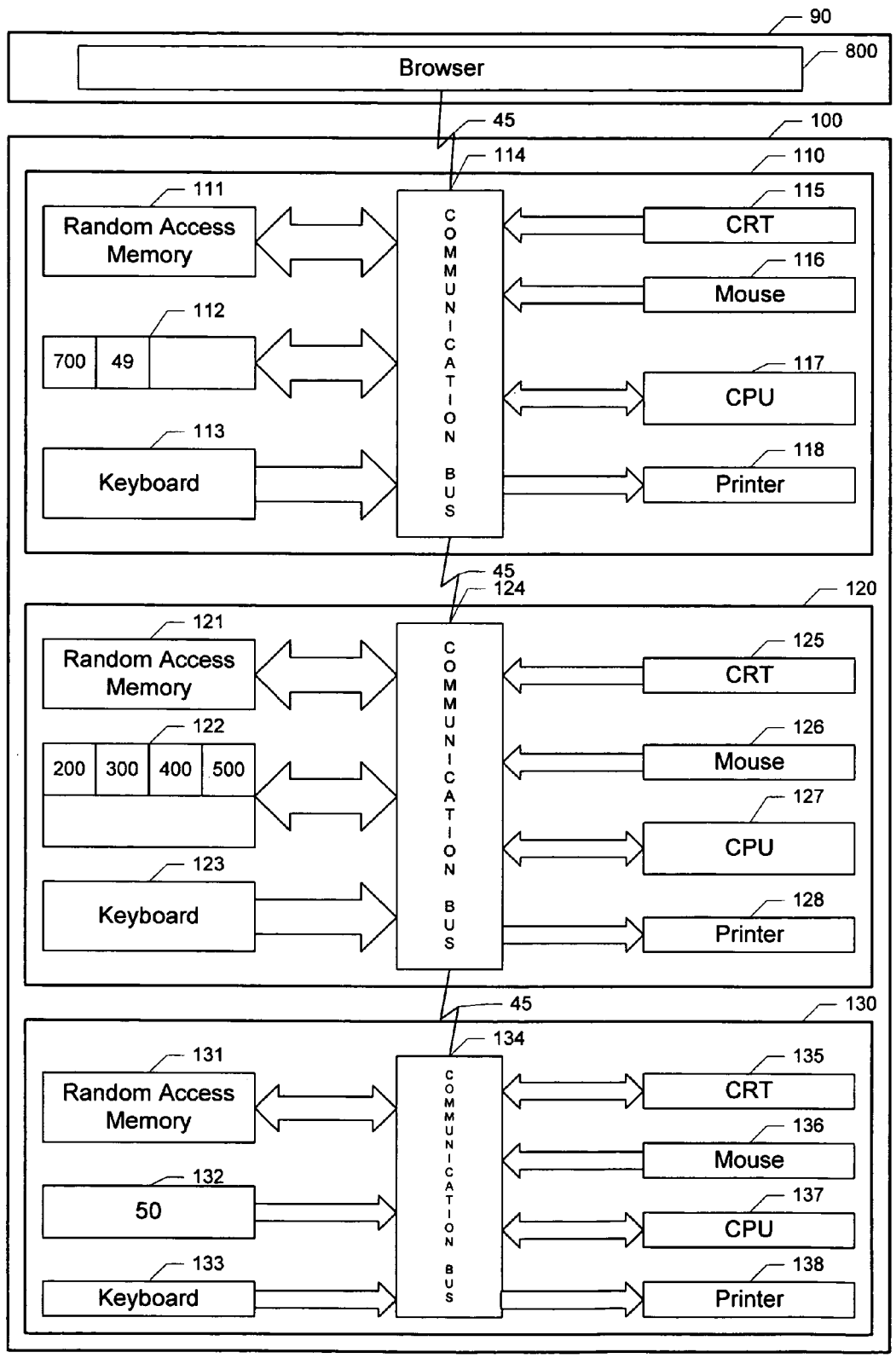
FIG. 3 is a block diagram of an implementation of the present invention.
Figure 4:
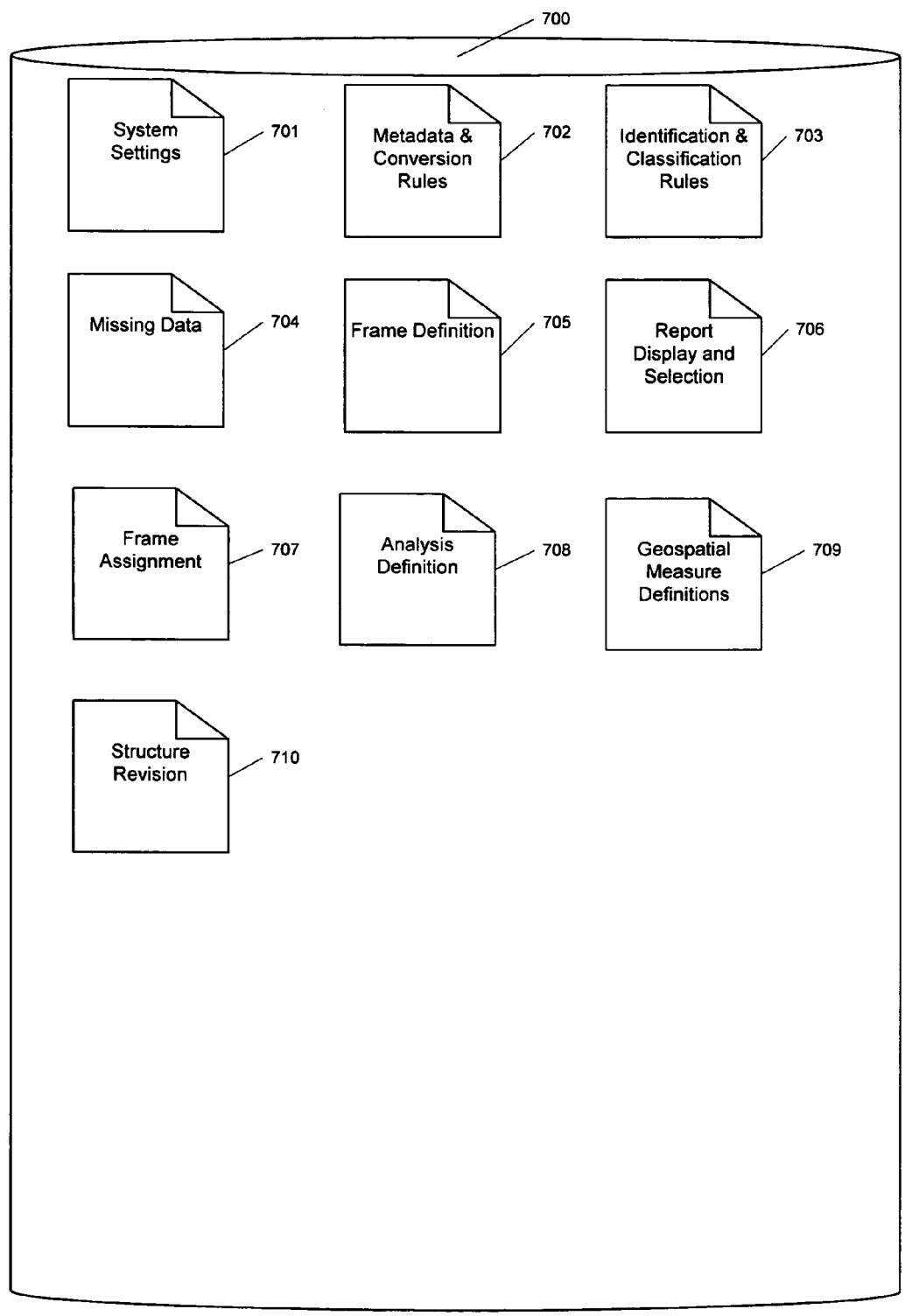
FIG. 4 is a diagram showing the data windows that are used for receiving information from and transmitting information to the user (20) during system processing.
Figure 5B:
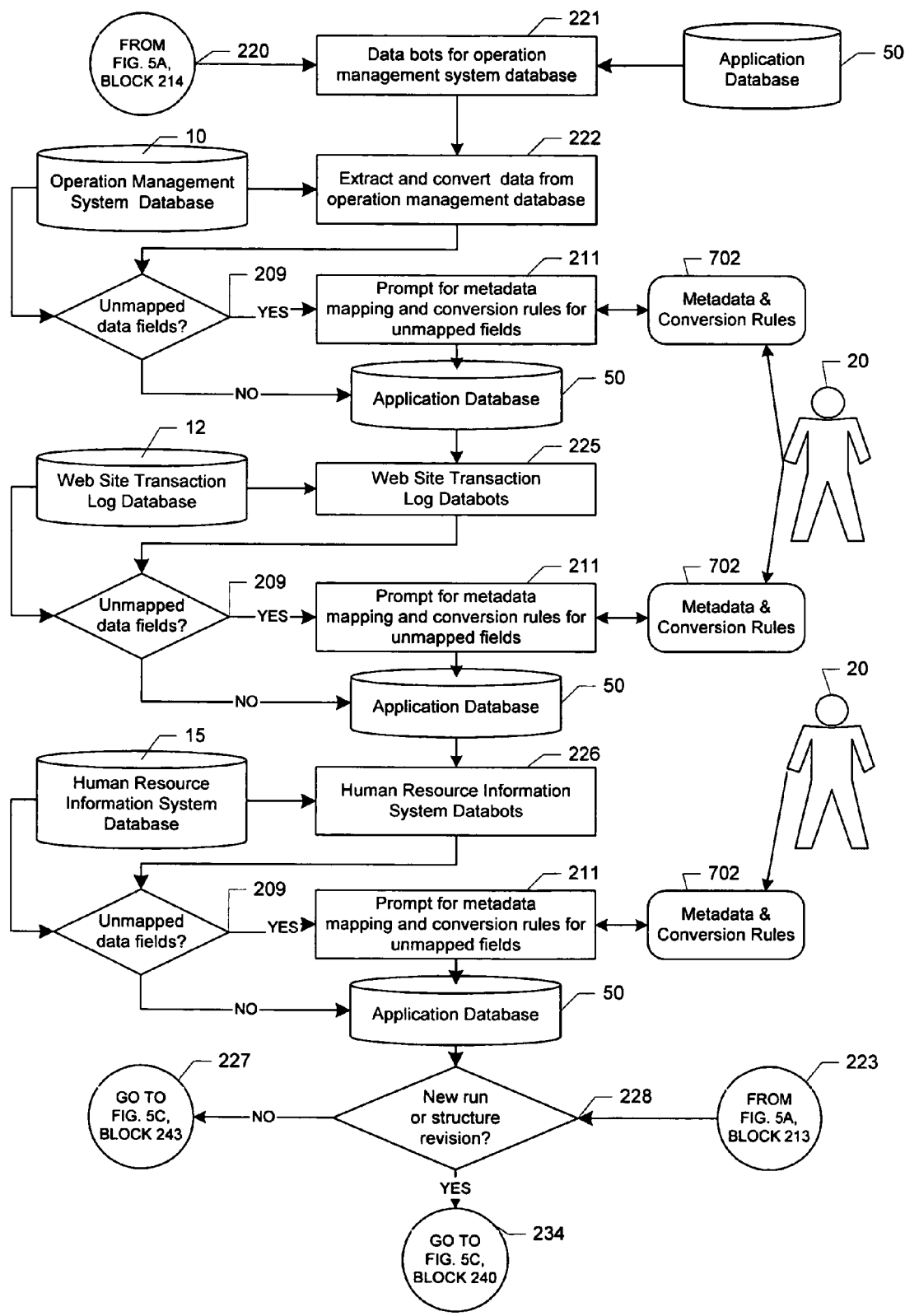
Figure 5C:
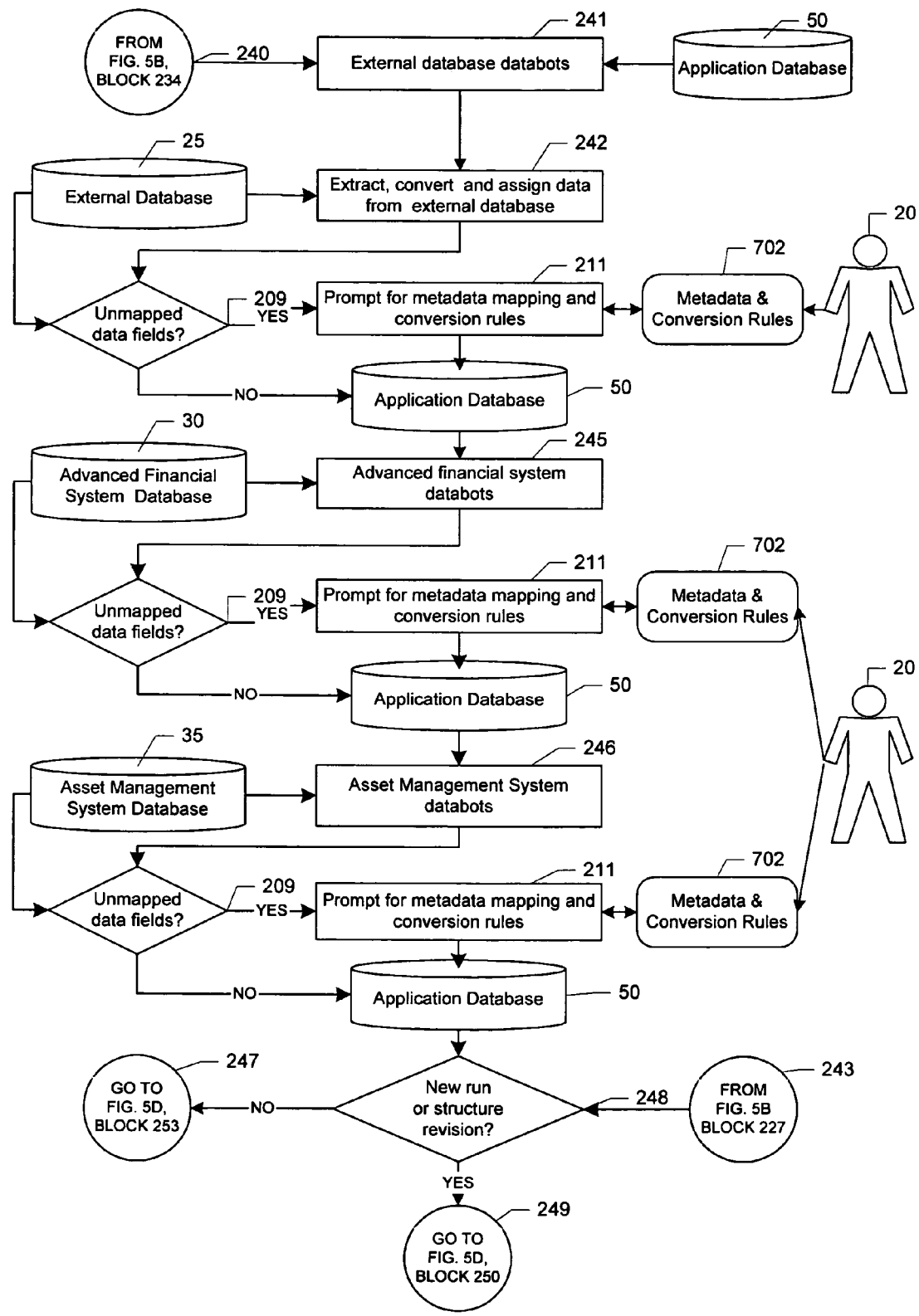
Figure 5D:
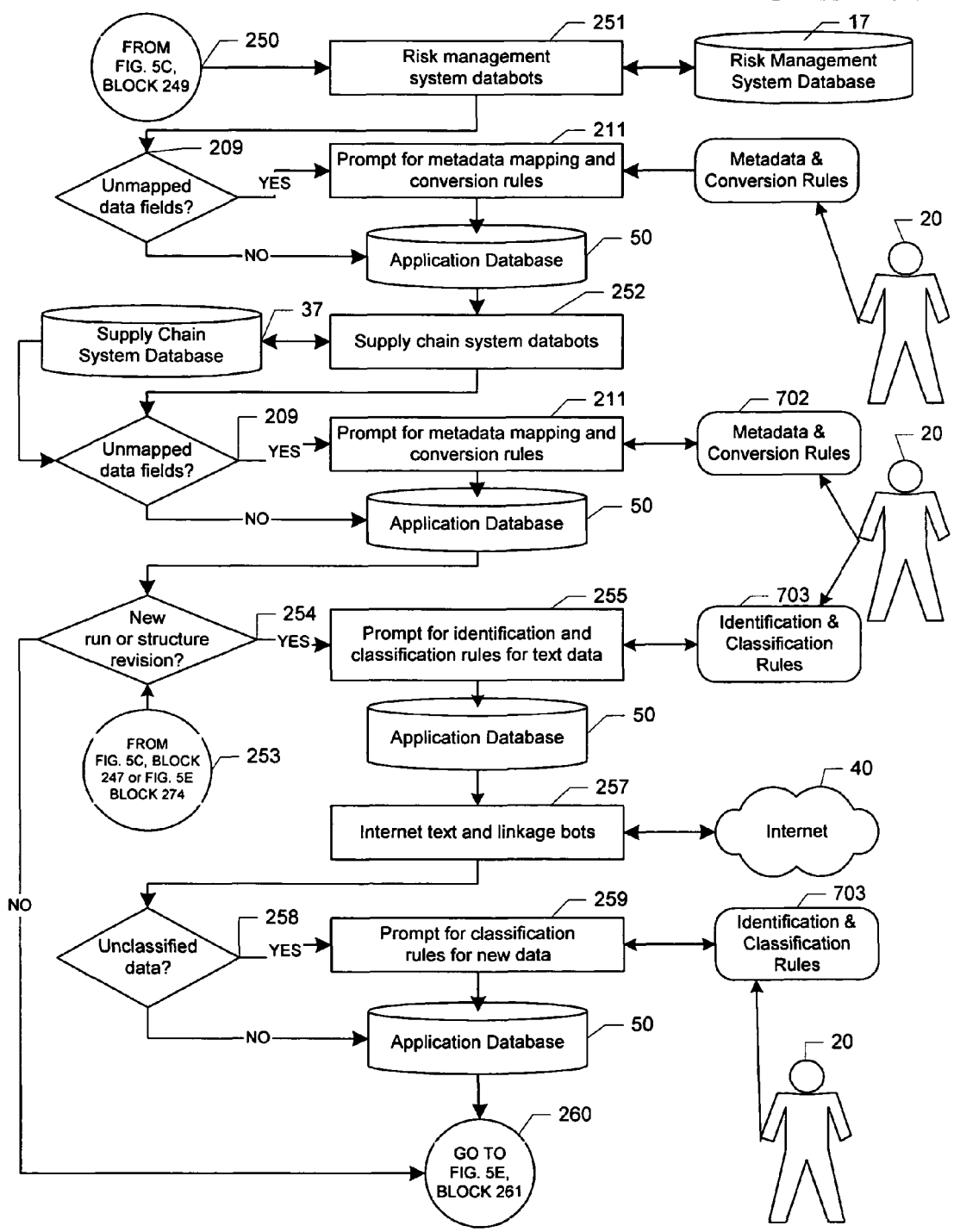
Figure 5E:
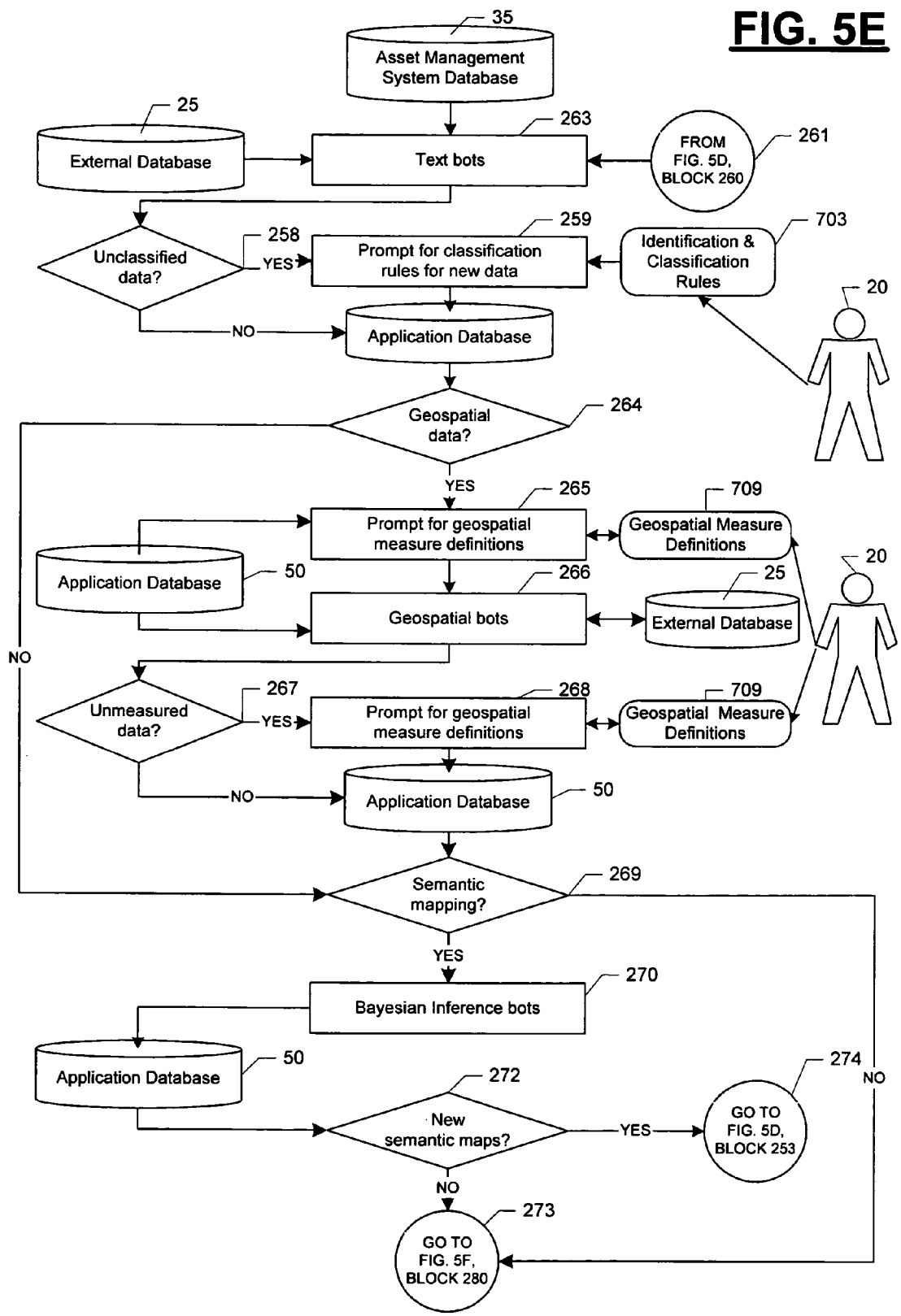
Figure 5F:
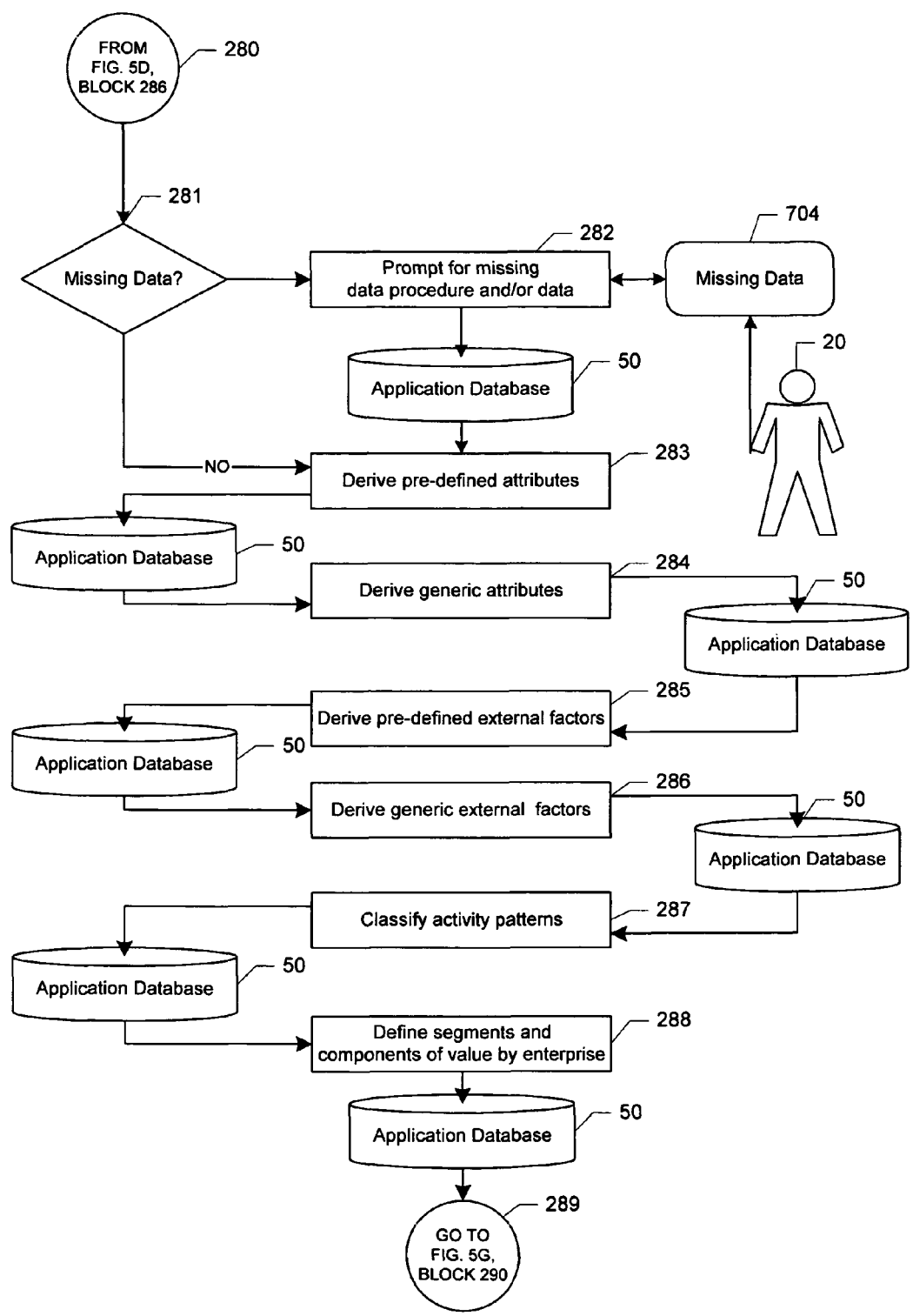
Figure 5G:
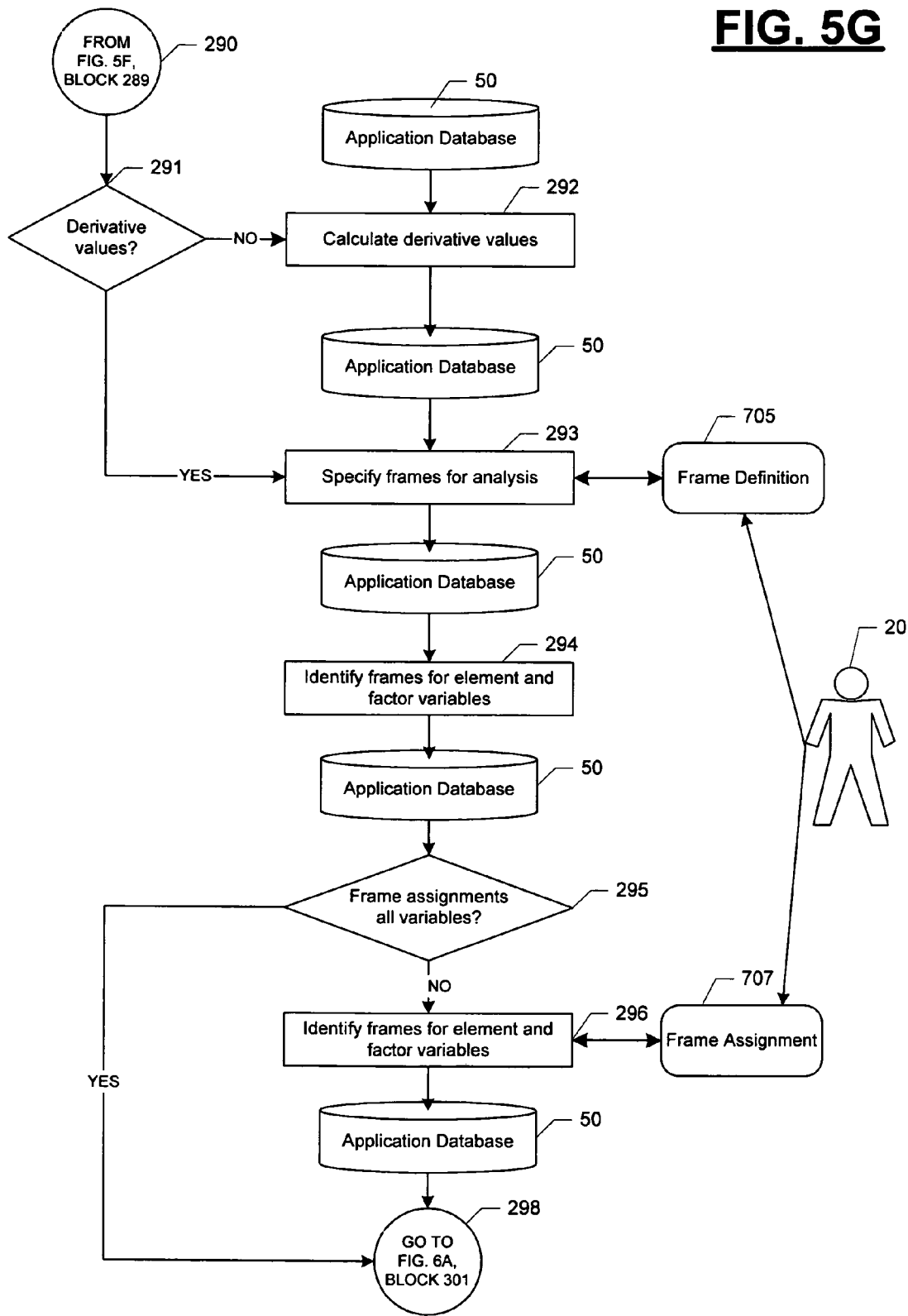

As shown in FIG. 3, one embodiment of the present invention is a computer system (100) illustratively comprised of a user-interface personal computer (110) connected to an application-server personal computer (120) via a network (45). The application server personal computer (120) is in turn connected via the network (45) to a database-server personal computer (130). The user interface personal computer (110) is also connected via the network (45) to an Internet browser appliance (90) that contains browser software (800) such as Microsoft Internet Explorer or Netscape Navigator.

The database-server personal computer (130) has a read/write random access memory (131), a hard drive (132) for storage of the application database (50), a keyboard (133), a communications bus (134), a display (135), a mouse (136), a CPU (137) and a printer (138).

The application-server personal computer (120) has a read/write random access memory (121), a hard drive (122) for storage of the non-user-interface portion of the enterprise section of the application software (200, 300 and 400) of the present invention, a keyboard (123), a communications bus (124), a display (125), a mouse (126), a CPU (127) and a printer (128). While only one client personal computer is shown in FIG. 3, it is to be understood that the application-server personal computer (120) can be networked to fifty or more client, user-interface personal computers (110) via the network (45). The application-server personal computer (120) can also be networked to fifty or more server, personal computers (130) via the network (45). It is to be understood that the diagram of FIG. 3 is merely illustrative of one embodiment of the present invention.

The user-interface personal computer (110) has a read/write random access memory (111), a hard drive (112) for storage of a client data-base (49) and the user-interface portion of the application software (700), a keyboard (113), a communications bus (114), a display (115), a mouse (116), a CPU (117) and a printer (118).

The application software (200, 300 and 400) controls the performance of the central processing unit (127) as it completes the calculations that support the production of the matrices of value and risk for a commercial enterprise. In the embodiment illustrated herein, the application software program (200, 300, 400 and 500 is written in a combination of C++, Java and Visual Basic®. The application software (200, 300, 400, and 500) can use Structured Query Language (SQL) for extracting data from the databases and the Internet (5, 10, 12, 15, 17, 25, 30, 35, 37 and 40). The user (20) can optionally interact with the user-interface portion of the application software (700) using the browser software (800) in the browser appliance (90) to provide information to the application software (200, 300, 400 and 500) for use in determining which data will be extracted and transferred to the application database (50) by the data bots.

User input is initially saved to the client database (49) before being transmitted to the communication bus (124) and on to the hard drive (122) of the application-server computer via the network (45). Following the program instructions of the application software, the central processing unit (127) accesses the extracted data and user input by retrieving it from the hard drive (122) using the random access memory (121) as computation workspace in a manner that is well known.

The computers (110, 120, 130 and 139) shown in FIG. 3 illustratively are IBM PCs or clones or any of the more powerful computers or workstations that are widely available. Typical memory configurations for client personal computers (110) used with the present invention should include at least 512 megabytes of semiconductor random access memory (111) and at least a 100 gigabyte hard drive (112). Typical memory configurations for the application-server personal computer (120) used with the present invention should include at least 2056 megabytes of semiconductor random access memory (121) and at least a 250 gigabyte hard drive (122). Typical memory configurations for the database-server personal computer (130) used with the present invention should include at least 4112 megabytes of semiconductor random access memory (131) and at least a 500 gigabyte hard drive (132).

Using the system described above the matrices of value and risk for a multi-enterprise organization are produced after the elements of value and external factors are analyzed by segment of value for each enterprise in the organization using the approach outlined in Table 2.

As shown in Table 2, the value of the current-operation for each enterprise will be calculated using an income valuation. An integral part of most income valuation models is the calculation of the present value of the expected cash flows, income or profits associated with the current-operation. The present value of a stream of cash flows is calculated by discounting the cash flows at a rate that reflects the risk associated with realizing the cash flow. For example, the present value (PV) of a cash flow of ten dollars ($10) per year for five (5) years would vary depending on the rate used for discounting future cash flows as shown below.

Discount rate = 25%

$$PV = \frac{10}{1.25} + \frac{10}{(1.25)^2} + \frac{10}{(1.25)^3} + \frac{10}{(1.25)^4} + \frac{10}{(1.25)^5} = 26.89$$

Discount rate = 35%

$$PV = \frac{10}{1.35} + \frac{10}{(1.35)^2} + \frac{10}{(1.35)^3} + \frac{10}{(1.35)^4} + \frac{10}{(1.35)^5} = 22.20$$

One of the first steps in evaluating the elements of current-operation value is extracting the data for completing calculations in accordance with the formula that defines the value of the current-operation as shown in Table 4.

TABLE 4

Value of current-operation =

(R) Value of forecast revenue from current-operation (positive) +
(E) Value of forecast expense for current-operation (negative) +
(C)* Value of current operation capital change forecast

*Note:
(C) can have a positive or negative value

The three components of current-operation value will be referred to as the revenue value (R), the expense value (E) and the capital value (C). Examination of the equation in Table 4 shows that there are four ways to increase the value of the current-operation—increase the revenue, decrease the expense, decrease the capital requirements or decrease the interest rate used for discounting future cash flows. As a simplification, the value of the current operation could be calculated from the cash flow which is revenue (a positive number) plus expense (a negative number) and the change in capital (a positive or negative number). A slight adjustment to this basic equation would be required to remove the non-cash depreciation and amortization. The detailed analysis by component of value is utilized in one embodiment.

In one embodiment, the revenue, expense and capital requirement forecasts for the current operation, the real options and the contingent liabilities are obtained from an advanced financial planning system database (30) derived from an advanced financial planning system similar to the one disclosed in U.S. Pat. No. 5,615,109. The extracted revenue, expense and capital requirement forecasts are used to calculate a cash flow for each period covered by the forecast for the enterprise by subtracting the expense and change in capital for each period from the revenue for each period. A steady state forecast for future periods is calculated after determining the steady state growth rate that best fits the calculated cash flow for the forecast time period. The steady state growth rate is used to calculate an extended cash flow forecast. The extended cash flow forecast is used to determine the Competitive Advantage Period (CAP) implicit in the enterprise market value.

While it is possible to use analysis bots to sub-divide each of the components of current operation value into a number of sub-components for analysis, one embodiment has a predetermined number of sub-components for each component of value for the enterprise. The revenue value is not subdivided. In one embodiment, the expense value is subdivided into five sub-components: the cost of raw materials, the cost of manufacture or delivery of service, the cost of selling, the cost of support and the cost of administration. The capital value is subdivided into six sub-components: cash, non-cash financial assets, production equipment, other assets (non financial, non production assets), financial liabilities and equity. The components and sub-components of current-operation value will be used in valuing the current operation portion of the elements and sub-elements of value for each enterprise.

For the calculations completed by the present invention, a transaction will be defined as any event that is logged or recorded. Transaction data is any data related to a transaction. Descriptive data is any data related to any item, segment of value, element of value, component of value or external factor that is logged or recorded. Descriptive data includes forecast data and other data calculated by the system of the present invention. An element of value will be defined as "an entity or group that as a result of past transactions, forecasts or other data has provided and/or is expected to provide economic benefit to the enterprise." An item will be defined as a single member of the group that defines an element of value. For example, an individual salesman would be an "item" in the "element of value" sales staff. It is possible to have only one item in an element of value. The transaction data and descriptive data associated with an item or related group of items will be referred to as "item variables". Data derived from transaction data and/or descriptive data are referred to as an item performance indicators. Composite variables for an element are mathematical or logical combinations of item variables and/or item performance indicators. The item variables, item performance indicators and composite variables for a specific element or sub-element of value can be referred to as element variables or element data. External factors are numerical indicators of: conditions or prices external to the enterprise and conditions or performance of the enterprise compared to external expectations of conditions or performance. The transaction data and descriptive data associated with external factors will be referred to as "factor variables". Data derived from factor transaction data and/or descriptive data are referred to as factor performance indicators. Composite factors for a factor are mathematical or logical combinations of factor variables and/or factor performance indicators. The factor variables, factor performance indicators and composite factors for external factors can be referred to as factor data.

A value chain is defined to be the enterprises that have joined together to deliver a product and/or a service to a customer. Consistent with the practice outlined in the cross-referenced patents and applications, an enterprise is a commercial enterprise with one revenue component of value (note: as detailed in the related patents and applications a commercial enterprise can have more than one revenue component of value). A multi company corporation is a corporation that participates in more than one distinct line of business. As discussed previously, value chains and multi company corporations are both multi-enterprise organizations. Partnerships between government agencies and private companies and/or other government agencies can also be analyzed as multi-enterprise organizations using the system of the present invention.

Analysis bots are used to determine element of value lives and the percentage of: the revenue value, the expense value, and the capital value that are attributable to each element of value by enterprise. The resulting values are then added together to determine the valuation for different elements as shown by the example in Table 5.

TABLE 5

| Gross Value | Percentage | Element Life/CAP* | Net Value |
|---|---|---|---|
| Revenue value = $120 M | 20% | 80% | Value = $19.2 M |
| Expense value = ($80 M) | 10% | 80% | Value = ($6.4) M |
| Capital value = ($5 M) | 5% | 80% | Value = ($0.2) M |
| Total value = $35 M | | | |
| Net value for this element: | | | Value = $12.6 M |

*CAP = Competitive Advantage Period

Figure 6A:
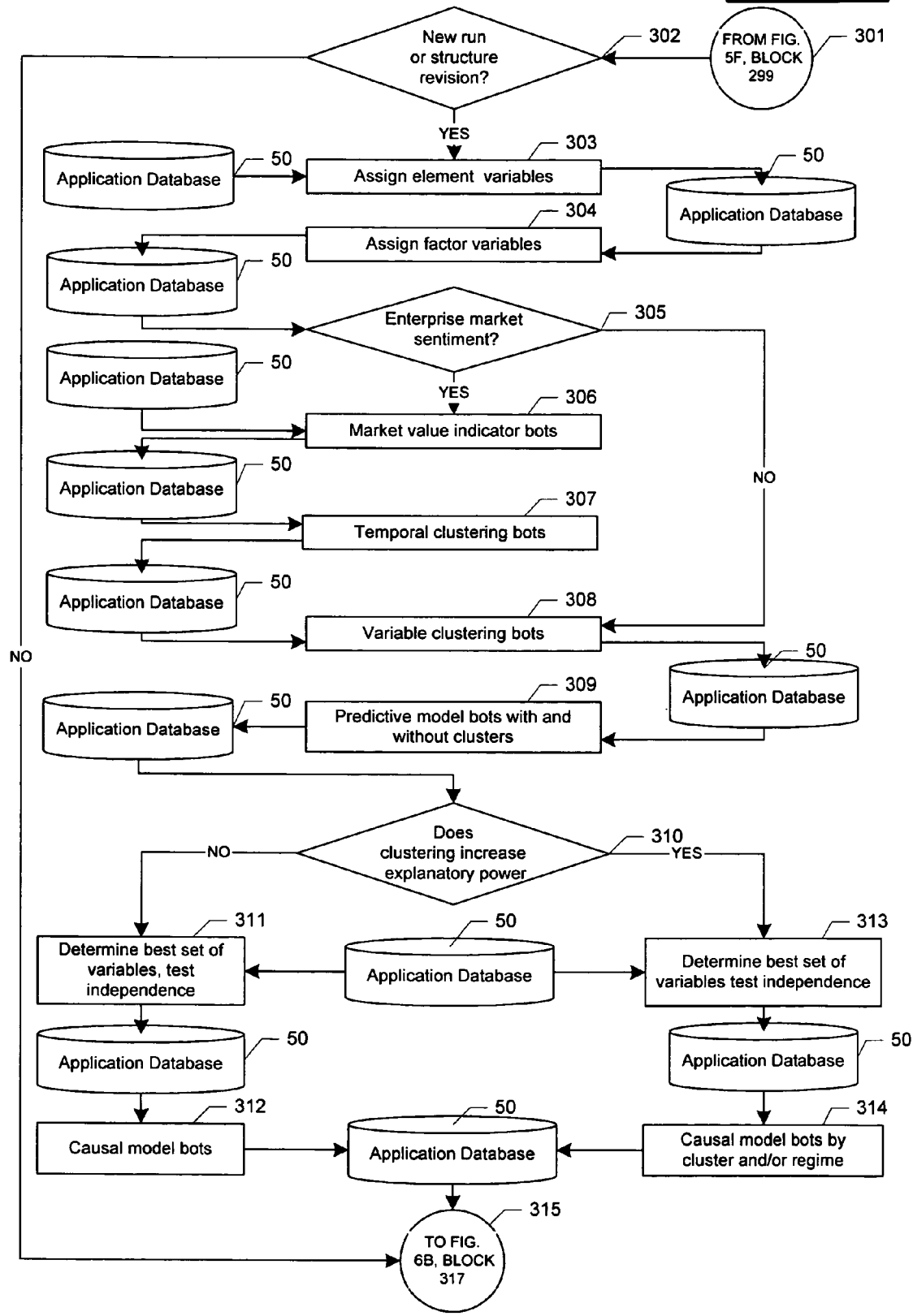
FIG. 6A, FIG. 6B and FIG. 6C are block diagrams showing the sequence of steps in the present invention used for analyzing the value associated with the organization by enterprise.
Figure 6B:
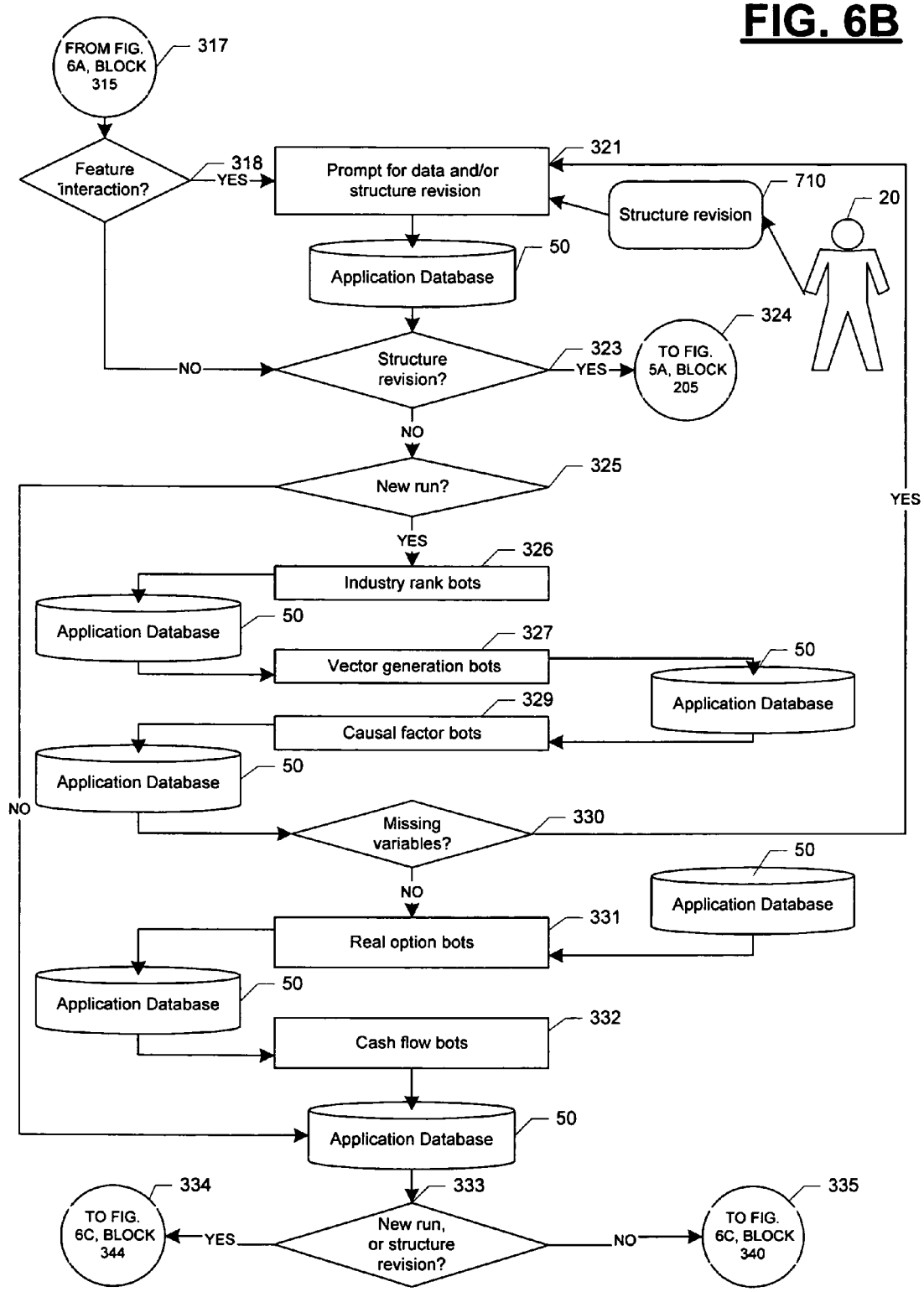
Figure 6C:
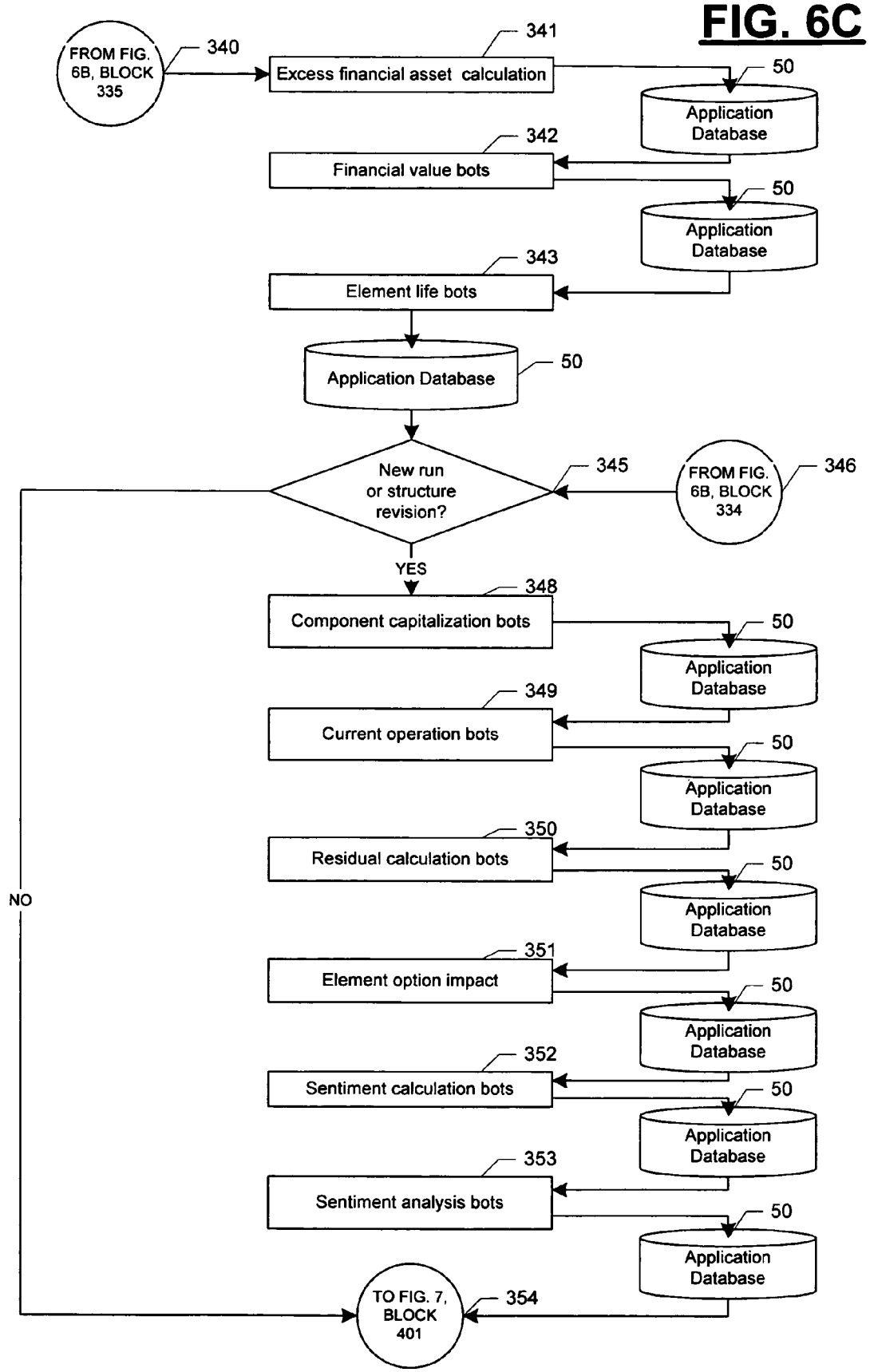

The development of the matrices of value and risk for the organization is completed in four distinct stages. As shown in FIG. 5A, FIG. 5B, FIG. 5C, FIG. 5D, FIG. 5E, FIG. 5F and FIG. 5G the first stage of processing (block 200 from FIG. 1) programs bots to continually extract, aggregate, manipulate and store the data from user input, databases and the Internet (5, 10, 12, 15, 17, 25, 30, 35, 37 and 40) to support the analysis of business value and risk by enterprise. Bots are independent components of the application that have specific tasks to perform. As shown in FIG. 6A, FIG. 6B and FIG. 6C the second stage of processing (block 300 from FIG. 1) continually values the segments of value and generates a matrix quantifying the impact of elements of value and external factors on the segments of value by enterprise (see FIG. 9) by creating and activating analysis bots to:

1. Identify the factor variables, factor performance indicators and composite variables that characterize each external factors impact on: the current operation, derivative and excess financial asset segments of value by enterprise,
2. Identify the item variables, item performance indicators and composite variables for each element and sub-element of value that characterize the elements performance in driving: the current operation, derivative and excess financial asset segments of value by enterprise,
3. Create vectors that summarize the item variables, item performance indicators and composite variables that define the impact of each element of value and sub-element of value,
4. Create vectors that summarize the factor variables, factor performance indicators and composite variables that define the impact of each external factor,
5. Determine the expected life of each element of value and sub-element of value;
6. Determine the value of the current operation, excess financial assets and derivatives;
7. Determine the appropriate discount rate on the basis of relative causal element strength, value the enterprise real options and contingent liabilities and determine the contribution of each element of value to real option valuation;
8. Determine the best indicator for stock price movement, calculate market sentiment and analyze the causes of market sentiment;
9. Combine the results of the prior stages of processing to determine the value of each external factor, element of value and sub-element of value by segment for each enterprise; and
10. Sum the results from all the enterprises to calculate the overall organization value.

The third stage of processing (block 400 from FIG. 1) analyzes the risks faced by each enterprise under normal and extreme conditions as part of the process of developing the matrix of risk (see FIG. 10) for the organization before defining the efficient frontier for financial performance. The fourth and final stage of processing (block 500 from FIG. 1) displays the matrix of value, the matrix of risk and the efficient frontier for the organization and analyzes the impact of changes in structure and/or operation on the financial performance of the multi-enterprise organization.

System Settings and Data Bots

The flow diagrams in FIG. 5A, FIG. 5B, FIG. 5C, FIG. 5D, FIG. 5E, FIG. 5F and FIG. 5G detail the processing that is completed by the portion of the application software (200) that extracts, aggregates, transforms and stores the information used in system operation from the: basic financial system database (5), operation management system database (10), the web site transaction log database (12), human resource information system database (15), risk management system database (17), external database (25), advanced financial system database (30), asset management system database (35), the supply chain system database (37), the Internet (40) and the user (20) by enterprise. A brief overview of the different databases will be presented before reviewing each step of processing completed by this portion (200) of the application software.

Corporate financial software systems are generally divided into two categories, basic and advanced. Advanced financial systems utilize information from the basic financial systems to perform financial analysis, financial planning and financial reporting functions. Virtually every commercial enterprise uses some type of basic financial system, as they are required to use these systems to maintain books and records for income tax purposes. An increasingly large percentage of these basic financial systems are resident in microcomputer and workstation systems. Basic financial systems include general-ledger accounting systems with associated accounts receivable, accounts payable, capital asset, inventory, invoicing, payroll and purchasing subsystems. These systems incorporate worksheets, files, tables and databases. These databases, tables and files contain information about the enterprise operations and its related accounting transactions. As will be detailed below, these databases, tables and files are accessed by the application software of the present invention in order to extract the information used for completing system calculations. The system is also capable of extracting information from a data warehouse (or datamart) when data and information has been pre-loaded into the warehouse.

General ledger accounting systems generally store only valid accounting transactions. As is well known, valid accounting transactions consist of a debit component and a credit component where the absolute value of the debit component is equal to the absolute value of the credit component. The debits and the credits are posted to the separate accounts maintained within the accounting system. Every basic accounting system has several different types of accounts. The effect that the posted debits and credits have on the different accounts depends on the account type as shown in Table 6.

TABLE 6

| Account Type: | Debit Impact: | Credit Impact: |
| --- | --- | --- |
| Asset | Increase | Decrease |
| Revenue | Decrease | Increase |
| Expense | Increase | Decrease |
| Liability | Decrease | Increase |
| Equity | Decrease | Increase |

General ledger accounting systems also require that the asset account balances equal the sum of the liability account balances and equity account balances at all times.

The general ledger system generally maintains summary, dollar only transaction histories and balances for all accounts while the associated subsystems, accounts payable, accounts receivable, inventory, invoicing, payroll and purchasing, maintain more detailed historical transaction data and balances for their respective accounts. It is common practice for each subsystem to maintain the detailed information shown in Table 7 for each transaction.

TABLE 7

| Subsystem | Detailed Information |
| --- | --- |
| Accounts Payable | Vendor, Item(s), Transaction Date, Amount Owed, Due Date, Account Number |

TABLE 7-continued

| Subsystem | Detailed Information |
|---|---|
| Accounts Receivable | Customer, Transaction Date, Product Sold, Quantity, Price, Amount Due, Terms, Due Date, Account Number |
| Capital Assets | Asset ID, Asset Type, Date of Purchase, Purchase Price, Useful Life, Depreciation Schedule, Salvage Value |
| Inventory | Item Number, Transaction Date, Transaction Type, Transaction Qty, Location, Account Number |
| Invoicing | Customer Name, Transaction Date, Product(s) Sold, Amount Due, Due Date, Account Number |
| Payroll | Employee Name, Employee Title, Pay Frequency, Pay Rate, Account Number |
| Purchasing | Vendor, Item(s), Purchase Quantity, Purchase Price(s), Due Date, Account Number |

As is well known, the output from a general ledger system includes income statements, balance sheets and cash flow statements in well defined formats which assist management in measuring the financial performance of the firm during the prior periods when data input and system processing have been completed.

While basic financial systems are similar between firms, operation management systems vary widely depending on the type of company they are supporting. These systems typically have the ability to not only track historical transactions but to forecast future performance. For manufacturing firms, operation management systems such as Enterprise Resource Planning Systems (ERP), Material Requirement Planning Systems (MRP), Purchasing Systems, Scheduling Systems and Quality Control Systems are used to monitor, coordinate, track and plan the transformation of materials and labor into products. Systems similar to the one described above may also be useful for distributors to use in monitoring the flow of products from a manufacturer.

Operation Management Systems in manufacturing firms may also monitor information relating to the production rates and the performance of individual production workers, production lines, work centers, production teams and pieces of production equipment including the information shown in Table 8.

TABLE 8

Operation Management System - Production Information

1. ID number (employee id/machine id)
2. Actual hours - last batch
3. Standard hours - last batch
4. Actual hours - year to date
5. Actual/Standard hours - year to date %
6. Actual setup time - last batch
7. Standard setup time - last batch
8. Actual setup hours - year to date
9. Actual/Standard setup hrs - yr to date %
10. Cumulative training time
11. Job(s) certifications
12. Actual scrap - last batch
13. Scrap allowance - last batch
14. Actual scrap/allowance - year to date
15. Rework time/unit last batch
16. Rework time/unit year to date
17. QC rejection rate - batch
18. QC rejection rate - year to date Operation management systems are also useful for tracking requests for service to repair equipment in the field or in a centralized repair facility. Such systems generally store information similar to that shown below in Table 9.

TABLE 9

Operation Management System - Service Call Information

1. Customer name
2. Customer number
3. Contract number
4. Service call number
5. Time call received
6. Product(s) being fixed
7. Serial number of equipment
8. Name of person placing call
9. Name of person accepting call
10. Promised response time
11. Promised type of response
12. Time person dispatched to call
13. Name of person handling call
14. Time of arrival on site
15. Time of repair completion
16. Actual response type
17. Part(s) replaced
18. Part(s) repaired
19. 2nd call required
20. 2nd call number Web site transaction log databases keep a detailed record of every visit to a web site, they can be used to trace the path of each visitor to the web site and upon further analysis can be used to identify patterns that are most likely to result in purchases and those that are most likely to result in abandonment. This information can also be used to identify which promotion would generate the most value for the enterprise using the system. Web site transaction logs generally contain the information shown in Table 10.

TABLE 10

Web Site Transaction Log Database

1. Customer's URL
2. Date and time of visit
3. Pages visited
4. Length of page visit (time)
5. Type of browser used
6. Referring site
7. URL of site visited next
8. Downloaded file volume and type
9. Cookies
10. Transactions Computer based human resource systems may some times be packaged or bundled within enterprise resource planning systems such as those available from SAP, Oracle and Peoplesoft. Human resource systems are increasingly used for storing and maintaining corporate records concerning active employees in sales, operations and the other functional specialties that exist within a modern corporation. Storing records in a centralized system facilitates timely, accurate reporting of overall manpower statistics to the corporate management groups and the various government agencies that require periodic updates. In some cases, human resource systems include the enterprise payroll system as a subsystem. In one embodiment of the present invention, the payroll system is part of the basic financial system. These systems can also be used for detailed planning regarding future manpower requirements. Human resource systems typically incorporate worksheets, files, tables and databases that contain information about the current and future employees. As will be detailed below, these databases, tables and files are accessed by the application software of the present invention in order to extract the information used in completing a business optimization analysis. It is common practice for human resource systems to store the information shown in Table 11 for each employee.

TABLE 11

Human Resource System Information

1. Employee name
2. Job title
3. Job code
4. Rating
5. Division
6. Department
7. Employee No./(Social Security Number)
8. Year to date - hours paid
9. Year to date - hours worked
10. Employee start date - enterprise
11. Employee start date - department
12. Employee start date - current job
13. Training courses completed
14. Cumulative training expenditures
15. Salary history
16. Current salary
17. Educational background
18. Current supervisor Risk management systems databases (17) contain statistical data about the past behavior and forecasts of likely future behavior of interest rates, currency exchange rates weather, commodity prices and key customers (credit risk systems). They also contain detailed information about the composition and mix of risk reduction products (derivatives, insurance, etc.) the enterprise has purchased. Some companies also use risk management systems to evaluate the desirability of extending or increasing credit lines to customers. The information from these systems is used to supplement the risk information developed by the system of the present invention.

External databases can be used for obtaining information that enables the definition and evaluation of a variety of things including elements of value, external factors, industry real options and event risks. In some cases, information from these databases can be used to supplement information obtained from the other databases and the Internet (5, 10, 12, 15, 17, 30, 35, 37 and 40). In the system of the present invention, the information extracted from external databases (25) can be in the forms listed in Table 12.

TABLE 12

Types of information 1) numeric information such as that found in the SEC Edgar database and the databases of financial infomediaries such as FirstCall, IBES and Compustat,
2) text information such as that found in the Lexis Nexis database and databases containing past issues from specific publications,
3) risk management products such as derivatives, swaps and standardized insurance contracts that can be purchased on line,
4) geospatial data;
5) multimedia information such as video and audio clips, and
6) event risk data including information about the likelihood of earthquake and weather damage by geospatial location and information about the likelihood of property and casualty losses that can be determined in part by the industry the enterprise is a member of (i.e. coal mining, broadcasting, legal, etc.)

The system of the present invention uses different "bot" types to process each distinct data type from external databases (25). The same "bot types" are also used for extracting each of the different types of data from the Internet (40). The system of the present invention must have access to at least one external database (25) that provides information regarding the equity prices for each enterprise and the equity prices and financial performance of the competitors for each enterprise.

Advanced financial systems may also use information from external databases (25) and the Internet (40) in completing their processing. Advanced financial systems include financial planning systems and activity based costing systems. Activity based costing systems may be used to supplement or displace the operation of the expense component analysis segment of the present invention. Financial planning systems generally use the same format used by basic financial systems in forecasting income statements, balance sheets and cash flow statements for future periods. Management uses the output from financial planning systems to highlight future financial difficulties with a lead time sufficient to permit effective corrective action and to identify problems in enterprise operations that may be reducing the profitability of the business below desired levels. These systems are most often developed by individuals within companies using two and three-dimensional spreadsheets such as Lotus 1-2-3®, Microsoft Excel® and Quattro Pro®. In some cases, financial planning systems are built within an executive information system (EIS) or decision support system (DSS). For one embodiment of the present invention, the advanced finance system database is similar to the financial planning system database detailed in U.S. Pat. No. 5,165,109 for "Method of and System for Generating Feasible, Profit Maximizing Requisition Sets", by Jeff S. Eder, the disclosure of which is incorporated herein by reference.

While advanced financial planning systems have been around for some time, asset management systems are a relatively recent development. Their appearance is further proof of the increasing importance of "soft" assets. Asset management systems include: customer relationship management systems, partner relationship management systems, channel management systems, knowledge management systems, visitor relationship management systems, intellectual property management systems, investor management systems, vendor management systems, alliance management systems, process management systems, brand management systems, workforce management systems, human resource management systems, email management systems, IT management systems and/or quality management systems. Asset management systems are similar to operation management systems in that they generally have the ability to forecast future events as well as track historical occurrences. Many have also added analytical capabilities that allow them to identify trends and patterns in the data associated with the asset they are managing. Customer relationship management systems are the most well established asset management systems at this point and will be the focus of the discussion regarding asset management system data. In firms that sell customized products, the customer relationship management system is generally integrated with an estimating system that tracks the flow of estimates into quotations, orders and eventually bills of lading and invoices. In other firms that sell more standardized products, customer relationship management systems generally are used to track the sales process from lead generation to lead qualification to sales call to proposal to acceptance (or rejection) and delivery. All customer relationship management systems would be expected to track all of the customer's interactions with the enterprise after the first sale and store information similar to that shown below in Table 13.

TABLE 13

Customer Relationship Management System - Information

1. Customer/Potential customer name
2. Customer number
3. Address
4. Phone number
5. Source of lead
6. Date of first purchase
7. Date of last purchase
8. Last sales call/contact
9. Sales call history
10. Sales contact history
11. Sales history: product/qty/price
12. Quotations: product/qty/price
13. Custom product percentage
14. Payment history
15. Current A/R balance
16. Average days to pay Supply chain systems could be considered as asset management systems as they are used to manage a critical asset—supplier relationships. However, because of their importance and visibility they are listed separately. Supply chain management system databases (37) contain information that may have been in operation management system databases (10) in the past. These systems provide enhanced visibility into the availability of goods and promote improved coordination between customers and their suppliers. All supply chain management systems would be expected to track all of the items ordered by the enterprise after the first purchase and store information similar to that shown below in Table 14.

TABLE 14

Supply Chain Management System Information

1. Stock Keeping Unit (SKU)
2. Vendor
3. Total Quantity on Order
4. Total Quantity in Transit
5. Total Quantity on Back Order
6. Total Quantity in Inventory
7. Quantity available today
8. Quantity available next 7 days
9. Quantity available next 30 days
10. Quantity available next 90 days
11. Quoted lead time
12. Actual average lead time System processing of the information from the different databases (5, 10, 12, 15, 17, 25, 30, 35 and 37) and the Internet (40) described above starts in a block 201, FIG. 5A, which immediately passes processing to a software block 202. The software in block 202 prompts the user (20) via the system settings data window (701) to provide system setting information. The system setting information entered by the user (20) is transmitted via the network (45) back to the application server (120) where it is stored in the system settings table (140) in the application database (50) in a manner that is well known. The specific inputs the user (20) is asked to provide at this point in processing are shown in Table 15.

TABLE 15

1. New calculation or structure revision?
2. Continuous, If yes, new calculation frequency? (hourly, daily, weekly, monthly or quarterly)
3. Structure of organization (enterprises)
4. Structure of enterprise (segments of value, elements of value etc.)
5. Enterprise checklist

TABLE 15-continued

6. Base account structure
7. Base currency
8. Location of account structure
9. Metadata standard
10. Location of basic financial system database and metadata by enterprise
11. Location of advanced finance system database and metadata by enterprise
12. Location of human resource information system database and metadata by enterprise
13. Location of operation management system database and metadata by enterprise
14. Location of asset management system databases and metadata by enterprise
15. Location of external databases and metadata by enterprise
16. Location of web site transaction log database and metadata by enterprise
17. Location of supply chain management system database and metadata by enterprise
18. Location of risk management system database and metadata by enterprise
19. Location of database and metadata for equity information by enterprise
20. Location of database and metadata for debt information by enterprise
21. Location of database and metadata for tax rate information by enterprise
22. Location of database and metadata for currency conversion rate information
23. Geospatial data? If yes, identity of geocoding service.
24. The maximum number of generations to be processed without improving fitness
25. Default clustering algorithm (selected from list) and maximum cluster number
26. Minimum amount of cash and marketable securities required for operations
27. Total cost of capital (weighted average cost of equity, debt and risk capital)
28. Number of months a product is considered new after it is first produced
29. Enterprise industry classification (SIC Code)
30. Primary competitors by industry classification by enterprise
31. Management report types (text, graphic, both)
32. Default Missing Data Procedure
33. Maximum time to wait for user input
34. Maximum discount rate for new projects (real option valuation)
35. Detailed valuation using components of current operation value? (yes or no)
36. Use of industry real options? (yes or no)
37. Maximum number of sub-elements
38. Confidence interval for risk reduction programs
39. Minimum working capital level (optional)
40. Semantic mapping? (yes or no)

The enterprise checklist data are used by a "rules" engine (such as the one available from Neuron Data) in block 202 to influence the number and type of items with pre-defined metadata mapping for each category of value. For example, if the checklist data indicates that the enterprise is focused on branded, consumer markets, then additional brand related factors would be pre-defined for mapping. The application of these system settings will be further explained as part of the detailed explanation of the system operation.

The software in block 202 uses the current system date to determine the time periods (months) data will be used from to complete the calculations. After the date range is calculated it is stored in the system settings table (140). In one embodiment the analysis of enterprise value and risk by the system obtains and utilizes data from every source for the four year period before and the three year forecast period after the specified valuation date and/or the date of system calculation. The user (20) also has the option of specifying the data periods that will be used for completing system calculations.

After the storage of system setting data is complete, processing advances to a software block 203. The software in block 203 prompts the user (20) via the metadata and conversion rules window (702) to map metadata using the standard specified by the user (20) from the basic financial system database (5), the operation management system database (10), the web site transaction log database (12), the human resource information system database (15), the risk management system database (17), the external database (25), the advanced financial system database (30), the asset management system database (35) and the supply chain system database (37) to the enterprise hierarchy stored in the system settings table (140) and to the pre-specified fields in the metadata mapping table (141). Pre-specified fields in the metadata mapping table include the revenue, expense and capital components and sub-components of current operation value for the enterprise and pre-specified fields for expected value drivers by element of value and external factor. Because the bulk of the information being extracted is financial information, the metadata mapping often takes the form of specifying the account number ranges that correspond to the different fields in the metadata mapping table (141). Table 16 shows the base account number structure that the account numbers in the other systems must align with. For example, using the structure shown below, the revenue component for the enterprise could be specified as enterprise 01, any department number, accounts 400 to 499 (the revenue account range) with any sub-account.

TABLE 16

| | Account Number | | | |
|---|---|---|---|---|
| | 01 - | 902 (any) - | 477- | 86 (any) |
| Section | Enterprise | Department | Account | Sub-account |
| Subgroup | Workstation | Marketing | Revenue | Singapore |
| Position | 4 | 3 | 2 | 1 |

As part of the metadata mapping process, any database fields that are not mapped to pre-specified fields are defined by the user (20) as component of value, elements of value or non-relevant attributes and "mapped" in the metadata mapping table (141) to the corresponding fields in each database in a manner identical to that described above for the pre-specified fields. After all fields have been mapped to the metadata mapping table (141), the software in block 203 prompts the user (20) via the metadata and conversion rules window (702) to provide conversion rules for each metadata field for each data source. Conversion rules will include information regarding currency conversions and conversion for units of measure that may be required to accurately and consistently analyze the data. The inputs from the user (20) regarding conversion rules are stored in the conversion rules table (142) in the application database (50). When conversion rules have been stored for all fields from every data source, then processing advances to a software block 204.

The software in block 204 checks the system settings table (140) in the application database (50) to determine if the current calculation is a new calculation or a structure change. The calculation (or run) may be new because the system is running for first time or it may be because the sytem is running continuously and it is now time for a new calculation to be completed. If the calculation is not a new calculation or a structure change then processing advances to a software block 212. Alternatively, if the calculation is new or a structure change, then processing advances to a software block 207.

The software in block 207 checks the bot date table (149) and deactivates any basic financial system data bots with creation dates before the current system date and retrieves information from the system settings table (140), metadata mapping table (141) and conversion rules table (142). The software in block 207 then initializes data bots for each field in the metadata mapping table (141) that mapped to the basic financial system database (5) in accordance with the frequency specified by user (20) in the system settings table (140). Bots are independent components of the application that have specific tasks to perform. In the case of data acquisition bots, their tasks are to extract and convert transaction and descriptive data from a specified source and then store it in a specified location. Each data bot initialized by software block 207 will store its data in the basic financial system table (143) and/or the derivatives table (175). Every data acquisition bot contains the information shown in Table 17.

TABLE 17

1. Unique ID number (based on date, hour, minute, second of creation)
2. The data source location
3. Mapping information
4. Timing of extraction
5. Conversion rules (if any)
6. Storage Location (to allow for tracking of source and destination events)
7. Organization
8. Enterprise
9. Creation date (date, hour, minute, second)

After the software in block 207 initializes all the bots for the basic financial system database, processing advances to a block 208. In block 208, the bots extract and convert transaction and descriptive data from the basic financial system (5) in accordance with their preprogrammed instructions in accordance with the frequency specified by user (20) in the system settings table (140). As each bot extracts and converts data from the basic financial system database (5) by enterprise, processing advances to a software block 209 before the bot completes data storage. The software in block 209 checks the basic financial system metadata to see if all fields have been extracted. If the software in block 209 finds no unmapped data fields, then the extracted, converted data are stored in the basic financial system table (143) by enterprise. Alternatively, if there are fields that have not been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the basic financial system table (143) by enterprise. It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing passes on to software block 212.

The software in block 212 checks the system settings table (140) in the application database (50) to determine if the current calculation is a new calculation or a structure change. If the calculation is not a new calculation or a structure change then processing advances to a software block 228. Alternatively, if the calculation is new or a structure change, then processing advances to a software block 221.

The software in block 221 checks the bot date table (149) and deactivates any operation management system data bots with creation dates before the current system date and retrieves information from the system settings table (140), metadata mapping table (141) and conversion rules table (142). The software in block 221 then initializes data bots for each field in the metadata mapping table (141) that mapped to the operation management system database (10) in accordance with the frequency specified by user (20) in the system settings table (140). Each data bot initialized by software block 221 will store its data in the operation system table (144) by enterprise.

After the software in block 221 initializes all the bots for the operation management system database, processing advances to a block 222. In block 222, the bots extract and convert transaction and descriptive data from the operation management system database (10) in accordance with their preprogrammed instructions in accordance with the frequency specified by user (20) in the system settings table (140). As each bot extracts and converts data from the operation management system database (10), processing advances to a software block 209 before the bot completes data storage. The software in block 209 checks the operation management system metadata to see if all fields have been extracted. If the software in block 209 finds no unmapped data fields, then the extracted, converted data are stored in the operation system table (144) by enterprise. Alternatively, if there are fields that have not been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the operation system table (144) by enterprise. It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to a software block 225.

The software in block 225 checks the bot date table (149) and deactivates any web site transaction log data bots with creation dates before the current system date and retrieves information from the system settings table (140), metadata mapping table (141) and conversion rules table (142). The software in block 225 then initializes data bots for each field in the metadata mapping table (141) that mapped to the web site transaction log database (12) by enterprise in accordance with the frequency specified by user (20) in the system settings table (140). Each data bot initialized by software block 225 will store its data in the web log data table (172) by enterprise.

After the software in block 225 initializes all the bots for the web site transaction log database, the bots extract and convert transaction and descriptive data in accordance with their preprogrammed instructions in accordance with the frequency specified by user (20) in the system settings table (140). As each bot extracts and converts data from the web site transaction log database (12), processing advances to a software block 209 before the bot completes data storage. The software in block 209 checks the web site transaction log metadata to see if all fields have been extracted. If the software in block 209 finds no unmapped data fields, then the extracted, converted data are stored in the web log data table (172) by enterprise. Alternatively, if there are fields that have not been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the web log data table (172) by enterprise. It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to a software block 226.

The software in block 226 checks the bot date table (149) and deactivates any human resource information system data bots with creation dates before the current system date and retrieves information from the system settings table (140), metadata mapping table (141) and conversion rules table (142). The software in block 226 then initializes data bots for each field in the metadata mapping table (141) that mapped to the human resource information system database (15) in accordance with the frequency specified by user (20) in the system settings table (140). Each data bot initialized by software block 226 will store its data in the human resource system table (145) by enterprise.

After the software in block 226 initializes all the bots for the human resource information system database, the bots extract and convert transaction and descriptive data in accordance with their preprogrammed instructions in accordance with the frequency specified by user (20) in the system settings table (140) by enterprise. As each bot extracts and converts data from the human resource information system database (15), processing advances to a software block 209 before the bot completes data storage. The software in block 209 checks the human resource information system metadata to see if all fields have been extracted. If the software in block 209 finds no unmapped data fields, then the extracted, converted data are stored in the human resource system table (145) by enterprise. Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the human resource system table (145) by enterprise. It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to software block 228.

The software in block 228 checks the system settings table (140) in the application database (50) to determine if the current calculation is a new calculation or a structure change. If the calculation is not a new calculation or a structure change then processing advances to a software block 248. Alternatively, if the calculation is new or a structure change, then processing advances to a software block 241.

The software in block 241 checks the bot date table (149) and deactivates any external database data bots with creation dates before the current system date and retrieves information from the system settings table (140), metadata mapping table (141) and conversion rules table (142). The software in block 241 then initializes data bots for each field in the metadata mapping table (141) that mapped to the external database (25) in accordance with the frequency specified by user (20) in the system settings table (140). Each data bot initialized by software block 241 will store its data in the external database table (146) by enterprise.

After the software in block 241 initializes all the bots for the external database, processing advances to a block 242. In block 242, the bots extract, convert and assign transaction and descriptive data in accordance with their preprogrammed instructions. As each bot extracts, converts and assigns data from the external database (25), processing advances to a software block 209 before the bot completes data storage and assignments. The software in block 209 checks the external database metadata to see if the extracted data are assigned to specified fields. If the software in block 209 finds no unmapped data, then the extracted, converted data are stored in the external database table (146) by enterprise. Alternatively, if there are fields that do not have metadata assignments, then processing advances to a block 211. The software in block 211 prompts the user (20) via the metadata and conversion rules window (702) to provide metadata, conversion rules and assignments for each new field. The information regarding the new metadata and conversion rules is stored in the metadata mapping table (141) and conversion rules table (142) while the information regarding the new assignments is stored in the external factor definition table (169). While some external factors are pre-defined for analysis, the bulk of the external factors are not pre-assigned and are developed using available data that is assigned to an external factor at the time of extraction. The extracted, converted data with new assignments is then stored in the external database table (146) by enterprise. It is worth noting at this point that the activation and operation of bots where all the fields have been mapped to the application database (50) continues. Only bots with unmapped fields "wait" for user input before completing data storage. The new metadata, conversion rule and classification information will be used the next time bots are initialized in accordance with the frequency established by the user (20). In either event, system processing then passes on to a software block 245.

The software in block 245 checks the bot date table (149) and deactivates any advanced financial system data bots with creation dates before the current system date and retrieves information from the system settings table (140), metadata mapping table (141) and conversion rules table (142). The software in block 245 then initializes data bots for each field in the metadata mapping table (141) that mapped to the advanced financial system database (30) in accordance with the frequency specified by user (20) in the system settings table (140). Each data bot initialized by software block 245 will store its data in the advanced finance system database table (147) by enterprise.

After the software in block 245 initializes all the bots for the advanced finance system database, the bots extract and convert transaction and descriptive data in accordance with their preprogrammed instructions in accordance with the frequency specified by user (20) in the system settings table (140). As each bot extracts and converts data from the advanced financial system database (30) by enterprise, processing advances to a software block 209 before the bot completes data storage. The software in block 209 checks the advanced finance system database metadata to see if all fields have been extracted. If the software in block 209 finds no unmapped data fields, then the extracted, converted data are stored in the advanced finance system database table (147) by enterprise. Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the advanced finance system database table (147) by enterprise. It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to software block 246.

The software in block 246 checks the bot date table (149) and deactivates any asset management system data bots with creation dates before the current system date and retrieves information from the system settings table (140), metadata mapping table (141) and conversion rules table (142). The software in block 246 then initializes data bots for each field in the metadata mapping table (141) that mapped to a asset management system database (35) in accordance with the frequency specified by user (20) in the system settings table (140). Extracting data from each asset management system ensures that the management of each soft asset is considered and prioritized within the overall financial models for the enterprise. Each data bot initialized by software block 246 will store its data in the asset system table (148) by enterprise.

After the software in block 246 initializes bots for all asset management system databases, the bots extract and convert transaction and descriptive data in accordance with their preprogrammed instructions in accordance with the frequency specified by user (20) in the system settings table (140). As each bot extracts and converts data from the asset management system databases (35), processing advances to a software block 209 before the bot completes data storage. The software in block 209 checks the metadata for the asset management system databases to see if all fields have been extracted. If the software in block 209 finds no unmapped data fields, then the extracted, converted data are stored in the asset system table (148) by enterprise. Alternatively, if there are fields that haven't been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the asset system table (148) by enterprise. It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to software block 248.

The software in block 248 checks the system settings table (140) in the application database (50) to determine if the current calculation is a new calculation or a structure change. If the calculation is not a new calculation or a structure change then processing advances to a software block 254. Alternatively, if the calculation is new or a structure change, then processing advances to a software block 251.

The software in block 251 checks the bot date table (149) and deactivates any risk management system data bots with creation dates before the current system date and retrieves information from the system settings table (140), metadata mapping table (141) and conversion rules table (142). The software in block 251 then initializes data bots for each field in the metadata mapping table (141) that mapped to a risk management system database (17) in accordance with the frequency specified by user (20) in the system settings table (140). Each data bot initialized by software block 251 will store its data in the risk system table (176) and/or the derivatives table (175) by enterprise.

After the software in block 251 initializes bots for all risk management system databases for each enterprise, the bots extract and convert transaction and descriptive data in accordance with their preprogrammed instructions in accordance with the frequency specified by user (20) in the system settings table (140) by enterprise. As each bot extracts and converts data from the risk management system databases (17), processing advances to a software block 209 before the bot completes data storage. The software in block 209 checks the metadata for the risk management system database (17) to see if all fields have been extracted. If the software in block 209 finds no unmapped data fields, then the extracted, converted data are stored in the risk system table (176) and/or the derivatives table (175) by enterprise. Alternatively, if there are fields that have not been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the risk management system table (176) and/or the derivatives table (175) by enterprise. It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to software block 252.

The software in block 252 checks the bot date table (149) and deactivates any supply chain system data bots with creation dates before the current system date and retrieves information from the system settings table (140), metadata mapping table (141) and conversion rules table (142). The software in block 252 then initializes data bots for each field in the metadata mapping table (141) that mapped to a supply chain system database (37) in accordance with the frequency specified by user (20) in the system settings table (140). Each data bot initialized by software block 252 will store its data in the supply chain system table (174) by enterprise.

After the software in block 252 initializes bots for all supply chain system databases, the bots extract and convert transaction and descriptive data in accordance with their preprogrammed instructions in accordance with the frequency specified by user (20) in the system settings table (140). As each bot extracts and converts data from the supply chain system databases (37), processing advances to a software block 209 before the bot completes data storage. The software in block 209 checks the metadata for the supply chain system database (37) to see if all fields have been extracted. If the software in block 209 finds no unmapped data fields, then the extracted, converted data are stored in the supply chain system table (174) by enterprise. Alternatively, if there are fields that have not been extracted, then processing advances to a block 211. The software in block 211 prompts the user (20) via the metadata and conversion rules window (702) to provide metadata and conversion rules for each new field. The information regarding the new metadata and conversion rules is stored in the metadata mapping table (141) and conversion rules table (142) while the extracted, converted data are stored in the supply chain system table (174) by enterprise. It is worth noting at this point that the activation and operation of bots where all the fields have been mapped to the application database (50) continues. Only bots with unmapped fields "wait" for user input before completing data storage. The new metadata and conversion rule information will be used the next time bots are initialized in accordance with the frequency established by the user (20). In either event, system processing then passes on to software block 254.

The software in block 254 checks the system settings table (140) in the application database (50) to determine if the current calculation is a new calculation or a structure change. If the calculation is not a new calculation or a structure change then processing advances to a software block 276. Alternatively, if the calculation is new or a structure change, then processing advances to a software block 255.

The software in block 255 prompts the user (20) via the identification and classification rules window (703) to identify keywords such as company names, brands, trademarks, competitors, risks and trends for pre-specified fields in the metadata mapping table (141) by enterprise. After specifying the keywords, the user (20) is prompted to classify each keyword by element, factor, enterprise or industry (note more than one classification per keyword is possible). The classification information provided by the user (20) is supplemented by a second classification that identifies the semantic map or maps associated with the keyword. The input from the user (20) is stored in the keyword table (150) in the application database by enterprise before processing advances to a software block 257.

The software in block 257 checks the bot date table (149) and deactivates any Internet text and linkage bots with creation dates before the current system date and retrieves information from the system settings table (140), the metadata mapping table (141) and the keyword table (150). The software in block 257 then initializes Internet text and linkage bots for each field in the metadata mapping table (141) that mapped to a keyword in accordance with the frequency specified by user (20) in the system settings table (140).

Bots are independent components of the application that have specific tasks to perform. In the case of text and linkage bots, their tasks are to locate, count, classify and extract keyword matches and linkages from the Internet and then store their findings as item variables in a specified location. The classification includes both the factor, element, enterprise or industry that the keyword is associated with and the context of the keyword mention. This dual classification allows the system of the present invention to identify both the number of times an enterprise element of value was mentioned and the context in which the enterprise element of value appeared. For example, the system might identify the fact that an enterprise brand was mentioned 367 times in the most recent month and that 63% of the mentions were associated with a favorable semantic map. Each Internet text and linkage bot initialized by software block 257 will store the extracted data and the location, count and classification data it discovers in the classified text table (151) by enterprise. Multimedia data can be processed using these same bots if software to translate and parse the multimedia content is included in each bot. Every Internet text and linkage bot contains the information shown in Table 18.

TABLE 18

1. Unique ID number (based on date, hour, minute, second of creation)
2. Creation date (date, hour, minute, second)
3. Storage location
4. Mapping information
5. Home URL
6. Organization
7. Enterprise
8. Keyword
9. Element, factor, enterprise or industry
10. Semantic map After being initialized, the text and linkage bots locate and classify data from the Internet (40) in accordance with their programmed instructions with the frequency specified by user (20) in the system settings table (140). As each text bot locates and classifies data from the Internet (40) processing advances to a software block 258 before the bot completes data storage. The software in block 258 checks to see if all linkages keyword hits have been classified by element, factor or enterprise. If the software in block 258 does not find any unclassified "hits" or "links", then the address, counts, dates and classified text are stored in the classified text table (151) by enterprise. Alternatively, if there are hits or links that haven't been classified, then processing advances to a block 259. The software in block 259 prompts the user (20) via the identification and classification rules window (703) to provide classification rules for each new hit or link. The information regarding the new classification rules is stored in the keyword table (150) while the newly classified text and linkages are stored in the classified text table (151) by enterprise. It is worth noting at this point that the activation and operation of bots where all fields map to the application database (50) continues. Only bots with unclassified fields will "wait" for user input before completing data storage. The new classification rules will be used the next time bots are initialized in accordance with the frequency established by the user (20). In either event, system processing then passes on to a software block 263.

The software in block 263 checks the bot date table (149) and deactivates any text bots with creation dates before the current system date and retrieves information from the system settings table (140), the metadata mapping table (141) and the keyword table (150). The software in block 263 then initializes text bots for each field in the metadata mapping table (141) that mapped to a keyword in accordance with the frequency specified by user (20) in the system settings table (140). The text bots use the same classification schema used for Internet text for classifying text found in external and internal databases. Every bot initialized by software block 263 will store the extracted location, count, date and classification of data it discovers as item variables in the classified text table (151) by enterprise. Every text bot contains the information shown in Table 19.

TABLE 19

1. Unique ID number (based on date, hour, minute, second of creation)
2. Creation date (date, hour, minute, second)
3. Storage location
4. Mapping information
5. Organization
6. Enterprise
7. Data source
8. Keyword
9. Storage location
10. Element, factor, enterprise or industry
11. Semantic map After being initialized, the bots locate data from the external database (25) or the asset management system database (35) in accordance with its programmed instructions with the frequency specified by user (20) in the system settings table (140). As each bot locates and extracts text data, processing advances to a software block 258 before the bot completes data storage. The software in block 258 checks to see if all keyword hits are classified by element, factor, enterprise, industry and semantic map. If the software in block 258 does not find any unclassified "hits", then the address, count and classified text are stored in the classified text table (151) by enterprise. Alternatively, if there are terms that have not been classified, then processing advances to a block 259. The software in block 259 prompts the user (20) via the identification and classification rules window (703) to provide classification rules for each new term. The information regarding the new classification rules is stored in the keyword table (150) while the newly classified text is stored in the classified text table (151) by enterprise. It is worth noting at this point that the activation and operation of bots with classified data (50) continues. Only bots with unclassified fields "wait" for user input before completing data storage. The new classification rules will be used the next time bots are initialized in accordance with the frequency established by the user (20). In either event, system processing then passes on to software block 264.

The software in block 264 checks the system settings table (140) to see if there is geospatial data in the application database (50) and to determine which on-line geocoding service (Centrus™ from QM Soft or MapMarker™ from MapInfo) is being used. If geospatial data are not being used, then processing advances to a block 269. Alternatively, if the software in block 264 determines that geospatial data are being used, processing advances to a software block 265.

The software in block 265 prompts the user (20) via the geospatial measure definitions window (710) to define the measures that will be used in evaluating the elements of value. After specifying the measures, the user (20) is prompted to select geospatial loci for each measure from the data already stored in the application database (50). The input from the user (20) is stored in the geospatial measures table (152) in the application database before processing advances to a software block 266.

The software in block 266 checks the bot date table (149) and deactivates any geospatial bots with creation dates before the current system date and retrieves information from the system settings table (140), the metadata mapping table (141) and the geospatial measures table (152). The software in block 266 then initializes geospatial bots for each field in the metadata mapping table (141) that mapped to geospatial data in the application database (50) in accordance with the frequency specified by user (20) in the system settings table (140).

Bots are independent components of the application that have specific tasks to perform. In the case of geospatial bots, their tasks are to calculate item variables using a specified geocoding service, then store the measures in a specified location. Each geospatial bot initialized by software block 266 will store the item variable measures it calculates in the application database table where the geospatial data was found by enterprise. For example, calculated item variables related to customer locations would be stored in the asset management system table (148) for customer data. Tables that are likely to include geospatial data include: the basic financial system table (143), the operation system table (144), the human resource system table (145), the external database table (146), the advanced finance system table (147) and the asset system table (148). Every geospatial bot contains the information shown in Table 20.

TABLE 20

1. Unique ID number (based on date, hour, minute, second of creation)
2. Creation date (date, hour, minute, second)
3. Mapping information
4. Storage location
5. Organization
6. Enterprise
7. Geospatial locus
8. Geospatial measure
9. Geocoding service After being activated, the geospatial bots locate data and calculate measurements (which are descriptive item variables) in accordance with their programmed instructions with the frequency specified by the user (20) in the system settings table (140). As each geospatial bot retrieves data and calculates the geospatial measures that have been specified, processing advances to a block 267 before the bot completes data storage. The software in block 267 checks to see if all geospatial data located by the bot have been measured. If the software in block 267 does not find any uncalculated measurement data, then the measurements are stored in the application database (50) by enterprise. Alternatively, if there are data elements where measures have not been calculated, then processing advances to a block 268. The software in block 268 prompts the user (20) via the geospatial measure definition window (710) to provide measurement rules for each new term. The information regarding the new measurement rules is stored in the geospatial measures table (152) while the newly calculated measurements are stored in the appropriate table in the application database (50) by enterprise. It is worth noting at this point that the activation and operation of bots that do not have unmeasured fields continues. Only the bots with uncalculated measurements "wait" for user input before completing data storage. The new measurement rules will be used the next time bots are initialized in accordance with the frequency established by the user (20). In either event, system processing then passes on to a software block 269.

The software in block 269 checks the system settings table (140) to see if semantic mapping is being used. If semantic mapping is not being used, then processing advances to a block 281. Alternatively, if the software in block 269 determines that semantic mapping is being used, processing advances to a software block 270.

The software in block 270 checks the bot date table (149) and deactivates any inference bots with creation dates before the current system date and retrieves information from the system settings table (140), the metadata mapping table (141), the keyword table (150) and the classified text table (151). The software in block 270 then initializes inference bots for each keyword in the metadata mapping table (141) that mapped to the classified text table (151) in the application database (50) in accordance with the frequency specified by user (20) in the system settings table (140).

Bots are independent components of the application that have specific tasks to perform. In the case of inference bots, their task is to use Bayesian inference algorithms to determine the characteristics that give meaning to the text associated with keywords and classified text previously stored in the application database (50). Every inference bot contains the information shown in Table 21.

TABLE 21

1. Unique ID number (based on date, hour, minute, second of creation)
2. Creation date (date, hour, minute, second)
3. Mapping information
4. Storage location
5. Organization
6. Enterprise
7. Keyword
8. Classified text mapping information After being activated, the inference bots determine the characteristics that give the text meaning in accordance with their programmed instructions with the frequency specified by the user (20) in the system settings table (140). The information defining the characteristics that give the text meaning is stored in the semantic map table (180) in the application database (50) before processing advances to block 272.

The software in block 272 checks the semantic map table (180) to see if there are new semantic maps. If there are no new semantic maps, then processing advances to a block 281. Alternatively, if the software in block 272 determines that there are new semantic maps, then processing returns to software block 255 and the processing described previously for Internet, text and geospatial bots is repeated.

The software in block 281 checks: the basic financial system table (143), the operation system table (144), the human resource system table (145), the external database table (146), the advanced finance system table (147), the asset system table (148), the classified text table (151), the geospatial measures table (152), the supply chain system table (174) and the risk system table (176) to see if data are missing from any of the periods used for system calculation. The software in block 202 previously calculated the range of dates that will be used. If there are no data missing from any period being used, then processing advances to a software block 283. Alternatively, if there are missing data for any field for any period, then processing advances to a block 282.

The software in block 282, prompts the user (20) via the missing data window (704) to specify the method to be used for filling the blanks for each item that is missing data. Options the user (20) can choose from for filling the blanks include: the average value for the item over the entire time period, the average value for the item over a specified period, zero, the average of the preceding item and the following item values and direct user input for each missing item. If the user (20) does not provide input within a specified interval, then the default missing data procedure specified in the system settings table (140) is used. When all the blanks have been filled and stored for all of the missing data, system processing advances to a block 283.

The software in block 283 calculates attributes by item for each numeric item variable in the basic financial system table (143), the operation system table (144), the human resource system table (145), the external database table (146), the advanced finance system table (147), the asset system table (148), the supply chain system table (174) and the risk system table (176). The attributes calculated in this step include: summary data like cumulative total value; ratios like the period to period rate of change in value; trends like the rolling average value, comparisons to a baseline value like change from a prior years level and time lagged values like the time lagged value of each numeric item variable. The software in block 283 calculates similar attributes for the text and geospatial item variables created previously. The software in block 283 calculates attributes for each date item variable in the extracted text data and specified tables (143, 144, 145, 146, 147, 148, 174 and 176) including summary data like time since last occurrence and cumulative time since first occurrence; and trends like average frequency of occurrence and the rolling average frequency of occurrence. The numbers derived from the item variables are collectively referred to as "item performance indicators". The software in block 283 also calculates pre-specified combinations of variables called composite variables for measuring the strength of the different elements of value. The item performance indicators are stored in the table where the item source data was obtained and the composite variables are stored in the composite variables table (153) before processing advances to a block 284.

The software in block 284 uses attribute derivation algorithms such as the AQ program to create combinations of the variables that were not pre-specified for combination. While the AQ program is used in one embodiment of the present invention, other attribute derivation algorithms, such as the LINUS algorithms, may be used to the same effect. The software creates these attributes using both item variables that were specified as "element" variables and item variables that were not. The resulting composite variables are stored in the composite variables table (153) before processing advances to a block 285.

The software in block 285 derives external factor indicators for each numeric data field defined in the external factor definition table (169). For example, external factors include: the ratio of enterprise earnings to expected earnings, the number and amount of jury awards, commodity prices, the inflation rate, growth in g.d.p., enterprise earnings volatility vs. industry average volatility, short and long term interest rates, increases in interest rates, insider trading direction and levels, industry concentration, consumer confidence and the unemployment rate that have an impact on the market price of the equity for an enterprise and/or an industry. The external factor indicators derived in this step include: summary data like cumulative totals, ratios like the period to period rate of change, trends like the rolling average value, comparisons to a baseline value like change from a prior years price and time lagged data like time lagged earnings forecasts. In a similar fashion the software in block 285 calculates external factors for each date field in the external factor definition table (169) including summary factors like time since last occurrence and cumulative time since first occurrence; and trends like average frequency of occurrence and the rolling average frequency of occurrence. The numbers derived from numeric and date fields are collectively referred to as "factor performance indicators". The software in block 285 also calculates pre-specified combinations of variables called composite factors for measuring the strength of the different external factors. The external factors, factor performance indicators and the composite factors are stored in the factor variables table (182) before processing advances to a block 286.

The software in block 286 uses attribute derivation algorithms, such as the Linus algorithm, to create combinations of the factors that were not pre-specified for combination. While the Linus algorithm is used in one embodiment of the present invention, other attribute derivation algorithms, such as the AQ program, may be used to the same effect. The software creates these attributes using both external factors that were included in "composite factors" and external factors that were not. The resulting composite variables are stored in the factor variables table (182) before processing advances to a block 287.

The software in block 287 uses pattern-matching algorithms to assign pre-designated data fields for different elements of value to pre-defined groups with numerical values. This type of analysis is useful in classifying purchasing patterns and/or communications patterns as "heavy", "light", "moderate" or "sporadic". This analysis is also be used to classify web site activity and advertising patterns in a similar fashion. The numeric values associated with the classifications are item performance indicators. They are stored in the application database (50) table where the item variables or factor variables they are derived from are located before processing advances to a block 288.

The software in block 288 retrieves data from the metadata mapping table (141) and system settings table (140) in order to create and then stores detailed definitions for the segments of value and the pre-defined components of value for the current operation in the segment definition table (156) by enterprise. As discussed previously, there are up to five segments of value per enterprise—current operation, real options, derivatives, excess financial assets and market sentiment. The current operation is further subdivided into: a revenue component of value that is not divided into sub-components, the expense value that is divided into five sub-components: the cost of raw materials, the cost of manufacture or delivery of service, the cost of selling, the cost of support and the cost of administration and the capital value that is divided into six sub-components: cash, non-cash financial assets, production equipment, other assets, financial liabilities and equity in one embodiment. Different subdivisions of the components of value can be used to the same effect. When data storage is complete, processing advances to a software block 291.

The software in block 291 checks the derivatives table (175) in the application database (50) to see if there are historical values for all the derivatives stored in the table. Because SFAS 133 is still not fully implemented, some companies may not have data regarding the value of their derivatives during a time period where data are being used. If there are values stored for all time periods being used, then processing advances to a software block 302 where the analysis of the extracted data is started. Alternatively, if there are periods when the value of one or more derivatives has not been stored, then processing advances to a software block 292. The software in block 292 retrieves data from the external database table (146), the external factors table and the derivatives table (175) in order to value each derivative using a risk neutral valuation method for the time period or time periods that are missing values. The algorithms used for this analysis can include Quasi Monte Carlo, equivalent Martingale or wavelets. When the calculations are completed, the resulting values are stored in the derivatives table (175) by enterprise and processing advances to a block 293.

The software in block 293 prompts the user (20) via the frame definition window (705) to specify frames for analysis. Frames are sub-sets of each enterprise that can be analyzed at the value driver level separately. For example, the user (20) may wish to examine value and risk by country, by division, by project, by action, by program or by manager. The software in block 293 saves the frame definitions the user (20)

specifies in the frame definition table (181) by enterprise in the application database (50) before processing advances to a software block 294.

The software in block 294 retrieves the segment, element and factor variables from the: basic financial system (143), human resource system table (145), external database table (146), advanced finance system (147), asset system table (148), keyword table (150), classified text table (151), geospatial measures table (152), composite variables table (153), supply chain system table (174), derivatives table (175), risk system table (176), event risk table (178), financial forecasts table (179) and factor variables table (182) in order to assign frame designations to every element and factor variable that was stored in the application database (50) in the prior processing steps in this stage (200) of processing. After storing the revised segment, element and factor variables records in the same table they were retrieved from in the application database (50), the software in the block retrieves the definitions from the element definition table (155), segment definition table (156) and external factor definition table (169), updates them to reflect the new frame definitions and saves them in the approprirate table before processing advances to a software block 295.

The software in block 295 checks the: basic financial system (143), human resource system table (145), external database table (146), advanced finance system (147), asset system table (148), keyword table (150), classified text table (151), geospatial measures table (152), composite variables table (153), supply chain system table (174), derivatives table (175), risk system table (176), event risk table (178), financial forecasts table (179) and factor variables table (182) to see if there are frame assignments for all segment, element and factor variables. If there are frame assignments for all variables, then processing advances to a software block 302 where the analysis of the extracted data is started. Alternatively, if there are variables without frame assignments, then processing advances to a software block 296.

The software in block 296 retrieves variables from the basic financial system (143), human resource system table (145), external database table (146), advanced finance system (147), asset system table (148), keyword table (150), classified text table (151), geospatial measures table (152), composite variables table (153), supply chain system table (174), derivatives table (175), risk system table (176), event risk table (178), financial forecasts table (179) and factor variables table (182) that don't have frame assignments and then prompts the user (20) via the frame assignment window (705) to specify frame assignments for these variables. The software in block 296 saves the frame assignments the user (20) specifies as part of the data record for the variable in the table where the variable was retrieved from by enterprise in the application database (50) before processing advances to software block 302 to begin the value analysis of the extracted data.

Value Analysis

The flow diagrams in FIG. 6A, FIG. 6B and FIG. 6C detail the processing that is completed by the portion of the application software (300) that continually values the segments of value by enterprise. This portion of the application software (300) also generates a matrix quantifying the impact of elements of value and external factors on the segments of value for each enterprise within the organization (see FIG. 9) by creating and activating analysis bots that:

1) Identify the factor variables, factor performance indicators and composite variables for each external factor that drive: three of the segments of value—current operation, derivatives and excess financial assets—as well as the components of current operation value (revenue, expense and changes in capital);
2) Identify the item variables, item performance indicators and composite variables for each element and sub-element of value that drive: three segments of value—current operation, derivatives and financial assets—as well as the components of current operation value (revenue, expense and changes in capital);
3) Create vectors that summarize the impact of the factor variables, factor performance indicators and composite variables for each external factor;
4) Create vectors that summarize the performance of the item variables, item performance indicators and composite variables for each element of value and sub-element of value in driving segment value;
5) Determine the expected life of each element of value and sub-element of value;
6) Determine the current operation value, excess financial asset value and derivative value, revenue component value, expense component value and capital component value of said current operations using the information prepared in the previous stages of processing;
7) Specify and optimize causal predictive models to determine the relationship between the vectors generated in steps 3 and 4 and the three segments of value, current operation, derivatives and financial assets, as well as the components of current operation value (revenue, expense and changes in capital);
8) Determine the appropriate discount rate on the basis of relative causal element strength, value the enterprise real options and contingent liabilities and determine the contribution of each element to real option valuation;
9) Determine the best causal indicator for enterprise stock price movement, calculate market sentiment and analyze the causes of market sentiment; and
10) Combine the results of all prior stages of processing to determine the value of each element, sub-element and factor for each enterprise and the organization.

Each analysis bot generally normalizes the data being analyzed before processing begins. While the processing in one embodiment includes an analysis of all five segments of value for the organization, it is to be understood that the system of the present invention can complete calculations for any combination of the five segments. For example, when a company is privately held it does not have a market price and as a result the market sentiment segment of value is not analyzed.

Processing in this portion of the application begins in software block 302. The software in block 302 checks the system settings table (140) in the application database (50) to determine if the current calculation is a new calculation or a structure change. If the calculation is not a new calculation or a structure change, then processing advances to a software block 315. Alternatively, if the calculation is new or a structure change, then processing advances to a software block 303.

The software in block 303 retrieves data from the system settings table (140), the meta data mapping table (141), the asset system table (148), the element definition table (155) and the frame definition table (181) and then assigns item variables, item performance indicators and composite variables to each element of value identified in the system settings table (140) using a three-step process. First, item variables, item performance indicators and composite variables are assigned to elements of value based on the asset management system they correspond to (for example, all item variables from a brand management system and all item performance indicators and composite variables derived from brand management system item variables are assigned to the brand element of value). Second, pre-defined composite variables are assigned to the element of value they were assigned to measure in the metadata mapping table (141). Finally, item variables, item performance indicators and composite variables identified by the text and geospatial bots are assigned to elements of value on the basis of their element classifications. If any item variables, item performance indicators or composite variables are un-assigned at this point they are assigned to a going concern element of value. After the assignment of variables and indicators to elements of value is complete, the resulting assignments are saved to the element definition table (155) by enterprise and processing advances to a block 304.

The software in block 304 retrieves data from the meta data mapping table (141), the external factor definition table (169) and the frame definition table (181) and then assigns factor variables, factor performance indicators and composite factors to each external factor. Factor variables, factor performance indicators and composite factors identified by the text and geospatial bots are then assigned to factors on the basis of their factor classifications. The resulting assignments are saved to external factor definition table (169) by enterprise and processing advances to a block 305.

The software in block 305 checks the system settings table (140) in the application database (50) to determine if any of the enterprises in the organization being analyzed have market sentiment segments. If there are market sentiment segments for any enterprise, then processing advances to a block 306. Alternatively, if there are no market prices for equity for any enterprise, then processing advances to a software block 308.

The software in block 306 checks the bot date table (149) and deactivates any market value indicator bots with creation dates before the current system date. The software in block 306 then initializes market value indicator bots in accordance with the frequency specified by the user (20) in the system settings table (140). The bot retrieves the information from the system settings table (140), the metadata mapping table (141) and the external factor definition table (169) before saving the resulting information in the application database (50).

Bots are independent components of the application that have specific tasks to perform. In the case of market value indicator bots their primary task is to identify the best market value indicator (price, relative price, yield, first derivative of price change or second derivative of price change) for the time period being examined. The market value indicator bots select the best value indicator by grouping the S&P 500 using each of the five value indicators with a Kohonen neural network. The resulting clusters are then compared to the known groupings of the S&P 500. The market value indicator that produced the clusters that most closely match the know S&P 500 is selected as the market value indicator. Every market value indicator bot contains the information shown in Table 22.

TABLE 22

1. Unique ID number (based on date, hour, minute, second of creation)
2. Creation date (date, hour, minute, second)
3. Mapping information
4. Storage location
5. Organization
6. Enterprise When bot in block 306 have identified and stored the best market value indicator in the external factor definition table (169), processing advances to a block 307.

The software in block 307 checks the bot date table (149) and deactivates any temporal clustering bots with creation dates before the current system date. The software in block 307 then initializes a bot in accordance with the frequency specified by the user (20) in the system settings table (140). The bot retrieves information from the system settings table (140), the metadata mapping table (141) and the external database table (146) and define regimes for the enterprise market value before saving the resulting cluster information in the application database (50).

Bots are independent components of the application that have specific tasks to perform. In the case of temporal clustering bots, their primary task is to segment the market price data by enterprise using the market value indicator selected by the bot in block 306 into distinct time regimes that share similar characteristics. The temporal clustering bot assigns a unique identification (id) number to each "regime" it identifies and stores the unique id numbers in the cluster id table (157). Every time period with data are assigned to one of the regimes. The cluster id for each regime is saved in the data record for each element variable and factor variable in the table where it resides by enterprise. If there are enterprises in the organization that don't have market sentiment calculations, then the time regimes from the primary enterprise specified by the user in the system settings table (140) are used in labeling the data for the other enterprises. After the regimes are identified, the element and factor variables for each enterprise are segmented into a number of regimes less than or equal to the maximum specified by the user (20) in the system settings table (140). The time periods are segmented for each enterprise with a market value using a competitive regression algorithm that identifies an overall, global model before splitting the data and creating new models for the data in each partition. If the error from the two models is greater than the error from the global model, then there is only one regime in the data. Alternatively, if the two models produce lower error than the global model, then a third model is created. If the error from three models is lower than from two models then a fourth model is added. The process continues until adding a new model does not improve accuracy. Other temporal clustering algorithms may be used to the same effect. Every temporal clustering bot contains the information shown in Table 23.

TABLE 23

1. Unique ID number (based on date, hour, minute, second of creation)
2. Creation date (date, hour, minute, second)
3. Mapping information
4. Storage location
5. Maximum number of clusters
6. Organization
7. Enterprise When bots in block 307 have identified and stored regime assignments for all time periods with data by enterprise, processing advances to a software block 308.

The software in block 308 checks the bot date table (149) and deactivates any variable clustering bots with creation dates before the current system date. The software in block 308 then initializes bots for each element of value and external factor by enterprise. The bots: activate in accordance with the frequency specified by the user (20) in the system settings table (140), retrieve the information from the system settings table (140), the metadata mapping table (141), the element definition table (155) and external factor definition table (169) and define segments for the element variables and factor variables before saving the resulting cluster information in the application database (50).

Bots are independent components of the application that have specific tasks to perform. In the case of variable clustering bots, their primary task is to segment the element variables and factor variables into distinct clusters that share similar characteristics. The clustering bot assigns a unique id number to each "cluster" it identifies and stores the unique id numbers in the cluster id table (157). Every item variable for every element of value is assigned to one of the unique clusters. The cluster id for each variable is saved in the data record for each variable in the table where it resides. In a similar fashion, every factor variable for every external factor is assigned to a unique cluster. The cluster id for each variable is saved in the data record for the factor variable. The item variables and factor variables are segmented into a number of clusters less than or equal to the maximum specified by the user (20) in the system settings table (140). The data are segmented using the "default" clustering algorithm the user (20) specified in the system settings table (140). The system of the present invention provides the user (20) with the choice of several clustering algorithms including: an unsupervised "Kohonen" neural network, neural network, decision tree, support vector method, K-nearest neighbor, expectation maximization (EM) and the segmental K-means algorithm. For algorithms that normally require the number of clusters to be specified, the bot will iterate the number of clusters until it finds the cleanest segmentation for the data. Every variable clustering bot contains the information shown in Table 24.

TABLE 24

1. Unique ID number (based on date, hour, minute, second of creation)
2. Creation date (date, hour, minute, second)
3. Mapping information
4. Storage location
5. Element of value, sub element of value or external factor
6. Clustering algorithm type
7. Organization
8. Enterprise
9. Maximum number of clusters
10. Variable 1
... to
10 + n. Variable n When bots in block 308 have identified and stored cluster assignments for the variables associated with each element of value, sub-element of value or external factor, processing advances to a software block 309.

The software in block 309 checks the bot date table (149) and deactivates any predictive model bots with creation dates before the current system date. The software in block 309 then retrieves the information from the system settings table (140), the metadata mapping table (141), the element definition table (155), the segment definition table (156) and the external factor definition table (169) as part of the process of initializing predictive model bots for each component of value.

Bots are independent components of the application that have specific tasks to perform. In the case of predictive model bots, their primary task is to determine the relationship between the element and factor variables and the derivative segment of value, the excess financial asset segment of value and the current operation segment of value by enterprise. The predictive model bots also determine the relationship between the element variables and factor variables components of current operation value and sub-components of current operation value by enterprise. Predictive model bots are initialized for each component of value, sub-component of value, derivative segment and excess financial asset segment by enterprise. They are also initialized for each cluster and regime of data in accordance with the cluster and regime assignments specified by the bots in blocks 307 and 308 by enterprise. A series of predictive model bots is initialized at this stage because it is impossible to know in advance which predictive model type will produce the "best" predictive model for the data from each commercial enterprise. The series for each model includes 12 predictive model bot types: neural network; CART; GARCH, projection pursuit regression; generalized additive model (GAM), redundant regression network; rough-set analysis, boosted Naïve Bayes Regression; MARS; linear regression; support vector method and stepwise regression. Additional predictive model types can be used to the same effect. The software in block 309 generates this series of predictive model bots for the enterprise as shown in Table 25.

TABLE 25

Predictive models by enterprise level

Enterprise:

Variables* relationship to enterprise cash flow
(revenue − expense + capital change)
Variables* relationship to enterprise revenue component of value
Variables* relationship to enterprise expense subcomponents of value
Variables* relationship to enterprise capital change subcomponents of value
Variables* relationship to derivative segment of value
Variables* relationship to excess financial asset segment of value
Element of Value:

Sub-element of value variables relationship to element of value

*Variables = element and factor variables, item performance indicators.

Every predictive model bot contains the information shown in Table 26.

TABLE 26

1. Unique ID number (based on date, hour, minute, second of creation)
2. Creation date (date, hour, minute, second)
3. Mapping information
4. Storage location
5. Organization
6. Enterprise
7. Global or Cluster (ID) and/or Regime (ID)
8. Segment (Derivative, Excess Financial Asset or Current Operation)
9. Element, sub-element or external factor
10. Predictive Model Type After predictive model bots are initialized, the bots activate in accordance with the frequency specified by the user (20) in the system settings table (140). Once activated, the bots retrieve data from the appropriate table in the application database (50) and randomly partition the element or factor variables into a training set and a test set. The software in block 309 uses "bootstrapping" where the different training data sets are created by re-sampling with replacement from the original training set so data records may occur more than once. After the predictive model bots complete their training and testing, processing advances to a block 310.

The software in block 310 determines if clustering improved the accuracy of the predictive models generated by the bots in software block 309 by enterprise. The software in block 310 uses a variable selection algorithm such as stepwise regression (other types of variable selection algorithms can be used) to combine the results from the predictive model bot analyses for each type of analysis—with and without clustering—to determine the best set of variables for each type of analysis. The type of analysis having the smallest amount of error as measured by applying the mean squared error algorithm to the test data is given preference in determining the best set of variables for use in later analysis. There are four possible outcomes from this analysis as shown in Table 27.

TABLE 27

1. Best model has no clustering
2. Best model has temporal clustering, no variable clustering
3. Best model has variable clustering, no temporal clustering
4. Best model has temporal clustering and variable clustering If the software in block 310 determines that clustering improves the accuracy of the predictive models for an enterprise, then processing advances to a software block 313. Alternatively, if clustering does not improve the overall accuracy of the predictive models for an enterprise, then processing advances to a software block 311.

The software in block 311 uses a variable selection algorithm such as stepwise regression (other types of variable selection algorithms can be used) to combine the results from the predictive model bot analyses for each model to determine the best set of variables for each model. The models having the smallest amount of error as measured by applying the mean squared error algorithm to the test data is given preference in determining the best set of variables. As a result of this processing, the best set of variables contain: the item variables, factor variables, item performance indicators, factor performance indications, composite variables and compoiste factors that correlate most strongly with changes in the three segments being analyzed and the three components of value. The best set of variables will hereinafter be referred to as the "value drivers".

Eliminating low correlation factors from the initial configuration of the vector creation algorithms increases the efficiency of the next stage of system processing. Other error algorithms alone or in combination may be substituted for the mean squared error algorithm. After the best set of variables have been selected and stored in the element variables table (158) or factor variables table (182) for all models at all levels for each enterprise in the organization, the software in block 311 tests the independence of the value drivers at the enterprise, external factor, element and sub-element level before processing advances to a block 312.

The software in block 312 checks the bot date table (149) and deactivates any causal predictive model bots with creation dates before the current system date. The software in block 312 then retrieves the information from the system settings table (140), the metadata mapping table (141), the segment definition table (156), the element variables table (158) and the factor variables table (182) as part of the process of initializing causal predictive model bots for each element of value, sub-element of value and external factor in accordance with the frequency specified by the user (20) in the system settings table (140).

Bots are independent components of the application that have specific tasks to perform. In the case of causal predictive model bots, their primary task is to refine the element and factor variable selection to reflect only causal variables. (Note: these variables are summed together to value an element of value when they are interdependent). A series of causal predictive model bots are initialized at this stage because it is impossible to know in advance which causal predictive model will produce the "best" vector for the best fit variables from each model. The series for each model includes five causal predictive model bot types: Tetrad, MML, LaGrange, Bayesian and path analysis. The software in block 312 generates this series of causal predictive model bots for each set of variables stored in the element variables table (158) and factor variables table (182) in the previous stage in processing. Every causal predictive model bot activated in this block contains the information shown in Table 28.

TABLE 28

1. Unique ID number (based on date, hour, minute, second of creation)
2. Creation date (date, hour, minute, second)
3. Mapping information
4. Storage location
5. Component or subcomponent of value
6. Element of value, sub-element of value or external factor
7. Variable set
8. Causal predictive model type
9. Organization
10. Enterprise After the causal predictive model bots are initialized by the software in block 312, the bots activate in accordance with the frequency specified by the user (20) in the system settings table (140). Once activated, they retrieve the relevant information for each model and sub-divide the variables into two sets, one for training and one for testing. After the causal predictive model bots complete their processing for each model, the software in block 312 uses a model selection algorithm to identify the model that best fits the data for each element of value, sub-element of value and external factor being analyzed. For the system of the present invention, a cross validation algorithm is used for model selection. The software in block 312 saves the best fit causal factors in the vector table (159) by enterprise in the application database (50) and processing advances to a block 318.

The software in block 318 tests the value drivers to see if there is interaction between elements, between elements and external factors or between external factors by enterprisse. The software in this block identifies interaction by evaluating a chosen model based on stochastic-driven pairs of value-driver subsets. If the accuracy of such a model is higher that the accuracy of statistically combined models trained on attribute subsets, then the attributes from subsets are considered to be interacting and then they form an interacting set. If the software in block 318 does not detect any value driver interaction or missing variables for each enterprise, then system processing advances to a block 323. Alternatively, if missing data or value driver interactions across elements are detected by the software in block 318 for one or more enterprise, then processing advances to a software block 321.

If software in block 310 determines that clustering improves predictive model accuracy, then processing advances to block 313 as described previously. The software in block 313 uses a variable selection algorithm such as stepwise regression (other types of variable selection algorithms can be used) to combine the results from the predictive model bot analyses for each model, cluster and/or regime to determine the best set of variables for each model. The models having the smallest amount of error as measured by applying the mean squared error algorithm to the test data is given preference in determining the best set of variables. As a result of this processing, the best set of variables contains: the element variables and factor variables that correlate most strongly with changes in the components of value. The best set of variables will hereinafter be referred to as the "value drivers". Eliminating low correlation factors from the initial configuration of the vector creation algorithms increases the efficiency of the next stage of system processing. Other error algorithms alone or in combination may be substituted for the mean squared error algorithm. After the best set of variables have been selected and stored in the element variables table (158) or the factor variables table (182) for all models at all levels by enterprise, the software in block 313 tests the independence of the value drivers at the enterprise, element, sub-element and external factor level before processing advances to a block 314.

The software in block 314 checks the bot date table (149) and deactivates any causal predictive model bots with creation dates before the current system date. The software in block 314 then retrieves the information from the system settings table (140), the metadata mapping table (141), the segment definition table (156), the element variables table (158) and the factor variables table (182) as part of the process of initializing causal predictive model bots for each element of value, sub-element of value and external factor at every level in accordance with the frequency specified by the user (20) in the system settings table (140).

Bots are independent components of the application that have specific tasks to perform. In the case of causal predictive model bots, their primary task is to refine the element and factor variable selection to reflect only causal variables. (Note: these variables are grouped together to represent a single element vector when they are dependent). In some cases it may be possible to skip the correlation step before selecting the causal item variables, factor variables, item performance indicators, factor performance indicators, composite variables and composite factors. A series of causal predictive model bots are initialized at this stage because it is impossible to know in advance which causal predictive model will produce the "best" vector for the best fit variables from each model. The series for each model includes four causal predictive model bot types: Tetrad, LaGrange, Bayesian and path analysis. The software in block 314 generates this series of causal predictive model bots for each set of variables stored in the element variables table (158) in the previous stage in processing. Every causal predictive model bot activated in this block contains the information shown in Table 29.

TABLE 29

1. Unique ID number (based on date, hour, minute, second of creation)
2. Creation date (date, hour, minute, second)
3. Mapping information
4. Storage location
5. Component or subcomponent of value
6. Cluster (ID) and/or Regime (ID)
7. Element of value, sub-element of value or external factor
8. Variable set
9. Organization
10. Enterprise
11. Causal predictive model type After the causal predictive model bots are initialized by the software in block 314, the bots activate in accordance with the frequency specified by the user (20) in the system settings table (140). Once activated, they retrieve the relevant information for each model and sub-divide the variables into two sets, one for training and one for testing. The same set of training data is used by each of the different types of bots for each model. After the causal predictive model bots complete their processing for each model, the software in block 314 uses a model selection algorithm to identify the model that best fits the data for each element, sub-element of value or external factor being analyzed by model and/or regime by enterprise. For the system of the present invention, a cross validation algorithm is used for model selection. The software in block 314 saves the best fit causal factors in the vector table (159) by enterprise in the application database (50) and processing advances to block 318. The software in block 318 tests the value drivers to see if there are "missing" value drivers that are influencing the results as well as testing to see if there are interactions (dependencies) across elements. If the software in block 318 does not detect any missing data or value driver interactions across elements, then system processing advances to a block 323. Alternatively, if missing data or value driver interactions across elements of value are detected by the software in block 318, then processing advances to a software block 321.

The software in block 321 prompts the user (20) via the structure revision window (710) to adjust the specification(s) for the affected elements of value, sub-elements of value or external factors in order to minimize or eliminate the interaction. At this point the user (20) has the option of specifying that one or more elements of value, sub elements of value and/or external factors be combined for analysis purposes (element of value combinations and/or factor combinations) for each enterprise where there is interaction between elements of value and/or factors. The user (20) also has the option of specifying that the elements of value or external factors that are interacting will be valued by summing the impact of their value drivers. Finally, the user (20) can chose to re-assign a value driver to a new element of value to eliminate the inter-dependency. This is the preferred solution when the inter-dependent value driver is included in the going concern element of value. Elements of value and external factors that will be valued by summing their value drivers will not have vectors generated. After the input from the user (20) is saved in the system settings table (140), the element definition table (155) and the external factor definition table (169) system processing advances to a software block 323. The software in block 323 checks the system settings table (140), the element definition table (155) and/or the external factor definition table (169) to see if there any changes in structure. If there have been changes in the structure, then processing advances to a block 205 and the system processing described previously is repeated. Alternatively, if there are no changes in structure, then processing advances to a block 325.

The software in block 325 checks the system settings table (140) in the application database (50) to determine if the current calculation is a new one. If the calculation is new, then processing advances to a software block 326. Alternatively, if the calculation is not a new calculation, then processing advances to a software block 333.

The software in block 326 checks the bot date table (149) and deactivates any industry rank bots with creation dates before the current system date. The software in block 326 then retrieves the information from the system settings table (140), the metadata mapping table (141), and the vector table (159) as part of the process of initializing industry rank bots for the enterprise and for the industry in accordance with the frequency specified by the user (20) in the system settings table (140).

Bots are independent components of the application that have specific tasks to perform. In the case of industry rank bots, their primary task is to determine the relative position of each enterprise being evaluated on element variables identified in the previous processing step. (Note: these variables are grouped together when they are interdependent). The industry rank bots use ranking algorithms such as Data Envelopment Analysis (hereinafter, DEA) to determine the relative industry ranking of the enterprise being examined. The software in block 326 generates industry rank bots for each enterprise being evaluated. Every industry rank bot activated in this block contains the information shown in Table 30.

TABLE 30

1. Unique ID number (based on date, hour, minute, second of creation)
2. Creation date (date, hour, minute, second)
3. Mapping information
4. Storage location
5. Ranking algorithm
6. Organization
7. Enterprise After the industry rank bots are initialized by the software in block 326, the bots activate in accordance with the frequency specified by the user (20) in the system settings table (140). Once activated, they retrieve the item variables, item performance indicators, and composite variables from the application database (50) and sub-divides them into two sets, one for training and one for testing. After the industry rank bots develop and test their rankings, the software in block 326 saves the industry rankings in the vector table (159) by enterprise in the application database (50) and processing advances to a block 327. The industry rankings are item variables.

The software in block 327 checks the bot date table (149) and deactivates any vector generation bots with creation dates before the current system date. The software in block 327 then initializes bots for each element of value, sub-element of value and external factor for each enterprise in the organization. The bots activate in accordance with the frequency specified by the user (20) in the system settings table (140), retrieve the information from the system settings table (140), the metadata mapping table (141), the segment definition table (156) and the element variables table (158) as part of the process of initializing vector generation bots for each element of value and sub-element of value in accordance with the frequency specified by the user (20) in the system settings table (140).

Bots are independent components of the application that have specific tasks to perform. In the case of vector generation bots, their primary task is to produce formulas, (hereinafter, vectors) that summarize the relationship between the causal element variables or causal factor variables and changes in the component or sub-component of value being examined for each enterprise. The causal element variables may be grouped by element of value, sub-element of value, external factor, factor combination or element combination. As discussed previously, the vector generation step is skipped for elements and factors where the user has specified that value driver impacts will be mathematically summed to determine the value of the element or factor. The vector generation bots use induction algorithms to generate the vectors. Other vector generation algorithms can be used to the same effect. The software in block 327 generates a vector generation bot for each set of variables stored in the element variables table (158) and factor variables table (182). Every vector generation bot contains the information shown in Table 31.

TABLE 31

1. Unique ID number (based on date, hour, minute, second of creation)
2. Creation date (date, hour, minute, second)

TABLE 31-continued

3. Mapping information
4. Storage location
5. Organization
6. Enterprise
7. Element, sub-element, element combination, factor or factor combination
8. Component or sub-component of value
9. Factor 1
... to
9 + n. Factor n When bots in block 327 have identified and stored vectors for all time periods with data for all the elements, sub-elements, element combination, factor combination or external factor where vectors are being calculated in the vector table (163) by enterprise, processing advances to a software block 329.

The software in block 329 checks the bot date table (149) and deactivates any financial factor bots with creation dates before the current system date. The software in block 329 then retrieves the information from the system settings table (140), the metadata mapping table (141), the element definition table (155), the element variables table (158), the external factor definition table (169), the derivatives table (175), the financial forecasts table (179) and the factor variables table (182) as part of the process of initializing causal external factor bots for the enterprise and the relevant industry in accordance with the frequency specified by the user (20) in the system settings table (140).

Bots are independent components of the application that have specific tasks to perform. In the case of financial factor bots, their primary task is to identify elements of value, value drivers and external factors that are causal factors for changes in the value of: derivatives, financial assets, enterprise equity and industry equity. The causal factors for enterprise equity and industry equity are those that drive changes in the value indicator identified by the value indicator bots. A series of financial factor bots are initialized at this stage because it is impossible to know in advance which causal factors will produce the "best" model for every derivative, financial asset, enterprise or industry. The series for each model includes five causal predictive model bot types: Tetrad, LaGrange, MML, Bayesian and path analysis. Other causal predictive models can be used to the same effect. The software in block 329 generates this series of causal predictive model bots for each set of variables stored in the element variables table (158) and factor variables table (182) in the previous stage in processing by enterprise. Every financial factor bot activated in this block contains the information shown in Table 32

TABLE 32

1. Unique ID number (based on date, hour, minute, second of creation)
2. Creation date (date, hour, minute, second)
3. Mapping information
4. Storage location
5. Element, value driver or external factor
6. Organization
7. Enterprise
8. Type: derivatives, financial assets, enterprise equity or industry equity
9. Value indicator (price, relative price, first derivative, etc.) for enterprise and industry only
10. Causal predictive model type After the software in block 329 initializes the financial factor bots, the bots activate in accordance with the frequency specified by the user (20) in the system settings table (140).

Once activated, they retrieve the relevant information and sub-divide the data into two sets, one for training and one for testing. The same set of training data is used by each of the different types of bots for each model. After the financial factor bots complete their processing for each segment of value, enterprise and industry, the software in block 329 uses a model selection algorithm to identify the model that best fits the data for each. For the system of the present invention, a cross validation algorithm is used for model selection. The software in block 329 saves the best fit causal factors in the factor variables table (182) by enterprise and the best fit causal elements of value and value drivers in the element variables table (158) by enterprise and processing advances to a block 330. The software in block 330 tests to see if there are "missing" causal factors, elements of value or value drivers that are influencing the results by enterprise. If the software in block 330 does not detect any missing factors, elements of value or value drivers, then system processing advances to a block 331. Alternatively, if missing factors, elements of value or value drivers are detected by the software in block 330, then processing returns to software block 321 and the processing described in the preceding section is repeated.

The software in block 331 checks the bot date table (149) and deactivates any option bots with creation dates before the current system date. The software in block 331 then retrieves the information from the system settings table (140), the metadata mapping table (141), the basic financial system database (143), the external database table (146), the advanced finance system table (147) and the vector table (163) as part of the process of initializing option bots for the enterprise.

Bots are independent components of the application that have specific tasks to perform. In the case of option bots, their primary tasks are to calculate the discount rate to be used for valuing the real options and contingent liabilities and to value the real options and contingent liabilities for the enterprise. If the user (20) has chosen to include industry options, then option bots will be initialized for industry options as well. The discount rate for enterprise real options is calculated by adding risk factors for each causal element of value to a base discount rate. A two step process determines the risk factor for each causal element. The first step in the process divides the maximum real option discount rate (specified by the user in system settings) by the number of causal elements. The second step in the process determines if the enterprise is highly rated on the causal elements of value using ranking algorithms like DEA and determines an appropriate risk factor. If the enterprise is highly ranked on the soft asset, then the discount rate is increased by a relatively small amount for that causal element. Alternatively, if the enterprise has a low ranking on a causal element, then the discount rate is increased by a relatively large amount for that causal element of value as shown below in Table 33. For options that are joint options enabled by the two or more enterprises within the organization, the same general procedure will be used, however, the relative strength of the different enterprises may be substituted for relative causal element of value strength in determining the appropriate discount rate.

TABLE 33

Maximum discount rate = 50%, Causal elements = 5
Maximum risk factor/soft asset = 50%/5 = 10%

| Industry Rank on Soft Asset | % of Maximum |
|---|---|
| 1 | 0% |
| 2 | 25% |
| 3 | 50% |
| 4 | 75% |
| 5 or higher | 100% |

TABLE 33-continued

Maximum discount rate = 50%, Causal elements = 5
Maximum risk factor/soft asset = 50%/5 = 10%

| Causal element: | Relative Rank | Risk Factor |
|---|---|---|
| Brand | 1 | 0% |
| Channel | 3 | 5% |
| Manufacturing Process | 4 | 7.5% |
| Strategic Alliances | 5 | 10% |
| Vendors | 2 | 2.5% |
| Subtotal | | 25% |
| Base Rate | | 12% |
| Discount Rate | | 37% |

The discount rate for industry options is calculated using a traditional total cost of capital approach that includes the cost of risk capital in a manner that is well known. After the appropriate discount rates are determined, the value of each real option and contingent liability is calculated using the specified algorithms in a manner that is well known. The real option can be valued using a number of algorithms including Black Scholes, binomial, neural network or dynamic programming algorithms. The industry option bots use the industry rankings from prior processing block to determine an allocation percentage for industry options. The more dominant the enterprise, as indicated by the industry rank for the element indicators, the greater the allocation of industry real options. Every option bot contains the information shown in Table 34.

TABLE 34

1. Unique ID number (based on date, hour, minute, second of creation)
2. Creation date (date, hour, minute, second)
3. Mapping information
4. Storage location
5. Organization
6. Industry or Enterprise
7. Real option type (Industry or Enterprise)
8. Real option algorithm (Black Scholes, Binomial, Quadranomial, Dynamic Program, etc.)

After the option bots are initialized, they activate in accordance with the frequency specified by the user (20) in the system settings table (140). After being activated, the bots retrieve information in order to complete the option valuations. When they are used, industry option bots go on to allocate a percentage of the calculated value of industry options to the enterprise on the basis of causal element strength. After the value of the real option, contingent liability or allocated industry option is calculated the resulting values are then saved in the real option value table (162) in the application database (50) by enterprise before processing advances to a block 332.

The software in block 332 checks the bot date table (149) and deactivates any cash flow bots with creation dates before the current system date. The software in the block then retrieves the information from the system settings table (140), the metadata mapping table (141), the advanced finance system table (147) and the segment definition table (156) as part of the process of initializing cash flow bots for each enterprise in accordance with the frequency specified by the user (20) in the system settings table (140).

Bots are independent components of the application that have specific tasks to perform. In the case of cash flow bots, their primary tasks are to calculate the cash flow for each enterprise for every time period where data are available and to forecast a steady state cash flow for each enterprise in the organization. Cash flow is calculated using the forecast revenue, expense, capital change and depreciation data retrieved from the advanced finance system table (147) with a well-known formula where cash flow equals period revenue minus period expense plus the period change in capital plus non-cash depreciation/amortization for the period. The steady state cash flow for each enterprise is calculated for the enterprise using forecasting methods identical to those disclosed previously in U.S. Pat. No. 5,615,109 to forecast revenue, expenses, capital changes and depreciation separately before calculating the cash flow. Every cash flow bot contains the information shown in Table 35.

TABLE 35

1. Unique ID number (based on date, hour, minute, second of creation)
2. Creation date (date, hour, minute, second)
3. Mapping information
4. Storage location
5. Organization
6. Enterprise After the cash flow bots are initialized, the bots activate in accordance with the frequency specified by the user (20) in the system settings table (140). After being activated the bots, retrieve the forecast data for each enterprise from the advanced finance system table (147) and then calculate a steady state cash flow forecast by enterprise. The resulting values by period for each enterprise are then stored in the cash flow table (161) in the application database (50) before processing advances to a block 333.

The software in block 333 checks the system settings table (140) in the application database (50) to determine if the current calculation is a new calculation or a structure change. If the calculation is not a new calculation or a structure change, then processing advances to a software block 341. Alternatively, if the calculation is new or a structure change, then processing advances to a software block 345.

The software in block 341 uses the cash flow by period data from the cash flow table (161) and the calculated requirement for working capital to calculate the value of excess financial assets for every time period by enterprise and stores the results of the calculation in the financial forecasts table (179) in the application database before processing advances to a block 342.

The software in block 342 checks the bot date table (149) and deactivates any financial value bots with creation dates before the current system date. The software in block 342 then retrieves the information from the system settings table (140), the metadata mapping table (141), the element definition table (155), the element variables table (158), the external factor definition table (169), the derivatives table (175) the financial forecasts table (179) and the factor variables table (182) as part of the process of initializing financial value bots for the derivatives and excess financial assets in accordance with the frequency specified by the user (20) in the system settings table (140).

Bots are independent components of the application that have specific tasks to perform. In the case of financial value bots, their primary task is to determine the relative contribution of element data and factor data identified in previous stages of processing on the value of derivatives and excess financial assets by enterprise. The system of the present invention uses 12 different types of predictive models to determine relative contribution: neural network; CART; projection pursuit regression; generalized additive model (GAM); GARCH; MMDR; redundant regression network; boosted Naïve Bayes Regression; the support vector method; MARS; linear regression; and stepwise regression. The model having the smallest amount of error as measured by applying the mean squared error algorithm to the test data is the best fit model. The "relative contribution algorithm" used for completing the analysis varies with the model that was selected as the "best-fit" as described previously. Every financial value bot activated in this block contains the information shown in Table 36.

TABLE 36

1. Unique ID number (based on date, hour, minute, second of creation)
2. Creation date (date, hour, minute, second)
3. Mapping information
4. Storage location
5. Organization
6. Enterprise
7. Derivative or Excess Financial Asset
8. Element Data or Factor Data
9. Predictive model type After the software in block 342 initializes the financial value bots, the bots activate in accordance with the frequency specified by the user (20) in the system settings table (140). Once activated, they retrieve the relevant information and sub-divide the data into two sets, one for training and one for testing. The same set of training data is used by each of the different types of bots for each model. After the financial bots complete their processing, the software in block 342 saves the calculated value contributions by element or external factor for derivatives in the derivatives table (175) by enterprise. The calculated value contributions by element or external factor for excess financial assets are then saved in the financial forecasts table (179) by enterprise in the application database (50) and processing advances to a block 343.

The software in block 343 checks the bot date table (149) and deactivates any element life bots with creation dates before the current system date. The software in block 343 then retrieves the information from the system settings table (140), the metadata mapping table (141) and the element definition table (155) as part of the process of initializing element life bots for each element and sub-element of value for each enterprise in the organization being analyzed.

Bots are independent components of the application that have specific tasks to perform. In the case of element life bots, their primary task is to determine the expected life of each element and sub-element of value. There are three methods for evaluating the expected life of the elements and sub-elements of value. Elements of value that are defined by a population of members or items (such as: channel partners, customers, employees and vendors) will have their lives estimated by analyzing and forecasting the lives of the members of the population. The forecasting of member lives will be determined by the "best" fit solution from competing life estimation methods including the Iowa type survivor curves, Weibull distribution survivor curves, Gompertz-Makeham survivor curves, polynomial equations using the methodology for selecting from competing forecasts disclosed in U.S. Pat. No. 5,615,109. Elements of value (such as some parts of Intellectual Property i.e. patents and insurance contracts) that have legally defined lives will have their lives calculated using the time period between the current date and the expiration date of the element or sub-element. Finally, elements of value and sub-element of value (such as brand names, information technology and processes) that may not have defined lives and/or that may not consist of a collection of members will have their lives estimated as a function of the enterprise Competitive Advantage Period (CAP). In the latter case, the estimate will be completed using the element vector trends and the stability of relative element strength. More specifically, lives for these element types are estimated by
1) subtracting time from the CAP for element volatility that exceeds cap volatility; and/or
2) subtracting time for relative element strength that is below the leading position and/or relative element strength that is declining;

The resulting values are stored in the element definition table (155) for each element and sub-element of value by enterprise. Every element life bot contains the information shown in Table 37.

TABLE 37

1. Unique ID number (based on date, hour, minute, second of creation)
2. Creation date (date, hour, minute, second)
3. Mapping information
4. Storage location
5. Organization
6. Enterprise
7. Element or sub-element of value
8. Life estimation method (item analysis, date calculation or relative to CAP)

After the element life bots are initialized, they are activated in accordance with the frequency specified by the user (20) in the system settings table (140). After being activated; the bots retrieve information for each element and sub-element of value from the element definition table (155) in order to complete the estimate of element life. The resulting values are then saved in the element definition table (155) by enterprise in the application database (50) before processing advances to a block 345.

The software in block 345 checks the system settings table (140) in the application database (50) to determine if the current calculation is a new calculation or a structure change. If the calculation is not a new calculation or a structure change, then processing advances to a software block 402. Alternatively, if the calculation is new or a structure change, then processing advances to a software block 348.

The software in block 348 checks the bot date table (149) and deactivates any component capitalization bots with creation dates before the current system date. The software in block 348 then retrieves the information from the system settings table (140), the metadata mapping table (141) and the segment definition table (156) as part of the process of initializing component capitalization bots for each enterprise in the organization.

Bots are independent components of the application that have specific tasks to perform. In the case of component capitalization bots, their task is to determine the capitalized value of the components and subcomponents of value—forecast revenue, forecast expense or forecast changes in capital for each enterprise in the organization in accordance with the formula shown in Table 38.

TABLE 38

$$\text{Value} = F_{f1}/(1+K) + F_{f2}/(1+K)^2 + F_{f3}/(1+K)^3 + F_{f4}/(1+K)^4 +$$
$$(F_{f4} \times (1+G))/(1+K)^5 + (F_{f4} \times (1+g)^2)/(1+K)^6 \ldots +$$
$$(F_{f4} \times (1+g)^N)/(1+K)^{N+4})$$

Where:
$F_{fx}$ = Forecast revenue, expense or capital requirements for year x after valuation date (from advanced finance system)
N = Number of years in CAP (from prior calculation)
K = Total average cost of capital – % per year (from prior calculation)
g = Forecast growth rate during CAP – % per year (from advanced financial system)

After the calculation of capitalized value of every component and sub-component of value is complete, the results are stored in the segment definition table (156) by enterprise in the application database (50). Every component capitalization bot contains the information shown in Table 39.

TABLE 39

1. Unique ID number (based on date, hour, minute, second of creation)
2. Creation date (date, hour, minute, second)
3. Mapping information
4. Storage location
5. Organization
6. Enterprise
7. Component of value (revenue, expense or capital change)
8. Sub component of value After the component capitalization bots are initialized, they activate in accordance with the frequency specified by the user (20) in the system settings table (140). After being activated, the bots retrieve information for each component and sub-component of value from the advanced finance system table (147) and the segment definition table (156) in order to calculate the capitalized value of each component for each enterprise in the organization. The resulting values are then saved in the segment definition table (156) in the application database (50) by enterprise before processing advances to a block 349.

The software in block 349 checks the bot date table (149) and deactivates any current operation bots with creation dates before the current system date. The software in block 349 then retrieves the information from the system settings table (140), the metadata mapping table (141), the element definition table (155), the segment definition table (156), the vector table (163), the external factor definition table (169), the financial forecasts table (179) and the factor variables table (182) as part of the process of initializing valuation bots for each element of value, sub-element of value, combination of elements, value driver and/or external factor for the current operation.

Bots are independent components of the application that have specific tasks to perform. In the case of current operation bots, their task is to calculate the contribution of every element of value, sub-element of value, element combination, value driver, external factor and factor combination to the current operation segment of enterprise value. For calculating the current operation portion of element value, the bots use the procedure outlined in Table 5. The first step in completing the calculation in accordance with the procedure outlined in Table 5, is determining the relative contribution of each element, sub-element, combination of elements or value driver by using a series of predictive models to find the best fit relationship between:
1. The element of value vectors, element combination vectors and external factor vectors, factor combination vectors and value drivers and the enterprise components of value they correspond to; and
2. The sub-element of value vectors and the element of value they correspond to.

The system of the present invention uses 12 different types of predictive models to identify the best fit relationship: neural network; CART; projection pursuit regression; generalized additive model (GAM); GARCH; MMDR; redundant regression network; boosted Naïve Bayes Regression; the support vector method; MARS; linear regression; and stepwise regression. The model having the smallest amount of error as measured by applying the mean squared error algorithm to the test data is the best fit model. The "relative contribution algorithm" used for completing the analysis varies with the model that was selected as the "best-fit". For example, if the "best-fit" model is a neural net model, then the portion of revenue attributable to each input vector is determined by the formula shown in Table 40.

TABLE 40

$$\left(\sum_{k=1}^{k=m}\sum_{j=1}^{j=n}I_{jk}\times O_k \Big/ \sum_{j=1}^{j=n}I_{ik}\right) \Big/ \sum_{k=1}^{k=m}\sum_{j=1}^{j=n}I_{jk}\times O_k$$

Where
$I_{jk}$ = Absolute value of the input weight from input node j to hidden node k
$O_k$ = Absolute value of output weight from hidden node k
M = number of hidden nodes
N = number of input nodes After the relative contribution of each element of value, sub-element of value, external factor, element combination, factor combination and value driver to the components of current operation value is determined, the results of this analysis are combined with the previously calculated information regarding element life and capitalized component value to complete the valuation of each: element of value, sub-element of value, external factor, element combination, factor combination and value driver using the approach shown in Table 41.

TABLE 41

| Component Values: | Percentage | Element Life/CAP | Net Value |
|---|---|---|---|
| Revenue value = $120 M | 20% | 80% | Value = $19.2 M |
| Expense value = ($80 M) | 10% | 80% | Value = ($6.4) M |
| Capital value = ($5 M) | 5% | 80% | Value = ($0.2) M |
| Total value = $35 M | | | |
| Net value for this element: | | | Value = $12.6 M |

The resulting values are stored in: the element definition table (155) for each element of value, sub-element of value, element combination and value driver by enterprise. For external factor and factor combination value calculations, the external factor percentage is multiplied by the capitalized component value to determine the external factor value. The resulting values for external factors are saved in the external factor definition table (169) by enterprise.

Every current operation bot contains the information shown in Table 42.

TABLE 42

1. Unique ID number (based on date, hour, minute, second of creation)
2. Creation date (date, hour, minute, second)
3. Mapping information
4. Storage location
5. Organization
6. Enterprise
7. Element, sub-element, factor, element combination, factor combination or value driver
8. Component of value (revenue, expense or capital change)

After the current operation bots are initialized by the software in block 349 they activate in accordance with the frequency specified by the user (20) in the system settings table (140). After being activated, the bots retrieve information and complete the valuation for the segment being analyzed. As described previously, the resulting values are then saved in the element definition table (155) or the external factor definition table (169) in the application database (50) by enterprise before processing advances to a block 350.

The software in block 350 checks the bot date table (149) and deactivates any residual bots with creation dates before the current system date. The software in block 350 then retrieves the information from the system settings table (140), the metadata mapping table (141), the element definition table (155) and the external factor definition table (169) as part of the process of initializing residual bots for the each enterprise in the organization.

Bots are independent components of the application that have specific tasks to perform. In the case of residual bots, their task is to retrieve data from the element definition table (155) the segment definition table (156) and the external factor definition table (169) to calculate the residual going concern value for each enterprise in accordance with the formula shown in Table 43.

TABLE 43

Residual Going Concern Value = Total Current-Operation Value −
Σ Required Financial Asset Values − Σ Elements of Value −
Σ External Factors Every residual bot contains the information shown in Table 44.

TABLE 44

1. Unique ID number (based on date, hour, minute, second of creation)
2. Creation date (date, hour, minute, second)
3. Mapping information
4. Storage location
5. Organization
6. Enterprise After the residual bots are initialized they activate in accordance with the frequency specified by the user (20) in the system settings table (140). After being activated, the bots retrieve information in order to complete the residual calculation for each enterprise. After the calculation is complete, the resulting values are then saved in the element definition table (155) by enterprise in the application database (50) before processing advances to a software block 351.

The software in block 351 determines the contribution of each element of value to the value of the real option segment of value for each enterprise. For enterprise options, the value of each element is determined by comparing the value of the enterprise options to the value that would have been calculated if the element had an average level of strength. Elements that are relatively strong, reduce the discount rate and increase the value of the option. In a similar fashion, elements that are below average in strength increase the discount rate and decrease the value of the option. The value impact can be determined by subtracting the calculated value of the option from the value of the option with the average element. The resulting values are saved in the element definition table (155) by enterprise before processing advances to block 352.

The software in block 352 checks the bot date table (149) and deactivates any sentiment calculation bots with creation dates before the current system date. The software in block 352 then retrieves the information from the system settings table (140), the metadata mapping table (141), the external database table (146), the element definition table (155), the segment definition table (156), the real option value table (162) and the derivatives table (175) as part of the process of initializing sentiment calculation bots for the organization.

Bots are independent components of the application that have specific tasks to perform. In the case of sentiment calculation bots, their task is to retrieve data and then calculate the sentiment for each enterprise in accordance with the formula shown in Table 45.

TABLE 45

Sentiment = Market Value for Enterprise − Current Operation Value − Σ Real Option Values − Value of Excess Financial Assets − Σ Derivative Values Enterprises that are not public corporations will, of course, not have a market value so no calculation will be completed for these enterprises. The sentiment for the organization will be calculated by subtracting the total for each of the five segements of value for all enterprises in the organization from the total market value for all enterprises in the organization. Every sentiment calculation bot contains the information shown in Table 46.

TABLE 46

1. Unique ID number (based on date, hour, minute, second of creation)
2. Creation date (date, hour, minute, second)
3. Mapping information
4. Storage location
5. Organization
6. Enterprise
7. Type: Organization or Enterprise After the sentiment calculation bots are initialized, they activate in accordance with the frequency specified by the user (20) in the system settings table (140). After being activated, the bots retrieve information from the system settings table (140), the external database table (146), the element definition table (155), the segment definition table (156), the real option value table (162), the derivatives table (175) and the financial forecasts table (179) in order to complete the sentiment calculation for each enterprise and the organization. After the calculation is complete, the resulting values are then saved in the enterprise sentiment table (166) in the application database (50) before processing advances to a block 353.

The software in block 353 checks the bot date table (149) and deactivates any sentiment analysis bots with creation dates before the current system date. The software in block 352 then retrieves the information from the system settings table (140), the metadata mapping table (141), the external database table (146), the industry ranking table (154), the element definition table (155), the segment definition table (156), the real option value table (162), the vector table (163), the enterprise sentiment table (166) and the external factor definition table (169) as part of the process of initializing sentiment analysis bots for the enterprise.

Bots are independent components of the application that have specific tasks to perform. In the case of sentiment analysis bots, their primary task is to determine the composition of the calculated sentiment for each enterprise in the organization and the organization as a whole. One part of this analysis is completed by comparing the portion of overall market value that is driven by the different elements of value as determined by the bots in software block 329 and the calculated valuation impact of each element of value on the segments of value as shown below in Table 47.

TABLE 47

Total Enterprise Market Value = $100 Billion, 10% driven by Brand factors
Implied Brand Value = $100 Billion × 10% = $10 Billion
Brand Element Current Operation Value = $6 Billion
Increase/(Decrease) in Enterprise Real Option Values* Due to Brand = $1.5 Billion
Increase/(Decrease) in Derivative Values due to Brands = $0.0
Increase/(Decrease) in excess Financial Asset Values due to Brands = $0.25 Billion
Brand Sentiment = $10 − $6 − $1.5 − $0.0 − $0.25 = $2.25 Billion

*includes allocated industry options when used in the calculation

The sentiment analysis bots also determine the impact of external factors on sentiment. Every sentiment analysis bot contains the information shown in Table 48.

TABLE 48

1. Unique ID number (based on date, hour, minute, second of creation)
2. Creation date (date, hour, minute, second)
3. Mapping information
4. Storage location
5. External factor or element of value
6. Organization
7. Enterprise After the sentiment analysis bots are initialized, they activate in accordance with the frequency specified by the user (20) in the system settings table (140). After being activated, the bots retrieve information from the system settings table (140), the metadata mapping table (141), the industry ranking table (154), the element definition table (155), the segment definition table (156), the real option value table (162), the enterprise sentiment table (166), the external factor definition table (169), the derivatives table (175) and the financial forecasts table (179) in order to analyze sentiment. The resulting breakdown of sentiment is then saved in the enterprise sentiment table (166) by enterprise in the application database (50). Sentiment at the organization level is calculated by adding together the sentiment calculations for all the enterprises in the organization. The results of this calculation are also saved in the enterprise sentiment table (166) in the application database (50) before processing advances to a software block 402 where the risk analysis for the organization is started.

Risk Analysis

Figure 7:
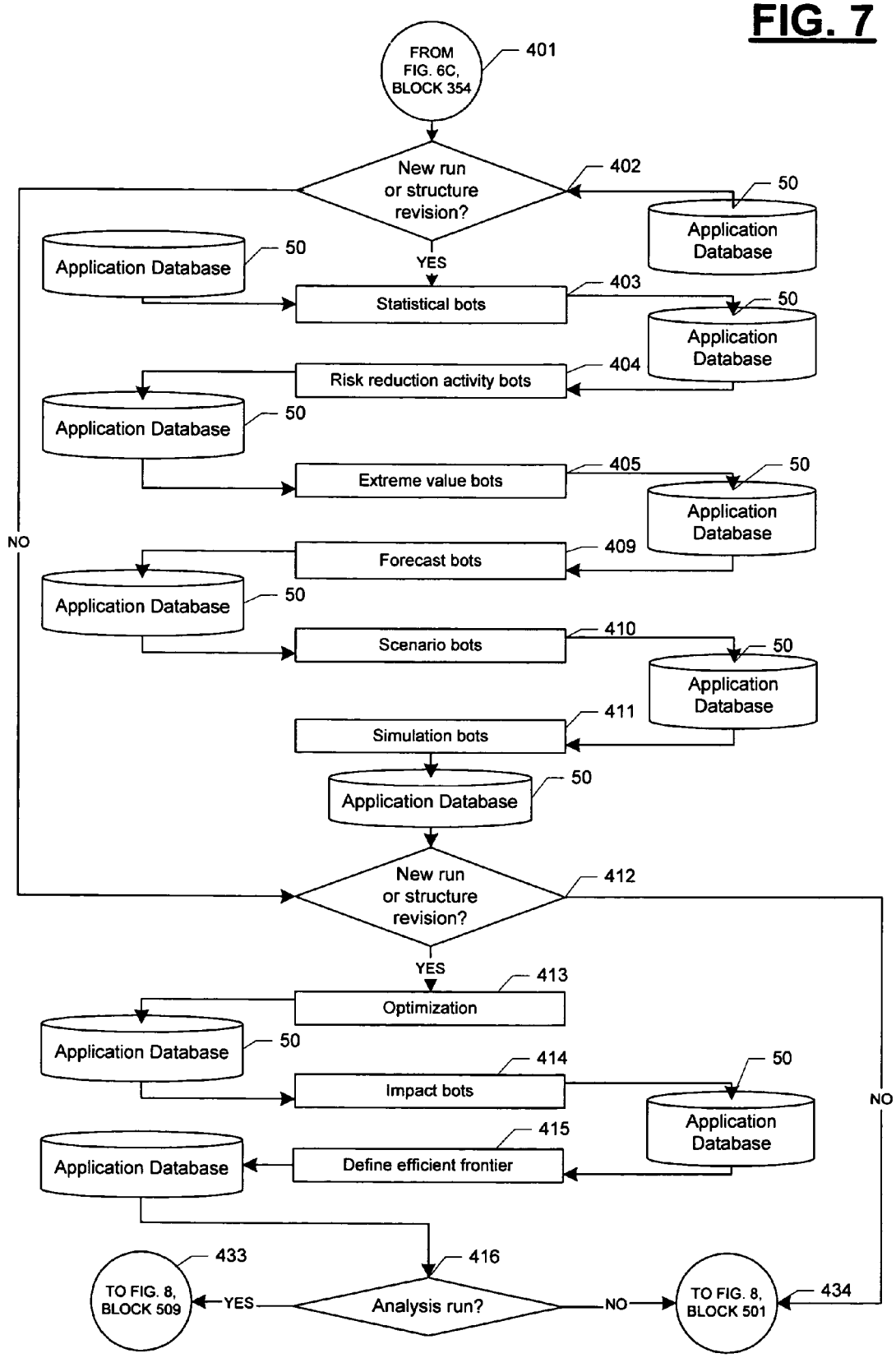
FIG. 7 is a block diagram showing the sequence of steps in the present invention used for analyzing the risk associated with the organization by enterprise.

The flow diagram in FIG. 7 details the processing that is completed by the portion of the application software (400) that analyzes and develops the matrix of risk (FIG. 10) for each enterprise in the organization. The matrix of risk includes two types of risk—the risk associated with variability in the elements and factors driving enterprise value and the risk associated with events like hurricanes and competitor actions.

System processing in this portion of the application software (400) begins in a block 402. The software in block 402 checks the system settings table (140) in the application database (50) to determine if the current calculation is a new calculation or a structure change. If the calculation is not a new calculation or a structure change, then processing advances to a software block 412. Alternatively, if the calculation is new or a structure change, then processing advances to a software block 403.

The software in block 403 checks the bot date table (149) and deactivates any statistical bots with creation dates before the current system date. The software in block 403 then retrieves the information from the system settings table (140), the external database table (146), the element definition table (155), the element variables table (158) and the factor variables table (182) as part of the process of initializing statistical bots for each causal value driver and external factor.

Bots are independent components of the application that have specific tasks to perform. In the case of statistical bots, their primary tasks are to calculate and store statistics such as mean, median, standard deviation, slope, average period change, maximum period change, variance and covariance for each causal value driver and external factor for all value drivers and external factors. Covariance with the market as a whole is also calculated for each value driver and external factor. Every statistical bot contains the information shown in Table 49.

TABLE 49

1. Unique ID number (based on date, hour, minute, second of creation)
2. Creation date (date, hour, minute, second)
3. Mapping information
4. Storage location
5. Organization
6. Enterprise
7. Element or factor variable When bots in block 403 have identified and stored statistics for each causal value driver and external factor in the statistics table (170) by enterprise, processing advances to a software block 404.

The software in block 404 checks the bot date table (149) and deactivates any risk reduction activity bots with creation dates before the current system date. The software in block 404 then retrieves the information from the system settings table (140), the external database table (146), the element definition table (155), the element variables table (158), the factor variables table (182) and the statistics table (170) as part of the process of initializing risk reduction activity bots for each causal value driver and external factor.

Bots are independent components of the application that have specific tasks to perform. In the case of risk reduction activity bots, their primary tasks are to identify actions that can be taken by the enterprise to reduce risk. For example, if one customer presents a significant risk to the enterprise, then the risk reduction bot might identify a reduction in the credit line for that customer to reduce the risk. Every risk reduction activity bot contains the information shown in Table 50.

TABLE 50

1. Unique ID number (based on date, hour, minute, second of creation)
2. Creation date (date, hour, minute, second)
3. Mapping information
4. Storage location
5. Organization
6. Enterprise
7. Value driver or external factor When bots in block 404 have identified and stored risk reduction activities in the risk reduction activity table (165) by enterprise, processing advances to a software block 405.

The software in block 405 checks the bot date table (149) and deactivates any extreme value bots with creation dates before the current system date. The software in block 405 then retrieves the information from the system settings table (140), the external database table (146), the element definition table (155), the element variables table (158) and the factor variables table (182) as part of the process of initializing extreme value bots in accordance with the frequency specified by the user (20) in the system settings table (140).

Bots are independent components of the application that have specific tasks to perform. In the case of extreme value bots, their primary task is to identify the extreme values for each causal value driver and external factor by enterprise. The extreme value bots use the Blocks method and the peak over threshold method to identify extreme values. Other extreme value algorithms can be used to the same effect. Every extreme value bot activated in this block contains the information shown in Table 51.

TABLE 51

1. Unique ID number (based on date, hour, minute, second of creation)
2. Creation date (date, hour, minute, second)
3. Mapping information
4. Storage location
5. Organization
6. Enterprise
7. Method: blocks or peak over threshold
8. Value driver or external factor After the extreme value bots are initialized, they activate in accordance with the frequency specified by the user (20) in the system settings table (140). Once activated, they retrieve the relevant information and determine the extreme value range for each value driver or external factor. The bot saves the extreme values for each causal value driver and external factor in the statistics table (170) by enterprise in the application database (50) and processing advances to a block 409.

The software in block 409 checks the bot date table (149) and deactivates any forecast bots with creation dates before the current system date. The software in block 409 then retrieves the information from the system settings table (140), the external database table (146), the advanced finance system table (147), the element definition table (155), the element variables table (158), the financial forecasts table (179) and the factor variables table (182) as part of the process of initializing forecast bots in accordance with the frequency specified by the user (20) in the system settings table (140).

Bots are independent components of the application that have specific tasks to perform. In the case of forecast bots, their primary task is to compare the forecasts stored for external factors and financial asset values with the information available from futures exchanges. Every forecast bot activated in this block contains the information shown in Table 52.

TABLE 52

1. Unique ID number (based on date, hour, minute, second of creation)
2. Creation date (date, hour, minute, second)
3. Mapping information
4. Storage location
5. Organization
6. Enterprise
7. External factor or financial asset
8. Forecast time period After the forecast bots are initialized, they activate in accordance with the frequency specified by the user (20) in the system settings table (140). Once activated, they retrieve the relevant information and determine if any forecasts need to be changed to bring them in line with the market data on future values. The bot saves the updated forecasts in the appropriate tables in the application database (50) by enterprise and processing advances to a block 410.

The software in block 410 checks the bot date table (149) and deactivates any scenario bots with creation dates before the current system date. The software in block 410 then retrieves the information from the system settings table (140), the operation system table (144), the external database table (146), the advanced finance system table (147), the element definition table (155), the external factor definition table (169) and the statistics table (170) as part of the process of initializing scenario bots in accordance with the frequency specified by the user (20) in the system settings table (140).

Bots are independent components of the application that have specific tasks to perform. In the case of scenario bots, their primary task is to identify likely scenarios for the evolution of the causal value drivers and external factors by enterprise. The scenario bots use information from the advanced finance system, external databases and the forecasts completed in the prior stage to obtain forecasts for specific value drivers and factors before using the covariance information stored in the statistics table (170) to develop forecasts for the other causal value drivers and factors under normal conditions. They also use the extreme value information calculated by the previous bots and stored in the statistics table (170) to calculate extreme scenarios. Every scenario bot activated in this block contains the information shown in Table 53.

TABLE 53

1. Unique ID number (based on date, hour, minute, second of creation)
2. Creation date (date, hour, minute, second)
3. Mapping information
4. Storage location
5. Type: normal or extreme
6. Organization
7. Enterprise After the scenario bots are initialized, they activate in accordance with the frequency specified by the user (20) in the system settings table (140). Once activated, they retrieve the relevant information and develop a variety of scenarios as described previously. After the scenario bots complete their calculations, they save the resulting scenarios in the scenarios table (171) by enterprise in the application database (50) and processing advances to a block 411.

The software in block 411 checks the bot date table (149) and deactivates any simulation bots with creation dates before the current system date. The software in block 410 then retrieves the information from the system settings table (140), the operation system table (144), the advanced finance system table (147), the element definition table (155), the external database table (156), the external factor definition table (169), the statistics table (170), the scenarios table (171) and the generic risk table (178) as part of the process of initializing simulation bots in accordance with the frequency specified by the user (20) in the system settings table (140).

Bots are independent components of the application that have specific tasks to perform. In the case of simulation bots, their primary task is to run three different types of simulations for the enterprise. The simulation bots run simulations of organizational financial performance and valuation using: the two types of scenarios generated by the scenario bots—normal and extreme, they also run an unconstrained genetic algorithm simulation that evolves to the most negative value. In addition to examining the economic factors that were identified in the previous analysis, the bots simulate the impact of event risks like fire, earthquakes, floods and other weather-related phenomena that are largely un-correlated with the economic scenarios. Event risks are as the name implies events that may have adverse financial impacts. They generally have a range of costs associated with each occurrence. For example, every time someone slips and falls in the factor it costs $2,367 for medical bills and lost time. The information on frequency and cost associated with these events is typically found in risk management systems. However, as discussed previously, external databases (25) may also contain information that is useful in evaluating the likelihood and potential damage associated with these risks. Event risks can also be used to project the risk associated with competitor actions, government legislation and market changes. Every simulation bot activated in this block contains the information shown in Table 54.

TABLE 54

1. Unique ID number (based on date, hour, minute, second of creation)
2. Creation date (date, hour, minute, second)
3. Mapping information
4. Storage location
5. Type: normal, extreme or genetic algorithm
6. Risk factors: economic variability or event
7. Segment of value: current operation, real options, financial assets, derivatives or market sentiment
8. Organization
9. Enterprise After the simulation bots are initialized, they activate in accordance with the frequency specified by the user (20) in the system settings table (140). Once activated, they retrieve the relevant information and simulate the financial performance and value impact of the different scenarios on each segment of value by enterprise. After the simulation bots complete their calculations, the resulting risk forecasts are saved in the simulations table (168) and the xml summary table (177) by enterprise in the application database (50) and processing advances to a block 412.

The software in block 412 checks the system settings table (140) in the application database (50) to determine if the current calculation is a new calculation or a structure change. If the calculation is not a new calculation or a structure change, then processing advances to a software block 502. Alternatively, if the calculation is new or a structure change, then processing advances to a software block 413.

The software in block 413 continually runs an analysis to define the optimal risk reduction strategy for the normal and extreme scenarios for each enterprise in the organization. It starts this process by retrieving data from the system settings table (140), the operation system table (144), the external database table (146), the advanced finance system table (147), the element definition table (155), the external factor definition table (169), the statistics table (170), the scenario table (171), the risk reduction products table (173) and the risk reduction activity table (165) by enterprise. The software in the block determines the optimal mix of risk reduction products (derivative purchase, insurance purchase, etc.) and risk reduction activities (reducing credit limits for certain customers, shifting production from high risk to lower risk countries, etc.) for the company under each scenario given the confidence interval established by the user (20) in the system settings table (140) using a linear programming optimization algorithm. A multi criteria optimization is also run at this stage to determine the best mix for reducing risk under combined normal and extreme scenarios. Other optimization algorithms can be used at this point to achieve the same result. In any event, the resulting product and activity mix for each set of scenarios and the combined analysis is saved in the optimal mix table (175) and the xml summary table (177) in the application database (50) by enterprise and the revised simulations are saved in the simulations table (168) by enterprise before processing passes to a software block 414. The shadow prices from optimizations are also stored in the risk reduction products table (173) and the xml summary table (177) by enterprise for use in identifying new risk reduction products that the company may wish to purchase and/or new risk reduction activities the company may wish to develop. After the results of this optimization are stored in the application database (50) by enterprise, processing advances to a software block 414.

The software in block 414 checks the bot date table (149) and deactivates any impact bots with creation dates before the current system date. The software in block 414 then retrieves the information from the system settings table (140), the operation system table (144), the external database table (146), the advanced finance system table (147), the element definition table (155), the simulations table (168), the external factor definition table (169), the statistics table (170), the scenario table (171) and the optimal mix table (175) as part of the process of initializing value impact bots in accordance with the frequency specified by the user (20) in the system settings table (140).

Bots are independent components of the application that have specific tasks to perform. In the case of impact bots, their primary task is to determine the value impact of each risk reduction product and activity—those included in the optimal mix and those that are not—on the different scenarios by enterprise. Every impact bot contains the information shown in Table 55.

TABLE 55

1. Unique ID number (based on date, hour, minute, second of creation)
2. Creation date (date, hour, minute, second)
3. Mapping information
4. Storage location
5. Organization
6. Enterprise
7. Risk reduction product or activity After the software in block 414 initializes the value impact bots, they activate in accordance with the frequency specified by the user (20) in the system settings table (140). After being activated, the bots retrieve information in order to revise the simulations of enterprise performance and determine the risk reduction impact of each product on each simulation. The resulting forecast of value impacts are then saved in the risk reduction products table (173) or the risk reduction activity table (165) by enterprise as appropriate in the application database (50) before processing advances to a block 415.

The software in block 415 continually calculates the maximum enterprise value for each of the minimum risk strategies (normal, extreme and combined scenarios) defined in the previous section. The software in the block starts this process by retrieving data from the system settings table (140), the operation system table (144), the external database table (146), the advanced finance system table (147), the element definition table (155), the risk reduction activity table (165), the external factor definition table (169), the statistics table (170), the scenario table (171), the risk reduction products table (173), the financial forecasts table (179), the factor variables table (182) and the analysis definition table (183) in order to define and initialize a probabilistic simulation model for each scenario. One embodiment of the probabilistic simulation model is a Markov Chain Monte Carlo model, however, other simulation models can be used with similar results. The model for each risk scenario is optimized using an optimization algorithm to identify the maximum enterprise value given the scenario risk profile. After the point of maximum value and minimum risk is identified for each scenario, the enterprise risk levels are increased and reduced in small increments and the optimization process is repeated until the efficient frontier for each scenario has been defined. The baseline efficient frontier is based on the scenario that combined normal and extreme risk scenarios, however the results of all 3 sets of calculations (normal, extreme and combined) are saved in the report table (164) in sufficient detail to generate a chart like the one shown in FIG. 12 before processing advances to a block 416.

The software in block 416 checks the analysis definition table (183) in the application database (50) to determine if the current calculation a structure change analysis. If the calculation is not a structure change analysis, then processing advances to a software block 502. Alternatively, if the calculation is a structure change analysis, then processing advances to a software block 510.

Analysis & Output

Figure 8:
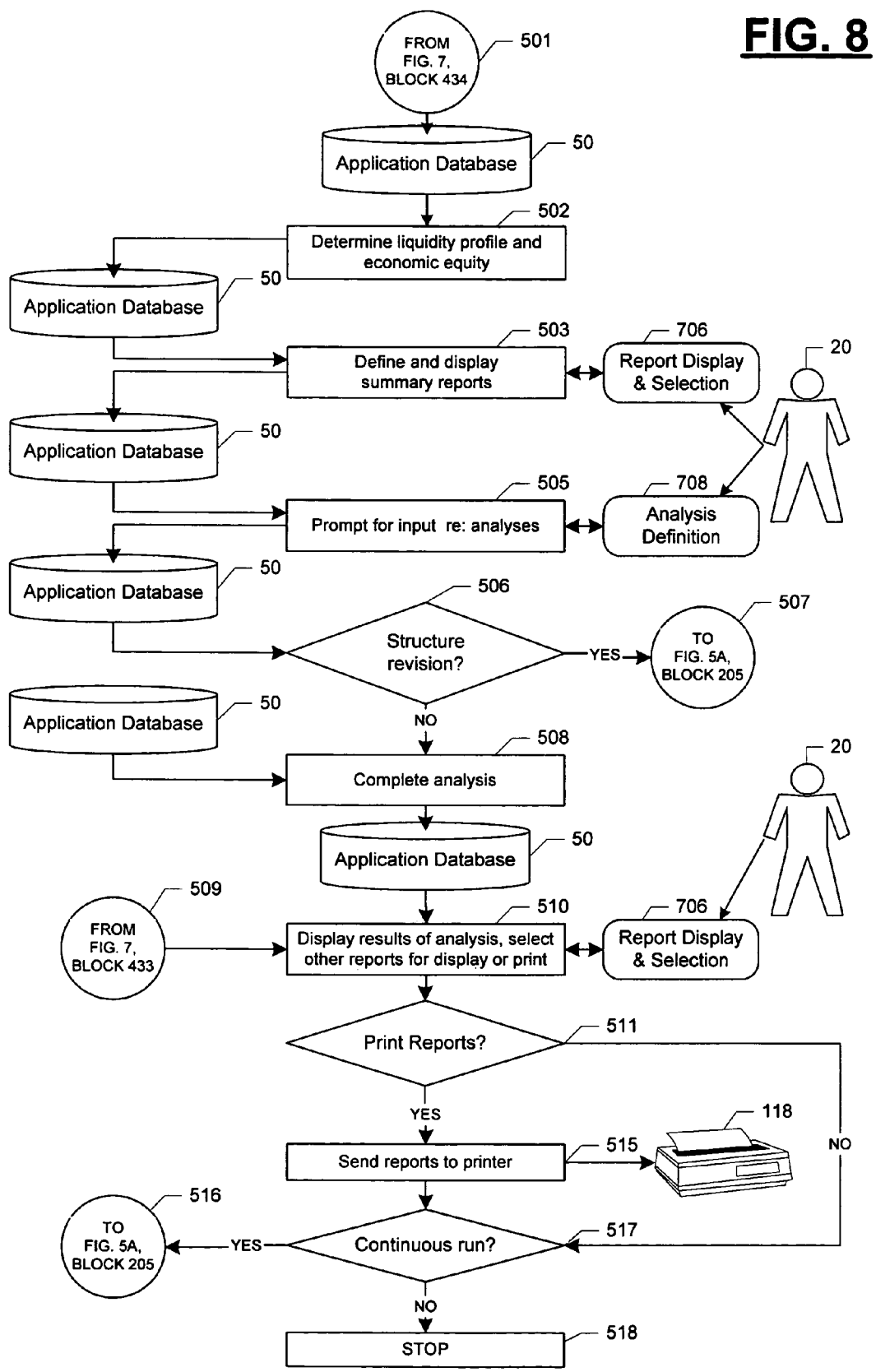
FIG. 8 is a block diagram showing the sequence in steps in the present invention used in defining and displaying the matrix of value, the matrix of risk and the efficient frontier for the organization.

The flow diagram in FIG. 8 details the processing that is completed by the portion of the application software (500) that generates the matrices of value and risk for the organization, generates a summary of the value, risk and liquidity for the organization, analyzes changes in organization structure and operation and optionally displays and prints management reports detailing the value matrix, risk matrix and the efficient frontier. Processing in this portion of the application starts in software block 502.

The software in block 502 retrieves information from the system settings table (140), the advanced finance system table the cash flow table (161) and the financial forecasts table (179) that is required to calculate the minimum amount of working capital that will be available during the forecast time period. The system settings table (140) contains the minimum amount of working capital that the user (20) indicated was required for enterprise operation while the cash flow table (161) contains a forecast of the cash flow of the enterprise for each period during the forecast time period (generally the next 36 months). A summary of the available cash and cash deficits by currency, by month, for the next 36 months is stored in a summary xml format in the xml summary table (177) by enterprise during this stage of processing. After the amount of available cash for each enterprise and the organization is calculated and stored in the risk reduction purchase table (165), processing advances to a software block 503.

The software in block 503 retrieves information from the element definition table (155), segment definition table (156), element variables table (158), real option value table (162), risk reduction activity table (165), enterprise sentiment table (166), external factor definition table (169), derivatives table (175), xml summary table (177), financial forecasts table (179) and factor variables table (182) in order to generate the matrix of value (FIG. 9) and the matrix of risk (FIG. 10) by enterprise for the organization. The matrices are stored in the report table (164) and a summary version of the data is added to the xml summary table (177). The software in this block also creates and displays a summary Organization Value Matrix (FIG. 9) and/or Organization Risk Matrix (FIG. 10) via the report display and selection window (706). After the user (20) indicates that his or her review of the summary report is complete, processing advances to a block 505.

The software in block 505 prompts the user (20) via the analysis definition window (709) to specify changes in the organization that should be analyzed. The user (20) is given the option of: re-defining the structure for analysis purposes, examining the impact of changes in segments of value, components of value, elements of value and/or external factors on organization value and risk and/or optimizing a subset of the organization such as a segment of value, a component of value or a frame. For example, the user (20) may wish to:

1. redefine the efficient frontier without considering the impact of market sentiment on organization value—this analysis would be completed by temporarily re-defining the structure and completing a new analysis;
2. redefine the efficient frontier after adding in the matrix of value and risk for another enterprise that may be purchased—this analysis would be completed by temporarily re-defining the structure and completing a new analysis;
3. forecast the the likely impact of a project on organization value and risk—this analysis would be completed by mapping the expected results of the project to organization segments of value, components of value, elements of value and/or external factors, recalculating value, liquidity and risk and then determining if the organization would be closer to or further from the efficient frontier if the project were implemented;
4. forecast the impact of changing economic conditions on the organizations ability to repay its debt—this analysis would be completed by mapping the expected changes to organization, recalculating value, liquidity and risk and then determining if the organization will in a better position to repay its debt; or
5. maximize revenue from all enterprises in the organization—this analysis would be completed by defining a new model, the impact on the organization could be determined by using the output from the optimization to complete an analysis similar to the one described in item 3.

The software in block 505 saves the analysis definitions the user (20) specifies in the analysis definition table (183) in the application database (50) before processing advances to a software block 506.

The software in block 506 checks the analysis definition table (183) in the application database (50) to determine if the user (20) has specified a structure change analysis. If the calculation is a structure change analysis, then processing returns to block 205 and the processing described previously is repeated. Alternatively, if the calculation is not a structure change analysis, then processing advances to a software block 508.

The software in block 508 retrieves information from the xml summary table (177) and the analysis definition table (183) in order to determine what type of analysis will be completed and define a model for analysis. As mentioned previously, there are two types of analysis that may be completed by the software in this block—analyzing the impact of forecast changes and optimizing a subset of the organization. Analyzing the impact of changes to future values of external factors, segments of value, components of value, value drivers and/or elements of value requires recalculating value and risk for the affected portions of organization value and/or risk by enterprise and comparing the new totals for the organization to the value, risk and efficient frontier information stored in the xml summary table (177). The results of this comparison, including the information required to generate a graph like the one shown in FIG. 13 are then stored in the analysis definition table (183) before processing advances to software block 510. Alternatively, if the analysis involves optimizing a subset of the organization then the software in block 508 defines and initializes a probabilistic simulation model for the subset of the organization that is being analyzed. One embodiment of the probabilistic simulation models are Markov Chain Monte Carlo models, however, other simulation models can be used with similar results. The model is defined using the information retrieved from the xml summary table (177) and the analysis definition table (183) and then iterates in order to ensure the convergence of the frequency distribution of the output variables. After the calculation has been completed, the software in block 508 saves the resulting information in the analysis definition table (183) before processing advances to software block 510.

Figure 11:
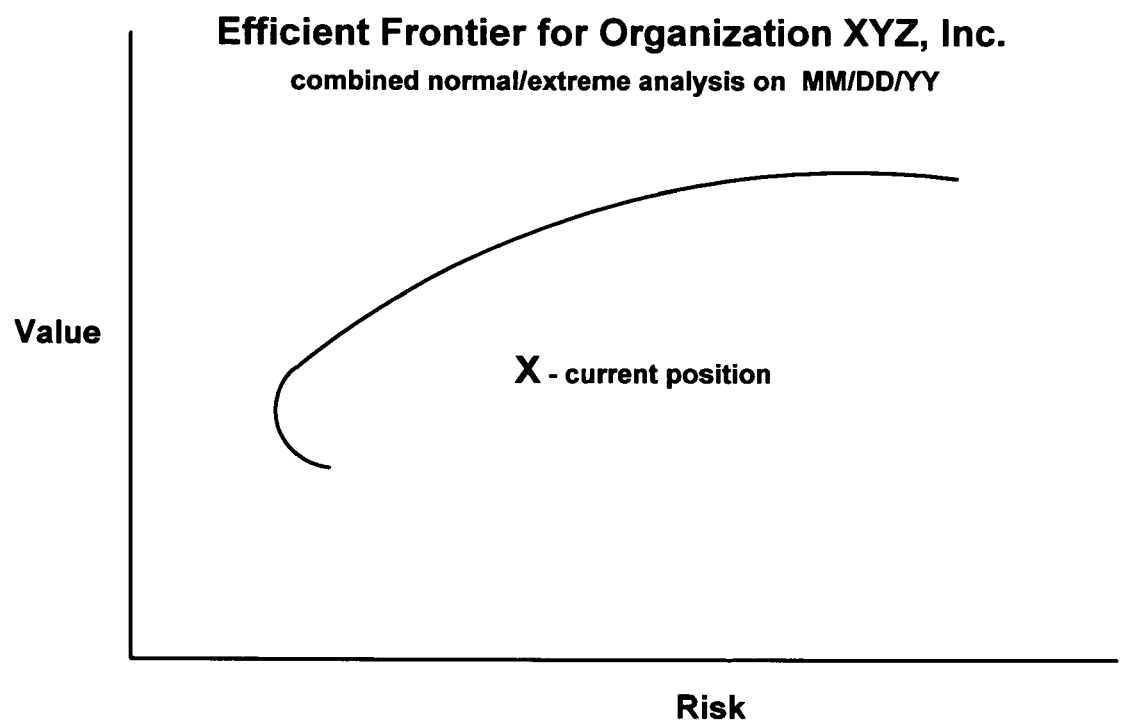
FIG. 11 is a sample report showing the efficient frontier for Organization XYZ and the current position of XYZ relative to the efficient frontier.
Figure 12:
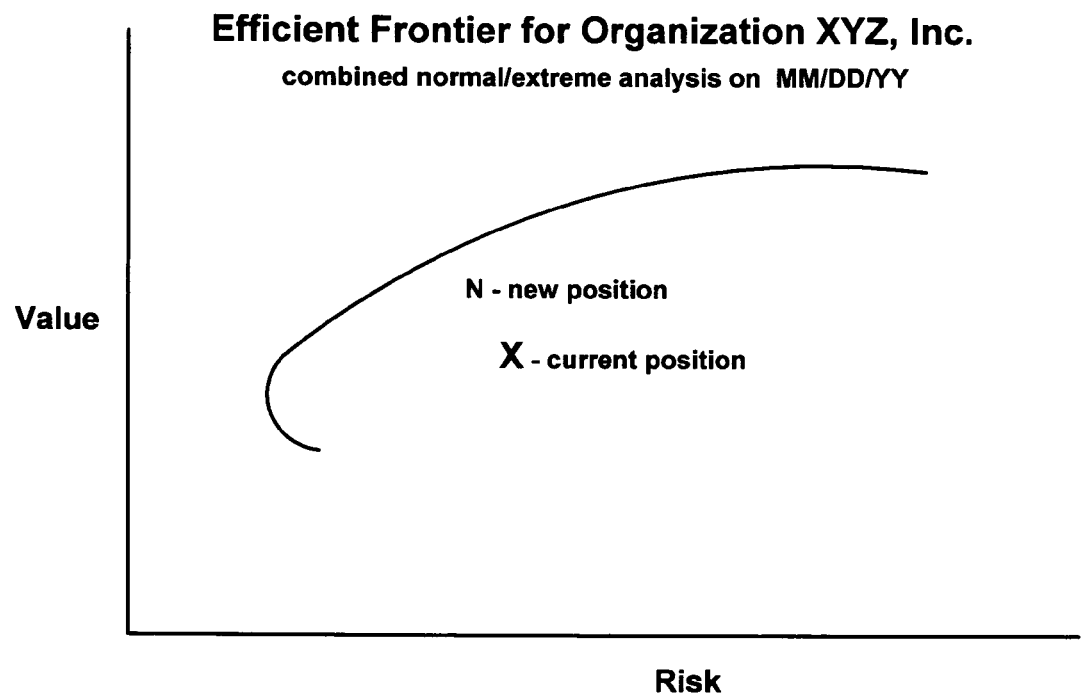
FIG. 12 is a sample report showing the efficient frontier for Organization XYZ, the current position of XYZ relative to the efficient frontier and the forecast of the new position of XYZ relative to the efficient frontier after user specified changes are implemented.

The software in block 510 displays the results of any analyses with the report display and selection window (706) to the user (20). The user (20) optionally selects reports for display and/or printing. The format of the reports is either graphical, numeric or both depending on the type of report the user (20) specified in the system settings table (140). Typical formats for graphical reports displaying the efficient frontier are shown in FIG. 11 and FIG. 12. If the user (20) selects any reports for printing, then the information regarding the selected reports is saved in the reports table (164). After the user (20) has finished selecting reports, the selected reports are displayed to the user (20). After the user (20) indicates that the review of the reports has been completed, processing advances to a software block 511.

The software in block 511 checks the reports tables (164) to determine if any reports have been designated for printing. If reports have been designated for printing, then processing advances to a block 515. It should be noted that in addition to standard reports like the matrix of value, the matrix of risk and the graphical depictions of the efficient frontier shown in FIG. 11 and FIG. 12 the system of the present invention can generate reports that rank the elements, external factors and/or the risks in order of their importance to overall value and risk. The system can also produce "metrics" reports by tracing the historical measures for value drivers over time. The software in block 515 sends the designated reports to the printer (118). After the reports have been sent to the printer (118), processing advances to a software block 517. Alternatively, if no reports were designated for printing, then processing advances directly from block 511 to block 517.

The software in block 517 checks the system settings table (140) to determine if the system is operating in a continuous run mode. If the system is operating in a continuous run mode, then processing returns to block 205 and the processing described previously is repeated in accordance with the frequency specified by the user (20) in the system settings table (140). Alternatively, if the system is not running in continuous mode, then the processing advances to a block 518 where the system stops.

Thus, the reader will see that the system and method described above transforms extracted transaction data, corporate information and information from the Internet into a matrix of value and risk for a multi-enterprise organization. The system and method described above goes on to use the detailed valuation and risk analysis information to identify an optimal risk reduction strategy before going on to define the efficient frontier for corporate financial performance. The level of detail, breadth and speed of the integrated analysis of value and risk allows users of the system to manage their operations in an fashion that is superior to the method currently available to users of: dynamic financial analysis, single asset risk management systems, e.r.p. systems and business intelligence solutions.

While the above description contains many specificities, these should not be construed as limitations on the scope of the invention, but rather as an exemplification of one preferred embodiment thereof. Accordingly, the scope of the invention should be determined not by the embodiment illustrated, but by the appended claims and their legal equivalents.

The invention claimed is:

1. A method for financial management, comprising:
preparing data from a plurality of organization related systems for use in processing,
using a computer to calculate a value of each of two or more segments of an organization value and develop a model of a contribution of one or more elements of value and one or more external factors to the value of each of the two or more segments of an organization value by learning from said data where learning from the data comprises identifying one or more performance indicators for each element of value and each external factor,
determining the value contribution of each element of value and each external factor to the organization value using said segment of value models and the calculated value of each segment of value,
obtaining a plurality of event risk information for the organization,
analyzing said performance indicators and said event risk information as required to develop two or more scenarios for a future organization financial performance, and
quantifying a plurality of risks by element of value, external factor and segment of value by simulating organization value under each scenario using the segment of value models, and displaying said value contributions and risks in a paper document or an electronic display
where the quantified risks each consist of an expected reduction in value, and
where the segment of value models comprise two or more causal predictive models that each rely on a set of transformed data to summarize the impact of each of the one or more elements of value and one or more external factors on the segments of value that are selected from the group consisting of current operation segment of value, derivative segment of value, market sentiment segment of value, excess financial asset segment of value and real option segment of value and combinations thereof.

2. The method of claim 1, wherein the one or more elements of value physically exist and are selected from the group consisting of alliances, brands, channels, customers, employees, information technology, intellectual property, investors, partnerships, processes, production equipment, vendors, visitors and combinations thereof.

3. The method of claim 1, wherein the one or more external factors are selected from the group consisting of numerical indicators of market conditions, numerical indications of prices and numerical indications of the organization performance compared to expectations of organization performance.

4. The method of claim 1, wherein the performance indicators comprise one or more causal performance indicators.

5. The method of claim 4, wherein the method further comprises identifying one or more changes that will optimize a total organization risk, a total organization value or a combination thereof for each scenario by analyzing the results of the simulation.

6. The method of claim 1, wherein the organization physically exists.

7. The method of claim 6, wherein the method further comprises identifying one or more changes that will optimize a total organization risk, a total organization value or a combination thereof for each scenario by analyzing the results of the simulation with a multi-criteria optimization algorithm.

8. The method of claim 1, wherein the method further comprises identifying one or more changes that will optimize the value of the real option segment of value alone or in combination with the value of one or more of the other segments of value selected from the group consisting of current operation, derivatives, financial assets, market sentiment and combinations thereof.

9. A financial management system, comprising:
computers connected by a network each with a processor having circuitry to execute instructions; a storage device available to each processor with sequences of instructions stored therein, which when executed cause the processors to:
prepare data from a plurality of organization related systems for use in processing,
calculate a value of each of two or more segments of an organization value and develop a model of a contribution of one or more elements of value and one or more external factors to the value of the two or more segments of an organization value by learning from said data where learning from the data comprises identifying one or more performance indicators for each element of value and each external factor,
determine the value contribution of each element of value and external factor to the organization value using said segment of value models and calculated segment values,
obtain a plurality of event risk information for the organization,
analyze said performance indicators and event risk information as required to develop two or more scenarios for a future organization financial performance, and
quantify a plurality of risks by element of value, external factor and segment of value by simulating organization value under each scenario using the segment of value models, and display said value contributions and risks in a paper document or an electronic display
where the quantified risks each consist of an expected reduction in value, and
where the segment of value models comprise two or more causal predictive models that each rely on a set of transformed data to summarize the impact of the one or more elements of value and one or more external factors on the segments of value that are selected from the group consisting of a current operation segment of value, a derivative segment of value, a market sentiment segment of value, an excess financial asset segment of value, a real option segment of value and combinations thereof.

10. The system of claim 9, wherein the one or more elements of value physically exist and are selected from the group consisting of alliances, brands, channels, customers, employees, information technology, intellectual property, investors, partnerships, processes, production equipment, vendors, visitors and combinations thereof.

11. The system of claim 9, wherein the one or more external factors are selected from the group consisting of numerical indicators of market conditions, numerical indications of prices and numerical indications of the organization performance compared to expectations of organization performance.

12. The system of claim 9, wherein the one or more performance indicators for the external factors and the elements of value comprise one or more causal performance indicators.

13. The system of claim 12, wherein the method further comprises identifying one or more changes that will optimize a total organization risk, a total organization value or a combination thereof for each scenario by analyzing the results of the simulation.

14. The system of claim 9, wherein the organization physically exists.

15. The system of claim 9, wherein the method further comprises identifying one or more changes that will optimize the value of the real option segment of value alone or in combination with the value of one or more of the other segments of value selected from the group consisting of current operation, derivatives, financial assets, market sentiment and combinations thereof.

16. A non-transitory program storage device having sequences of instructions tangibly stored therein, which when executed cause the processors in at least one computer to perform a method for integrating organization systems into an overall financial management system, comprising
- preparing data from a plurality of organization related systems for use in processing,
- calculating a value of each of two or more segments of an organization value and developing a model of a contribution of one or more elements of value and one or more external factors to a value to each of the two or more segments of organization value by learning from said data where learning from the data comprises identifying one or more performance indicators for each element of value and each external factor,
- determining the value contribution of each element of value and external factor to the organization value using said segment of value models and calculated segment values,
- obtaining a plurality of event risk information for the organization,
- analyzing said performance indicators and event risk information as required to develop two or more scenarios for a future organization financial performance,
- quantifying a plurality of risks by element of value, external factor and segment of value by simulating organization value under each scenario using the segment of value models, and displaying said value contributions and risks in a paper document or an electronic display
- where the quantified risks each consist of an expected reduction in value, and
- where the segment of value models comprise causal predictive models and the segments of value are selected from the group consisting of a current operation segment of value, a market sentiment segment of value, a derivative segment of value, an excess financial asset segment of value and a real option segment of value and combinations thereof.

17. The program storage device of claim 16, wherein the one or more elements of value physically exist and are selected from the group consisting of alliances, brands, channels, customers, employees, information technology, intellectual property, investors, partnerships, processes, production equipment, vendors, visitors and combinations thereof.

18. The program storage device of claim 16, wherein the one or more external factors are selected from the group consisting of numerical indicators of market conditions, numerical indications of prices and numerical indications of the organization performance compared to expectations of organization performance.

19. The program storage device of claim 16, wherein the one or more performance indicators comprise one or more causal performance indicators.

20. The program storage device of claim 19, wherein the method further comprises identifying one or more changes that will optimize a total organization risk, a total organization value or a combination thereof for each scenario by analyzing the results of the simulations with a multi criteria optimization algorithm.

21. The program storage device of claim 16, wherein the organization physically exists.

22. The program storage device of claim 21, wherein the method further comprises identifying one or more changes that will optimize a total organization risk, a total organization value or a combination thereof for each scenario by analyzing the results of the simulations with a multi criteria optimization algorithm.

23. The program storage device of claim 16, wherein the method further comprises identifying one or more changes that will optimize the value of the real option segment of value alone or in combination with the value of one or more of the other segments of value selected from the group consisting of current operation, derivatives, financial assets, market sentiment and combinations thereof.

* * * * *